United States Patent
Schierl et al.

(10) Patent No.: US 12,010,714 B2
(45) Date of Patent: *Jun. 11, 2024

(54) RESOURCE MANAGEMENT CONCEPT

(71) Applicant: Fraunhofer-Gesellschaft zur Foerderung der angewandten Forschung e.V., Munich (DE)

(72) Inventors: Thomas Schierl, Berlin (DE); Thomas Wirth, Berlin (DE); Thomas Haustein, Potsdam (DE); Yago Sanchez De La Fuente, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 5 days.

This patent is subject to a terminal disclaimer.

(21) Appl. No.: 17/558,246

(22) Filed: Dec. 21, 2021

(65) Prior Publication Data

US 2022/0191872 A1 Jun. 16, 2022

Related U.S. Application Data

(60) Continuation of application No. 17/146,184, filed on Jan. 11, 2021, now Pat. No. 11,240,821, which is a continuation of application No. 15/712,009, filed on Sep. 21, 2017, now Pat. No. 10,945,269, which is a division of application No. 14/256,703, filed on Apr. 18, 2014, now Pat. No. 9,775,163, which is a continuation of application No. PCT/EP2012/070890, filed on Oct. 22, 2012.

(Continued)

(51) Int. Cl.
*H04W 72/00* (2023.01)
*H04W 28/16* (2009.01)
*H04W 72/54* (2023.01)

(52) U.S. Cl.
CPC ........... *H04W 72/54* (2023.01); *H04W 28/16* (2013.01)

(58) Field of Classification Search
CPC ..... H04W 72/54; H04W 28/16; H04W 28/20; H04W 24/08; H04W 28/14; H04W 72/23; H04W 88/18; H04L 65/61; H04L 67/02
See application file for complete search history.

(56) References Cited

U.S. PATENT DOCUMENTS

| | | |
|---|---|---|
| 5,671,225 A | 9/1997 | Hooper et al. |
| 7,142,563 B1 | 11/2006 | Lin |

(Continued)

FOREIGN PATENT DOCUMENTS

| | | |
|---|---|---|
| CN | 1151645 C | 5/2004 |
| CN | 1791872 A | 6/2006 |

(Continued)

OTHER PUBLICATIONS

"3GPP Evolved Packet System (EPS);Evolved General Packet Radio Service (GPRS) Tunnelling Protocol for Control plane (GTPv2-C)", 3GPP TS 29.274 V8.4.0 (Dec. 2009).

(Continued)

*Primary Examiner* — Brandon M Renner
(74) *Attorney, Agent, or Firm* — Perkins Coie LLP; Michael A. Glenn

(57) ABSTRACT

Resource management such as network radio resource management in wireless networks, is described in connection with different aspects.

3 Claims, 17 Drawing Sheets

Related U.S. Application Data

(60) Provisional application No. 61/550,126, filed on Oct. 21, 2011.

(56) References Cited

U.S. PATENT DOCUMENTS

| | | |
|---|---|---|
| 2002/0054578 A1 | 5/2002 | Zhang et al. |
| 2004/0057420 A1 | 3/2004 | Curcio et al. |
| 2004/0186877 A1 | 9/2004 | Wang et al. |
| 2005/0025180 A1 | 2/2005 | Curcio et al. |
| 2006/0069594 A1 | 3/2006 | Yamasaki et al. |
| 2007/0133412 A1 | 6/2007 | Hutter et al. |
| 2008/0235566 A1 | 9/2008 | Carlson et al. |
| 2008/0295114 A1 | 11/2008 | Argade et al. |
| 2009/0185619 A1 | 7/2009 | Taleb et al. |
| 2009/0187955 A1 | 7/2009 | Sullivan et al. |
| 2009/0191882 A1 | 7/2009 | Kovacs et al. |
| 2009/0193485 A1 | 7/2009 | Rieger et al. |
| 2009/0268655 A1 | 10/2009 | Bertz et al. |
| 2009/0287841 A1 | 11/2009 | Chapweske et al. |
| 2010/0002779 A1 | 1/2010 | Leprince et al. |
| 2010/0103932 A1 | 4/2010 | Kako |
| 2010/0260113 A1 | 10/2010 | Liu et al. |
| 2011/0066746 A1 | 3/2011 | Bennett et al. |
| 2011/0082924 A1 | 4/2011 | Gopalakrishnan |
| 2011/0099594 A1 | 4/2011 | Chen et al. |
| 2012/0059951 A1 | 3/2012 | Gutarin et al. |
| 2012/0254918 A1 | 10/2012 | Takahashi |
| 2012/0307674 A1 | 12/2012 | Mogre et al. |
| 2013/0042013 A1 | 2/2013 | Bouazizi et al. |
| 2013/0060958 A1 | 3/2013 | Keum et al. |
| 2013/0067523 A1 | 3/2013 | Kamitakahara et al. |
| 2013/0117413 A1 | 5/2013 | Kaneko et al. |
| 2013/0132579 A1 | 5/2013 | Keum et al. |
| 2014/0219088 A1 | 8/2014 | Oyman et al. |
| 2015/0156790 A1* | 6/2015 | Han .................... H04W 72/543 370/329 |

FOREIGN PATENT DOCUMENTS

| | | |
|---|---|---|
| CN | 1843050 A | 10/2006 |
| CN | 101309203 A | 11/2008 |
| CN | 101356828 A | 1/2009 |
| CN | 101554065 A | 10/2009 |
| CN | 102045393 A | 5/2011 |
| CN | 102137078 A | 7/2011 |
| EP | 1298931 A2 | 4/2003 |
| EP | 1737167 A1 | 12/2006 |
| EP | 2487872 A1 | 8/2012 |
| EP | 3968691 A1 | 3/2022 |
| JP | 2003204575 A | 7/2003 |
| JP | 2004248160 A | 9/2004 |
| JP | 2005142808 A | 6/2005 |
| JP | 2006521035 A | 9/2006 |
| JP | 2007006476 A | 1/2007 |
| JP | 2007520905 A | 7/2007 |
| JP | 201182808 A | 4/2011 |
| KR | 1020060024351 A | 3/2006 |
| KR | 1020060054206 A | 5/2006 |
| WO | 2004083992 A2 | 9/2004 |
| WO | 2005002264 A1 | 1/2005 |
| WO | 2007126804 A2 | 11/2007 |
| WO | 2011015243 A1 | 2/2011 |
| WO | 20110087449 | 7/2011 |

OTHER PUBLICATIONS

"3GPP TS 23.202 Policy and charging control architecture", 3GPP TS 23.202 V10.0.1 (Mar. 2011).

"3rd Generation Partnership Project: Technical Specification Group Radio Access Network LTE; Access Network (E-UTRAN); X2 Application Protocol (X2AP)", (3GPP TS 36.423 version 11.2.0 Release 11).

"3rd Generation Partnership Project; Technical Specification Group Radio Access Network; Physical layer—General description", 3GPP TS 25.201 V8.1.0 (May 2008) Release 8.

"HTTP live Streaming Architecture Technical Repport", Apple Inc. 2010.

"Information Technology—Dynamic Adaptive Streaming over HTTP (DASH)—Part 1: Media presentation description and segment formats", ISO/IEC DIS 23009-1, Aug. 30, 2011.

"LTE; Evolved Universal Terrestrial Radio Access (E-UTRA) ; S1 Application Protocol (S1AP)", (3GPP TS 36.413 version 8.7.0 Release 8) ETSI TS 136 413 V8.7.0 (Oct. 2009).

"LTE; Evolved Universal Terrestrial Radio Access (E-UTRA) and Evolved Universal Terrestrial Radio Access Network (E-UTRAN); Overall description; Stage 2", (3GPP TS 36.300 version 8.12.0 Release 8) . ETSI TS 136 300 V8.12.0 (Apr. 2010).

"Permanent Document: Use cases and design considerations and alternatives[online]", 1.Editor (Samsung Electronics Ltd. And Ericsson); 3GPP TSG-SA WG4#83 S4-150496, Apr. 13, 2015.

"Requirements related to technical performance for IMT-Advanced radio interface(s)", Report ITU-R M.2134. Nov. 2008.

"Transparent end-to-end Packet-switched Streaming Service (PSS); Protocols and codecs", 2010. Release 9; 3GPP TS 26.234 V9.3.0 Adaptive HTTP Streaming.

3RD Generation , "Technical Specification Group Radio Access Network", (2011)E-UTRAN 3GPP TS 36420.

Cisco, White Paper, "Cisco Visual Networking Index: Forecast and Methodology, 2009-2014", Cisco White Paper. Jun. 2010.

Cisco, White Paper, "Cisco Visual Networking Index: Global Mobile Data-Traffic Forecast Update", Cisco White Paper 2010.

Ericsson, Telefon , et al., "IMS based adaptive HTTP Streaming", Spain 2010.

Leekwijck, Y. , et al., "iDASH: Improved Dynamic Adaptive Streaming over HTTP using Scalable Video Coding", INACM MMSYS 2011.

Mahdavi, J. , et al., "TCP-Friendly Unicast Rate-Based Flow Control", Jan. 1997.

Schierl, T. , et al., "Priority-based Media Delivery using SVC with RTP and HTTP streaming", Multimed Tools Appl (2011) 55:227-246 DOI 10.1007/s11042-010-0572-5.

Schwarz , et al., "Overview of the Scalable Video Coding Extension of the H.264/AVC Standard", IEEE Transactions on Circuits and Systems fpr Video Technology, vol. 17, No. 9, 2007; Berlin Germany.

Sharma, S. , et al., "On the Goodput of TCP NewReno in Mobile Networks", ICCCN 2010.

Stockhammer, Thomas , et al., "Optimized H. 264-Based Bitstream Switching for Wireless", ICME 2005.

Tacz, A. , et al., "Hanover Performance in 3GPP Long Term Evolution Systems", Mobile and Wireless Communications Summit 2007.

Wiegand, Thomas , et al., "Overview of the H.264/AVC Video Coding Standard", IEEE Transaction on Circuit and Systems for Video Technologyvol. 13, No. 7, 560-576.

Zambelli, A., "IIS smooth streaming technical overview", Microsoft Corporation 2009.

* cited by examiner

RESOURCE MANAGEMENT CONCEPT

CROSS-REFERENCE TO RELATED APPLICATIONS

This application is a continuation of U.S. patent application Ser. No. 17/146,184 filed Jan. 11, 2021, which is a continuation of U.S. patent application Ser. No. 15/712,009 filed Sep. 21, 2017, which is a divisional of U.S. patent application Ser. No. 14/256,703 filed Apr. 18, 2014, which is a continuation of copending International Application No. PCT/EP2012/070890, filed Oct. 22, 2012, and additionally claims priority from U.S. Provisional Application No. 61/550,126, filed Oct. 21, 2011, all of which are incorporated herein by reference in their entirety.

BACKGROUND OF THE INVENTION

The present invention is concerned with resource management such as network radio resource management in wireless networks.

In recent years multimedia delivery over the Internet has sharply increased becoming the main bandwidth consumer within the network. Parallel to this increase, significant improvements in mobile networks have led to the apparition of high speed access networks such as 3GPP's High Speed Downlink Packet Access (HSDPA) and the emerging Long Term Evolution (LTE) networks.

With the improvements in mobile networks IP services are expected to be a ubiquitous fact of the daily life. Recent studies expect that consumption of multimedia content, especially video streaming, is going to continue increasing [1], which may also be a result of the advances in mobile networks. In fact, in [2] it has been reported that about the 50% of the data traffic in mobile networks is video data and it is expected that two-thirds of the world's mobile data traffic will be video by 2015.

HTTP streaming is one of the promising multimedia applications that has emerged in the last years and has had an incredible acceptance by the market, which is evident by the standardization activities on adaptive HTTP streaming carried out by different standardization bodies, such as MPEG [3] and 3GPP [4] or proprietary solutions such as IIS Smooth Streaming [5] and HTTP Live Streaming [6].

Although media streaming has been associated previously with RTP/UDP due to its lower latency, relying on HTTP/TCP for media delivery has shown to be a very valuable solution for scenarios where extremely stringent delay constraints are not considered, since traversal problems within NAT and Firewalls, typical with RTP/UDP, are not present.

Dynamic Adaptive Streaming over HTTP (DASH) [3] is an emerging MPEG standard, which defines a format for multimedia delivery over HTTP. It basically consists of two elements: the format of the media to be downloaded and the description of the media to be downloaded. Existing proprietary solutions are based on a similar approach.

The media format is basically structured in typically small time intervals of video, called segments, which if continuously downloaded allow for a continuous representation of the media. Furthermore, usually different representations, e.g. encodings, of the media at different bitrates are available at the server allowing for a user-driven adaptation, where users select representations based on the observed network throughput. Download of segments of different representations for different time intervals is allowed resulting in a perfectly playable media, if all switching constraints presented in the Media Presentation Description (MPD), described below, are followed.

In DASH, the description of the format is given by the MPD. The MPD is an XML document, which describes the data and especially the segments available at the server. Using the MPD the clients have the information necessitated to make the requests which fit their network throughput or their requirements.

In DASH the clients are responsible for performing adaptation. Based on the interests of the users, equipment capabilities and current status of the network, DASH clients have to select the representation(s) described in the MPD, which match best the necessities/capabilities of the clients. An example of DASH architecture is shown in FIG. 1.

As is visible from FIG. 1, the participating entities in a DASH environment are: the DASH server 10 which receives its media content to be distributed to respective DASH clients 12 from some DASH content preparation stage 14, the DASH client 12 itself and the network interconnecting the DASH server 10 and the DASH client 12 with the network 16 being denoted as "HTTP Cache". As depicted in FIG. 3, the DASH client may run on a suitable user terminal such as a television device or a computer or the like, when the DASH client receives from the DASH server 10 the media presentation description MPD 18 which, in turn, has been generated along with the versions of the media content by the DASH content preparation stage 14 so as to describe the various versions of the media content available at the DASH server 10.

FIG. 2 shows the state of the art of the deployment architecture of DASH in LTE networks which uses entities from the DASH standard [ISO/IEC 23009-1]. The white boxes specify the DASH system, while the shaded boxes specify the LTE system. To be more precise, in transferring the DASH infrastructure to LTE networks, the DASH client 12 is shown to be connected to the HTTP CASH 16 via a concatenation of an LTE base station 20, a radio channel 22 and a user entity 24, wherein a radio resource manager 26 is shown to be comprised by the base station 20 and the user entity 24 may be a mobile terminal such as a mobile phone or the like at which the DASH client 12 is operating in form of, for example, a software running on the user entity's processor. It is assumed that the DASH client 12 as well as the LTE eNB 20 have access to the media presentation description (MPD 18). The MPD 18 provides sufficient information about the video representation at server 10 to provide a streaming service to the user 12 by the user requesting segments from the HTTP server 10 using TCP/IP as transport protocol. Initially, the dash client 12 transmits a HTTP get request to the HTTP server 10. After HTTP handshake a TCP tunnel between server 10 and client 12 is established. This TCP tunnel is transparent for the underlying physical transport layer. Depending on the information provided by the MPD 18, the DASH client 12 has enough information for demultiplexing, decoding and rendering the included media data appropriately.

The problem involved with the scenario depicted in FIG. 2 is the usual behavior of the DASH client 12 according to which each DASH client 12 seeks to provide its user with the version of the media content residing on the respective server 10 having the highest quality and/or information content possible at the currently assigned communication resources, assigned by the radio resource manager 26 to the user entity 24 of the respective DASH client 12. The "highest possible" quality/information content could then one having maximum spatial resolution, maximum number of views, maximum width depth and the like, thereby necessitating the highest bandwidth. This, in turn, means that each DASH client 12 maximally strains the available radio resources of the base station 26 and the base station and the radio resource manager 26, respectively, has to cope with steadily requesting an increase of assigned communication resources in order to obtain one of the available higher level versions of the media content which the respective DASH client of the respective user entity wishes to obtain. Naturally, this leads to a suboptimal distribution of the radio communication resources to the user entities which distribution or scheduling is performed based on a current channel situation and user profiles assigned to the individual user entities 24.

Accordingly, it is an object of the present invention to provide a resource management concept which enables a more efficient use of the available communication resources in order to, for example, maximize the number of satisfied users.

SUMMARY

According to an embodiment, a radio resource manager may be configured to assign communication resources of at least one base station to user entities depending on a media presentation description relating to a media content transferred within a data traffic from a server to a client with one of the server and the client operating at one of the user entities.

Another embodiment may have a user entity for communicating with a radio resource base station, on which a client or server is operative, wherein the user entity is configured to survey a data traffic to/from the client or server so as to derive a media presentation description describing versions of differing bandwidths of a media content, and forward, at least partially, the media presentation description to a radio resource manager responsible for assigning the communication resources of the radio resource base station to user entities to which the user entity belongs.

Another embodiment may have a user entity for communicating with a radio resource base station, on which a client is operative, wherein the user entity is configured to determine a received media content throughput or buffer state of a media content retrieved by the client from a server and inform a radio resource manager responsible for assigning the communication resources of the radio resource base station to the user entity, on the determined media content throughput or buffer state.

Another embodiment may have a client for being operative on a user entity for communication with a radio resource base station, the client being configured to retrieve from a server a media presentation description and a media content, the media presentation description describing versions of differing bandwidths of the media content, the client being configured to be switchable from a normal mode to a slave mode by means of a signalization from a radio resource manager responsible for assigning the communication resources of the base station to the user entity, wherein the client is configured to, in the normal mode, request the media content from the server in a version determined by the client based on the communication resources assigned to the user entity, and, in the slave mode, request the media content from the server in a version determined by the client irrespective of the communication resources assigned to the user entity.

Another embodiment may have a resource manager configured to inspect a media presentation description describing versions of a media content of differing bandwidths, within a data traffic from a server to a client operating at a user entity; inspect a media request from the client to the server, requesting a wanted version of the media content; and decide, depending on a current resource situation information and the media presentation description, to forward the media request to the server, or, alternatively, to cause that the media request does not lead to the wanted version of the media content being sent to the client.

Another embodiment may have a resource manager configured to inspect a media presentation description describing versions of a media content of differing bandwidths, within a data traffic from a server to a client operating at a user entity; inspect a media request from the client to the server, requesting a wanted version of the media content; obtain an user entity's buffering state for the client by simulating same based on channel quality feedback from the user entity to the base station or a monitoring of a media content buffer positioned on the other side of the base station or within the base station, or extracting the user entity's buffering state from an explicit signalization within a data traffic from the client to the server; and decide, depending on the user entity's buffering state and the media presentation description, to forward the media request to the server, or, alternatively, to cause that the media request does not lead to the wanted version of the media content being sent to the client.

Another embodiment may have a resource manager configured to inspect a media presentation description request from a client operating at a user entity to a server, the media presentation description request requesting a media presentation description from the server, the media presentation description describing versions of a media content of differing bandwidths; inspect the media presentation description within a data traffic from the server to the client; decide, based on a current resource situation information and the media presentation description, to forward the media presentation description to the client as an answer to the media presentation description request, or to intercept the media presentation description, and modify the media presentation description.

Another embodiment may have a radio resource manager configured to assign communication resources of a base station to user entities depending on media buffering state information of a client operating at one of the user entities.

Another embodiment may have a radio resource manager configured to survey data traffic between clients operating at user entities, and one or several servers; check as to whether there are media presentation descriptions within the data traffic from the one or several servers to different ones of the clients, which relate to a common media content, wherein the radio resource manager is configured to, depending on the check, offer to the clients a multicast version of the common media content, besides unicast versions of the media content; or the radio resource manager is configured to, depending on the check, cause a change of a protocol for clients downloading the common media content from a unicast protocol to a multicast protocol.

Another embodiment may have a radio resource manager configured to assign communication resources of at least one base station to user entities, wherein the radio resource manager is configured to survey a data traffic to a server or a client operating at one of the user entities to or control information from another radio resource manager so as to obtain information on guaranteed communication resources currently assigned to an external user entity which the other of the server and the client operates on, or a buffer state of the other of the server and the client, and perform the assignment depending on the information obtained.

According to another embodiment, a method for radio resource managing may have the step of: assigning communication resources of at least one base station to user entities depending on a media presentation description relating to a media content transferred within a data traffic from a server to a client with one of the server and the client operating at one of the user entities.

According to another embodiment, a method for being performed on a user entity on which a client or server is operative, the user entity communicating with a radio resource base station, may have the steps of: surveying a data traffic to/from the client or server so as to derive a media presentation description describing versions of differing bandwidths of a media content, and forwarding, at least partially, the media presentation description to a radio resource manager responsible for assigning the communication resources of the radio resource base station to user entities to which the user entity belongs.

According to another embodiment, a method for being performed on a user entity on which a client is operative, the user entity communicating with a radio resource base station, may have the steps of: determining a received media content throughput or buffer state of a media content retrieved by the client from a server and informing a radio resource manager responsible for assigning the communication resources of the radio resource base station to the user entity, on the determined media content throughput or buffer state.

According to another embodiment, a method may have the steps of: inspecting a media presentation description describing versions of a media content of differing bandwidths, within a data traffic from a server to a client operating at a user entity; inspecting a media request from the client to the server, requesting a wanted version of the media content; and deciding, depending on a current resource situation information and the media presentation description, to forward the media request to the server, or, alternatively, to cause that the media request does not lead to the wanted version of the media content being sent to the client.

According to another embodiment, a method may have the steps of: inspecting a media presentation description describing versions of a media content of differing bandwidths, within a data traffic from a server to a client operating at a user entity; inspecting a media request from the client to the server, requesting a wanted version of the media content; obtaining an user entity's buffering state for the client by simulating same based on channel quality feedback from the user entity to the base station or a monitoring of a media content buffer positioned on the other side of the base station or within the base station, or extracting the user entity's buffering state from an explicit signalization within a data traffic from the client to the server; and deciding, depending on the user entity's buffering state and the media presentation description, to forward the media request to the server, or, alternatively, to cause that the media request does not lead to the wanted version of the media content being sent to the client.

Another embodiment may have a method configured to inspecting a media presentation description request from a client operating at a user entity to a server, the media presentation description request requesting a media presentation description from the server, the media presentation description describing versions of a media content of differing bandwidths; inspecting the media presentation description within a data traffic from the server to the client; deciding, based on a current resource situation information and the media presentation description, to forward the media presentation description to the client as an answer to the media presentation description request, or to intercept the media presentation description, and modify the media presentation description.

According to another embodiment, a method for radio resource managing may have the steps of: surveying data traffic between clients operating at user entities, and one or several servers; checking as to whether there are media presentation descriptions within the data traffic from the one or several servers to different ones of the clients, which relate to a common media content, depending on the check, offer to the clients a multicast version of the common media content, besides unicast versions of the media content; or depending on the check, causing a change of a protocol for clients downloading the common media content from a unicast protocol to a multicast protocol.

According to another embodiment, a method for assigning communication resources of at least one base station to user entities may have the steps of: surveying a data traffic to a server or a client operating at one of the user entities to or control information from another radio resource manager for assigning communication resources to at least one different base station so as to obtain information on guaranteed communication resources currently assigned to an external user entity which the other of the server and the client operates on, or a buffer state of the other of the server and the client, and performing the assignment depending on the information obtained.

Another embodiment may have a computer program having a program code for performing, when running on a computer, the above methods.

BRIEF DESCRIPTION OF THE DRAWINGS

Embodiments of the present invention are described below with respect to the figures among which

DETAILED DESCRIPTION OF THE INVENTION

Figure 3:
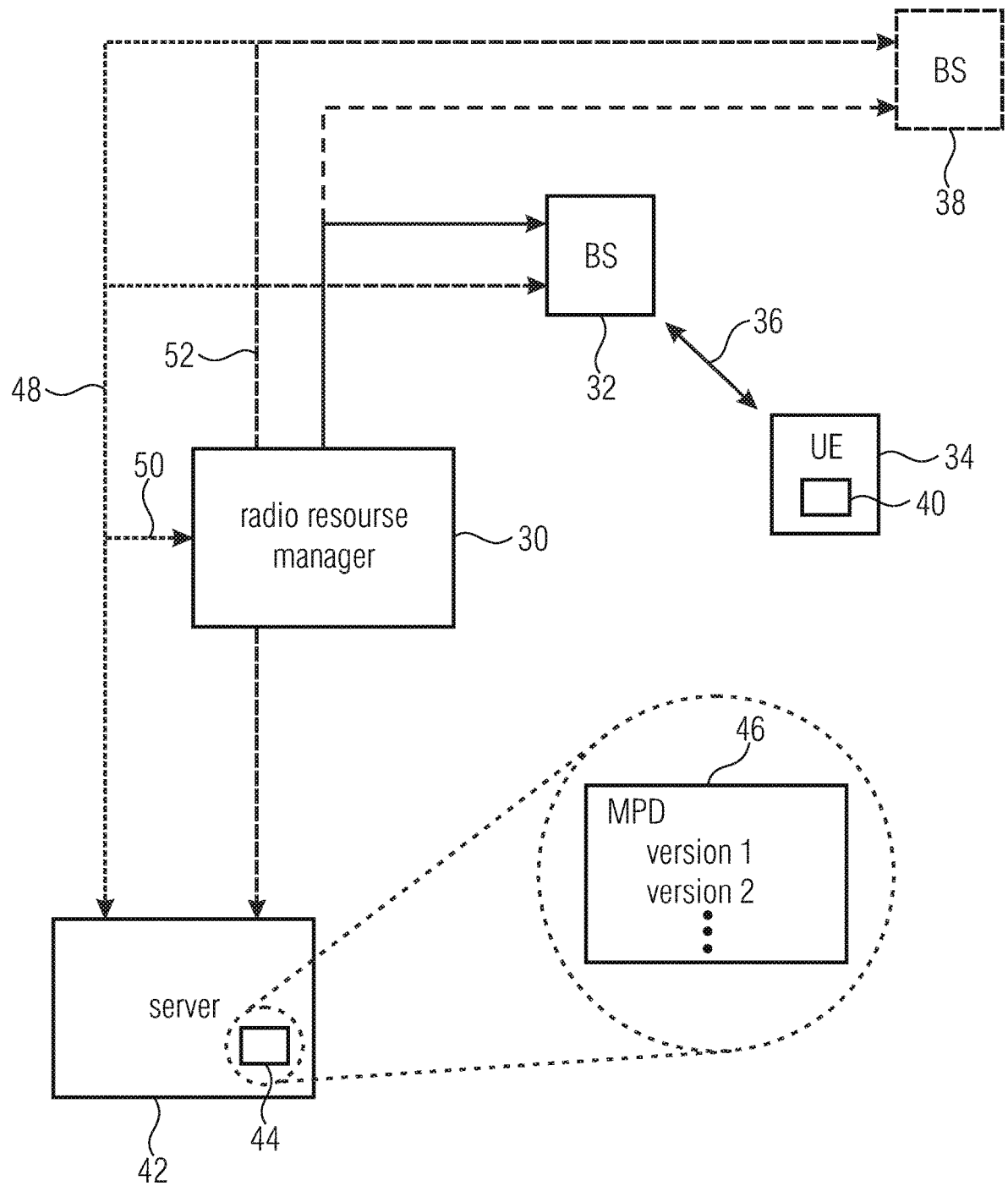
FIG. 3 shows a block diagram of an exemplary radio resource environment including a radio resource manager, based on which different embodiments of the radio resource manager according to the present invention are described.

FIG. 3 shows a first embodiment of a radio resource manager in accordance with the present application. The radio resource manager of FIG. 3 is generally indicated with reference sign 30 and is configured to assign communication resources of a base station 32 to user entities for which one is representatively shown at 34. The user entity 34 is, for example, a mobile terminal such as a mobile phone, a laptop or the like, but may also be a stationary device. The user entity 34 is able to communicate with the base station 32 via a wireless channel 36 via its antenna or antennas (not shown). The base station 32 appropriately manages the multiplexing of communication data, i.e. downlink and uplink data onto the communication channel 36, and may have also one or more antennas (not shown). In particular, the base station 32 appropriately multiplexes downlink data for the various user entities 34 onto the transmit signal output by base station 32. Different multiplexing schemes may be used to this end. For example, the base station 32 may use OFDM and, in particular, LTE. In any case, the base station 32 is able to distribute or assign the communication resources of the communication channel to the user entities, including user entity 34, in a time-varying manner so as to adapt the assignment of the communication resources of base station 32 to the user entities—called, inter alias, the scheduling—to the current resource situation. For example, the base station 32 may rely on any combination of the following parameters in order to perform the scheduling:

1) The number of user entities 34 served by the base station 32, i.e., the number of user entities 34 having performed a registration at the base station 32 and thus, the number of user entities 34 among which the base station's communication resources are to be distributed.
2) The sort of the communication data to be exchanged with the individual user entities, the sort of communication data differentiating, for example, real time (low delay) media data such as speech signals, from HTTP requested data and the like.
3) User profiles assigned to the served user entities with the profiles being assigned, for example, with different maximum bit rates and/or minimum bit rates for downlink and/or uplink, or defining a priority among the user entities with the RRM 30 favoring, in assigning the communication resources, user entities having a higher priority over user entities having a lower priority.
4) Channel quality feedback from the user entities, indicating the user entities' current reception quality situation, i.e. the channel quality between base station 32 on the one hand and the individual served user entities 34 on the other hand, wherein the base station 32 measures the channel quality, for example, by respective channel feedback signals from the user entities
5) Channel rate requests from the user entities, indicating the user entities' wishes for the assignment of further bandwidth.

In case more than one base station 32 and 38 may serve one user entity, then the number concerns the number of user entities served by all the base stations currently serving, or at least currently being available for serving, the user entities in some area. The interaction between these base stations could also be taken into account when determining the assignment of the communication resources. In that scenario, information such as subcarriers aggregated by RRM 30 or information derived by RRM 30 about the user entities 34 such as Handover between cells, can be further shared between base stations 32 and 38 and collected and used by a higher level RRM 30.

The base station 32 may have different options/parameters in order to differently assign the communication resources to the user entities. This is true for both downlink and uplink communication. For example, the base station 32 could implement a scheduling by any combination of the following settings:

1) The association of subcarriers to the served user entities, such as the OFDM subcarriers. Typically, the maximum number of subcarriers used in LTE is 20 MHz bandwidth. Naturally, this may be modified. For the successor of LTE, called LTE-Advanced, multiple carriers of 20 MHz up to 100 MHz is in discussion. This is called carrier aggregation. That is, subcarriers may also be aggregated subcarriers.
2) The association or distribution of time slots to the served user entities.
3) The spatial coverage of the base stations cell within which the user entities have to be to be able to communicate with the base station 32, the spatial coverage being changed by use of, for example, MIMO techniques.
4) The association of the individual subcarriers to modulation constellations In case of not implementing the scheduling by any of the just-mentioned setting options, the base station 32 may either not use the respective transmission feature or use a fixed setting instead. For example, the base station 32 may not use time division multiplexing within the downlink and/or no time division multiplexing within the uplink or the respective time division multiplexing may be fixed over time. The same applies with respect to the MIMO functionality of the frequency division multiplexing involving the assignment of subcarriers.

In any case, depending on the assigned communication resources, each user entity 34 experiences an effective transmission bandwidth for both downlink and uplink.

As a minor note it should be noted that the radio resource manager 30 of FIG. 3 could be included, could be part of, or could be housed by, the base station 32. However, the radio resource manager 30 could also be arranged physically separated from the base station 32. In particular, it could even be possible that the radio resource manager 30 is not especially associated with a certain base station. Rather, the radio resource manager 30 could manage the radio resource management for a higher number of user entities resulting in the cells of more than one base station. FIG. 3, for example, shows an optional further base station 38, the communication resources of which may, optionally, also be controlled by radio resource manager 30. In particular, it could be possible that the base stations 32 and 38 form, along with a radio resource manager 30, a wireless network that allows for the user entities to be concurrently served by more than one base station. That is, user entities currently present in the overlap area of both base station cells could have communication resources of both base stations assigned to it by the radio resource manager 30. Accordingly, the effectively available communication bandwidth of user entity 34 would, in that case, be the sum of the effective bandwidth offered, or assigned to it, by each of the serving base stations 32 and 38. Naturally, the number of serving base stations could be increased.

In any case, the problem involved with the functionality of the radio resource manager 30 as described so far is that a client 40 operating at one of the user entities, such as user entity 34, seeks to obtain a media content from a server 42 in a version having an information content level as high a possible. The client may, for example, be an application running on a user entity's operating system such as a browser, a VoIP (voice over IP) application or the like, although other possibilities exist as well. The server, in turn, may be a program, such as a VoIP application or a media content server, running on a host such as a computer, another mobile user entity, a work station, or a network.

Imagine, for example, that the client 40 of user entity 34 seeks to download a media content 44 from server 42 and that this media content 44 is available at server 42 in different versions as described by a media presentation description 46 which is also available from server 42 for client 40. The different versions of the media content 44 may differ in any combination of any subset of the following parameters:
1) Spatial resolution
2) Temporal resolution
3) Number of views
4) Bit depth
5) Signal to noise ratio
6) Number of audio channels.

That is, the media content 44 may be a video. The data traffic via which client 40 obtains the media content 44 from server 42 is at least surveyable by radio resource manager 30 as it is depicted by dotted line 48 which shows that the data traffic between server 42 and client 40 leads past base station 32 or the base stations 32 and 38, respectively, with a content of the data traffic being inspectable by the radio resource manager 30 as shown with arrow 50. Alternatively, the data traffic may even lead through the radio resource manager 30 as illustrated by dashed arrow 52 so that, in accordance with this alternative, the radio resource manager 30 would even be able to not only inspect, but also intercept or otherwise influence portions of the data traffic between client 40 and server 42.

The data traffic may use any appropriate protocol such as HTTP. The underlying transport protocol may be TCP or UDP.

However, although the descriptions of embodiments are focused on HTTP streaming, the data transfer itself may be also applied differently, such as via RTP [IETF RFC 3550]. Therefore, a description of the media in a session is given by a SDP [IETF RFC 4566] (Session Description Protocol) file. Such an SDP file is to be regarded as an "MPD" in the sense of the present application and allows the description of different media characteristics such as different encoding parameters to be chosen from.

Due to the fact that the various versions of the media content 44 convey a different amount of information on the media content 44, these versions allow for a ranking among these versions with respect to their minimum transmission bandwidth necessitated in order to play the respective version at the client 40 without interruptions.

Normally, a client 40 is configured to provide the user with a version offering the highest possible information on the media content 44. The highest possible version may be defined as the one which is still presentable to the user by the facilities available by the user entity 34 such as by the display and loudspeakers available at the user entity 34, or by the media player, decoder or the like. To be more precise, although not shown in FIG. 3, the user entity 34 may comprise a display for displaying the frame sequence of the media content 44 and one or more loud speakers in order to reproduce an optional audio signal accompanied to the frame sequence. In the latter case, the client 40 may try to provide the user with the version of the media content 44 which offers the highest spatial resolution which is still reproducible by the display of the user entity 34, for example.

Finally, client 40 requests a wanted version of the media content 44 from server 42 such as, for example, by a HTTP request. In order to enable the client 40 to decide on the version to be provided to the user, client 40 is provided with the media presentation description 46 within the data traffic from the server 42 to client 40. For example, client 40 requests the media presentation description 46 of the media content 44 from server 42 which, in turn, responds by sending the media presentation description 46 to client 40. As described above, the media presentation description 46 indicates to client 40 the available versions available at server 42 of media content 44 and the necessitated minimum transmission bandwidths of these versions. Accordingly, client 40 evaluates the currently available efficient bandwidth offered or assigned to the user entity 34 by radio resource manager 30 and selects, usually, the version having the highest level and necessitating, accordingly, the highest minimum transmission bandwidth necessitated which still is below, or equal to, the efficient bandwidth offered by video radio resource manager 30.

However, as described in the introductory portion of the specification of the present application, as all the clients 40 operating at the user entities seek to provide the users with the maximum bandwidth version of the respective media content, the strain put onto the communication resources of the base station 32 is high although, for example, the strain would not have to be that high if the clients 40 would lower their requested version level.

Accordingly, in accordance with the embodiment of FIG. 3, the radio resource manager 30 is configured to assign the communication resources of the base station 32 to the user entities including user entity 34, depending on the media representation description 46 within the data traffic from a respective server 42 to a respective client 40 operating at the respective user entity 34. As will get clear from the below description, the communication resources assigned by RRM using the outlined dependency on the MPD 46, may especially pertain the uplink and/or downlink communication resources, which represent a major part of the overall communication resources which, in turn, may also encompass control signaling such as the acknowledgment feedback loop of TCP or the afore-mentioned quality feedback.

To be more precise, the radio resource manager 30 is configured to inspect the media presentation description 46 describing the versions of the video content 44 of differing bandwidths within the data traffic from the server 42 to client 40 and takes the information provided by the media presentation description into account, along with the other input parameters, when assigning the communication resources of the base station 32 to the user entities among which the user entity 34 is.

For example, if there is currently a high strain put onto the communication resources of base station 32 due to, for example, a high number of user entities 34 to be served, radio resource manager 30 may decide that a version of the media content 44 currently requested from server 42 by client 40 should currently not be available for the client 40 and accordingly, reduces the amount of communication resources assigned to user entity 34, thereby effectively reducing the effective bandwidth offered to the user entity 34. In other words, the radio resource manager 30 may decide, that in high strain situations, client 40 should switch from a higher level version of the media content 44 to a lower level version thereof, at least temporarily during the high strain put on to the communication resources of base station 32. Of course, RRM 30 may check the existence of such a lower bandwidth version in advance. Naturally, the client could also get for some reasons, e.g., to optimize the video quality watched by clients in the cell, a version with a higher bandwidth in order to get a minimum acceptable video quality or information amount. In other words, the RRM 30 not necessarily assigns the communication resources to the clients merely in order to optimize the cell throughput. Rather, the RRM 30 could also take the video quality for all clients in the cell into account. In even other words, of course, there are cases where clients do notoriously apply for maximum quality. An example for such clients, are clients in the automatic switching mode exemplarily described below.

From another point of view, the radio resource manager 30 may be configured to, if the clients 40 of more than one of the user entities 34 to which the communication resources are assigned, are currently downloading respective media content 44 via the at least one base station 32, perform the assignment of the communication resources to the more than one user entities 34 depending on the respective media presentation description 46 within the respective data traffic from the respective pair of server and client such that a cost function is optimized which, at least, depends on a quality measure and a minimum bandwidth of the versions for each media content 44 of the clients. To be more precise, the cost function to be optimized, may form a tradeoff between a total bandwidth and a total quality measure determined over the versions for each media content 44 of the clients. This optimization may result in clients getting a bandwidth for a lower quality version of their media content assigned thereto than originally applied for, as well as clients getting a bandwidth for a higher quality version of their media content assigned thereto than originally applied for. The "quality measure" for the individual media contents' versions needs not to be interval scaled. An ordinal scale as offered by @qualityRanking could be enough. That is, the ordinal scale may relate to the individual media contents only. Ordinality needs not to be valid among all media contents of all clients 40. However, additional information may be included into the optimization cost function, such as a measure of a coding complexity of the respective media content, i.e. a measure for an average rate/distortion measure, of the media content. This coding complexity measure may be very coarse. For example, @contentCharacteristic mentioned below could be such a characteristic. All this information could be included into the media presentation description 46 of the respective media content requested by the respective client.

Moreover, the radio resource manager 30 may log a history of versions of the media content 44 requested by client 40 in order to use the history in order to re-assign a higher amount of communication resources to the respective client 40 in phases where the strain put on to the communication resources of the base station 30 decreases again.

The client 40, in turn, will realize by evaluating the current effective bandwidth provided by radio resource manager 30, that—incase the RRM 30 decided to lower the assigned communication resources amount—the currently requested and downloaded version of media content 44 is presentable to the user merely with interruptions. In other words, the client 40 will realize that the media buffer of the media player reproducing the media content 44 to the user is going to get empty due the decrease of the available transmission bandwidth via the wireless communication path 36. While the client 40 is free to react to this situation as it wishes or as the client wishes, one reasonable option of the client 40 would be that same sends a request to server 42, requesting a lower level version of the media content 44, i.e., a version associated with a lower necessitated minimum transmission bandwidth than compared to the currently downloaded version of the media content 44.

To summarize, in accordance with the embodiment of FIG. 3, the radio resource manager 30 performs the scheduling—besides the dependency on available resources, channel quality as indicated by the user entities feedback, number of resource requests from the associated user entities, priorities among the user entities and the like, as mentioned above—depending on the media presentation description 46 within the data traffic extending between respective pairs of servers and clients operating at respective user entities.

With respect to the embodiment of FIG. 3, it is noted that the client 30 may, for example, represent software which is running on a user entity processor. Alternatively, the client may be implemented in hardware or programmable hardware.

Thus, FIG. 3 reveals a radio resource manager configured to assign communication resources of a base station 32 to user entities 34 depending on a media presentation description 46 within a data traffic from a server 42 to a client 40 operating at one of the user entities 32.

In the following, a possible implementation of the embodiment of FIG. 3 is explained. According to this possible implementation, the client 30 uses video streaming over HTTP in order to obtain the media content 44 from server 42. In particular, the underlying transport protocol used for the video streaming over HTTP may be the TCP [RFC 793].

Figure 4:
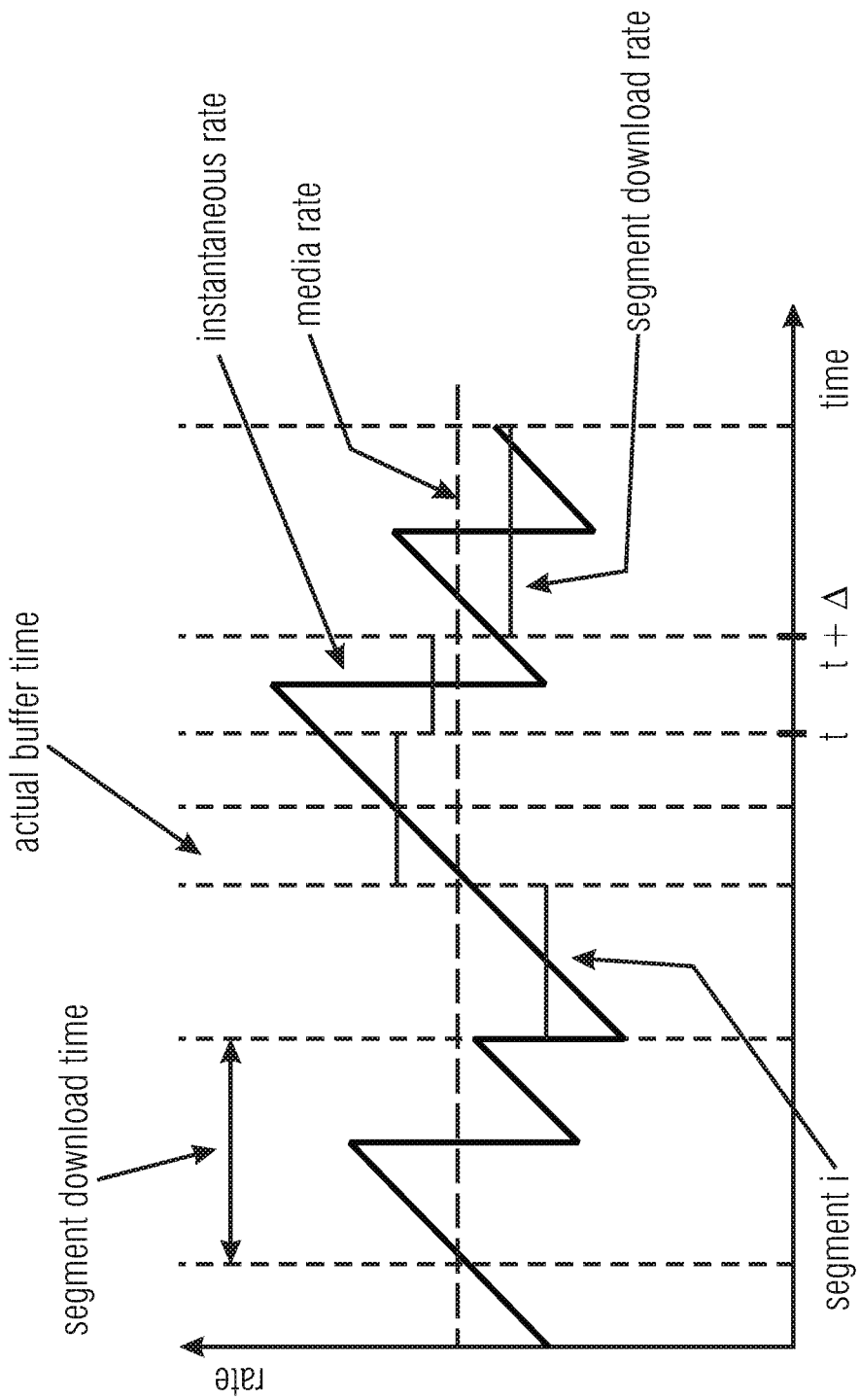
FIG. 4 shows a graph of the media rate vs. instantaneous rate vs. segment download rate.

In fact, the implications pointed out here are valid for every protocol that shares the properties described in the following. The considered protocols here are connection oriented protocols with a congestion control mechanism based on reception of ACKs (acknowledgement)/NACKs (Negative-acknowledgement) or any other type of acknowledgment such as SACKs (Selective-acknowledgment) used for TCP. Possibly, these protocols may used additionally retransmission mechanisms for coping with packets losses parallel to the throughput adaptation result of the congestion control mechanism. On example of such a protocol would be when the underlying transport protocol used for video streaming over HTTP is the TCP [RFC 793]. TCP provides streaming data transfer with enhanced features to provide reliability, e.g. using acknowledgement messages (ACK) and flow control mechanisms, e.g. congestion control via slow start, congestion avoidance, fast retransmit and fast recovery. Flow control indicates the transmitter how many bytes can be received without overflow of internal buffers. The relevant media and status rates are depicted in FIG. 4 and Table 1. As seen in the in FIG. 4, packet loss has an influence on the received TCP throughput and the same is expected for any other protocol with the aforementioned characteristics. Furthermore, the equation below shows a very good estimation of the TCP throughput based on the packet loss (p), Round Trip Time (RTT) and Maximum Transmission Unit (MTU) [18]. Therefore, tracking network layer packet losses in transmission is a very effective technique to allow the radio resource manager to assign communication resources of a base station 32 properly. Therefore, 32 may derive from the PHY layer information, such as lost radio frames/MAC layer packet data units and the higher layer MTU size as well as the TCP packet loss at the MAC buffers 100 of 30 (cf. FIG. 13) to derive the actual packet loss rate on the higher network layer such as the transport layer, e.g. for TCP.

$$r = \frac{1,22 * MTU}{RTT * \sqrt{p}}$$

TABLE 1

Available Times and Rates

| | |
|---|---|
| Segment download time | Time it takes to download a single video segment |
| Media rate | Media rate, e.g. rate of the AVC/SVC video service |
| Instantaneous rate | Variable bit rate available on the physical layer of the transport media, e.g. broadband wireless system, here: LTE |
| Segment download rate | Resulting received segment download rate, depending on the RRM in the LTE eNB |

With respect to FIG. 3, for example, the radio resource manager 30 has different possibilities to check as to which version of a media content out of the MPD 46 the client 40 is currently downloading. For example, the RRM 30 may determine the version of the media content 44 currently downloaded by the client 44 via base station 32 by inspecting a media request from the client 40 to the server 42. A simpler processing at RRM 30, however, with less tracking operations, is, however, achievable when RRM 30 determines a throughput measure for a received media throughput of the client and predicts from the determined throughput measure as to which version of a media content 44 out of the media presentation description 46, is currently downloaded by the client 44 via the at least one base station 32. As the throughput measure, the assigned bandwidth itself may be used. Alternatively, RRM 30 may try to estimate the deviation/decrease of the actually received media content bandwidth of the respective client 40 from the originally assigned bandwidth to the respective user entity, by way of an evaluation of the quality feedback sent from the respective user entity 34 to the base station 32, as has been just described. Even alternatively, an additionally functionality of the user entity may inform the RRM 30 about the actually received media content throughput rate.

Figure 7:
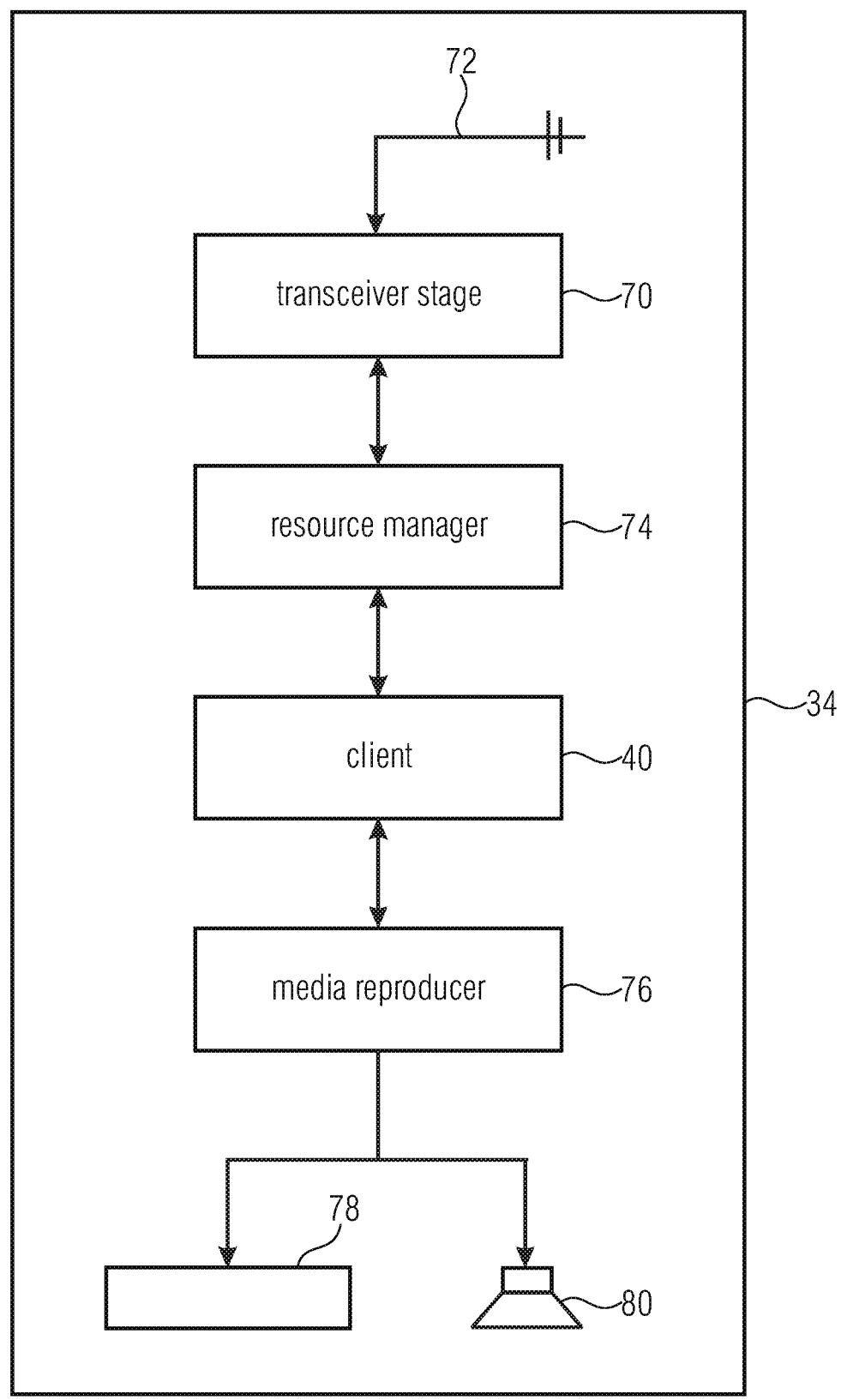
FIG. 7 shows block diagram of a user entity including a resource manager, based on which different embodiments of the resource manager according to the present invention are described.

Although the above description assumed the radio resource manager to survey the data traffic from the server 42 to the client 40 so as to obtain the media presentation description 46, this overhead may alternatively displaced to the user entity such as some entity within the user entity, which is between a user entity's transceiver stage and the client (see FIG. 7, for example). That is, this surveillance could be assumed by a surveillance stage within the user entity. The surveillance stage would forward the MPD 30—back—to the RRM 30, or at least a subpart thereof such as en excerpt thereof, or a set of parameters which are derived from a subpart of the MPD, wherein excerpt or set of parameters may, in turn, be enough in order to described the media content and its versions available at the server 32. Thus, the user entity 34 may be configured to communicate with the radio resource base station 32 and may have the client 40 operative thereon, as described above, wherein, however, the user entity 34 may additionally be configured to survey the data traffic from the server 42 to the client 40 so as to derive the media presentation description 46 from the data traffic and forward, at least partially, the media presentation description to the radio resource manager 30. Later, it will be shown that the user entity may have a server operating thereat instead of client 40, with the RM however, acting the same, i.e. by surveying the data traffic from that server to any client outside the user entity in order to derive the MPD.

Moreover, in the implementation of FIG. 3 described next, client 40 and server 42 may use DASH in order to stream the media content 44 from server 42 to client 40. DASH defines a certain structure or syntax for the media presentation description. According to DASH, the MPD uses tags to specify parameters needed for setting up logical channels between DASH client and DASH HTTP server. Tags can either be optional, marked with letter O, or mandatory, marked with letter M.

For implementing the embodiment of FIG. 3, a combination of MPD tags, taken from the MPEG DASH standard (ISO/IEC 23009-1 [3]) could be used.

In particular, the mandatory @bandwidth tag could be taken into account which relies on the @minBufferTime tag and which is therefore quasi-mandatory.

The tags which the MPD could be constructed of, comprise:

TABLE 2

| MPD tags | | |
|---|---|---|
| Main tags: | | |
| @bandwidth | M | specifies a bound on the data rate and data rate variation of the Representation as follows: Consider a hypothetical constant bitrate channel of bandwidth with the value of this attribute in bits per second (bps). Then, if the Representation is continuously delivered over this channel, starting at any SAP that is indicated either by @startWithSAP or by any Segment Index box, a client can be assured of having enough data for continuous playout providing playout begins after @minBufferTime * @bandwidth bits have been received (i.e. at time @minBufferTime after the first bit is received). For dependent Representations this value shall specify the minimum bandwidth as defined above of this Representation and all complementary Representations. |
| @minBufferTime | M | specifies a common duration used in the definition of the Representation data rate (see @bandwidth attribute in 5.5.5.2). |
| @qualityRanking | O | specifies a quality ranking of the Representation relative to other Representations in the same Adaptation Set. Lower values represent higher quality content. If not present then no ranking is defined. |
| Tags to be considered for more detailed client status tracking (optional tags): | | |
| @availabilityEndTime | O | specifies the latest Segment availability end time for any Segment in the Media Presentation. When not present, the value is unknown |
| @availabilityStartTime | CM Must be present for type = "dynamic" | For @type = "dynamic" this attribute shall be present. In this case it specifies the anchor for the computation of the earliest availability time (in UTC) for any Segment in the Media Presentation. For @type = "static" if present, it specifies the Segment availability start time for all Segments referred to in this MPD. If not present, all Segments described in the MPD shall become available at the time MPD becomes available. |
| @mediaPresentationDuration | CM Must be present for type = "static" | specifies the duration of the entire Media Presentation. If the attribute is not present, the duration of the Media Presentation is unknown. In this case the attribute MPD@minimumUpdatePeriodMPD shall be present. This attribute shall be present when the attribute MPD@minimumUpdatePeriodMPD is not present. |
| @start | O | if present, specifies the PeriodStart time of the Period. The PeriodStart time is used as an anchor to determine the MPD start time of each Media Segment as |

TABLE 2-continued

MPD tags
Main tags:

| | | |
|---|---|---|
| | | well as to determine the presentation time of each access unit in the Media Presentation timeline. |
| @duration | O | if present specifies the duration of the Period to determine the PeriodStart time of the next Period. |
| @bitstreamSwitching | OD Default: false | When this flag is set to 'true', the following applies: All Representations in the Adaptation Set shall have the same number M of Media Segments; Let R1, R2, . . . , RN be all the Representations within the Adaptation Set. Let Si, j, for j > 0, be the jth Media Segment in the ith Representation (i.e., Ri) if present, let Si, 0 be the Initialization Segment in the ith Representation, and if present, let Bi be the Bitstream Switching Segment in the ith Representation. The sequence of any Initialization Segment, if present, in the Adaptation Set, with, if Bitstream Switching Segments are present, Bi(1), Si(1), 1, Bi(2), Si(2),2, . . . , Bi(k), Si(k), k, . . . , Bi(M), Si(M), M else Si(1), 1, Si(2), 2, . . . , Si(k), k, . . . , Si(M), M, wherein any i(k) for all k values in the range of 1 to M, respectively, is an integer value in the range of 1 to N, results in a "conforming Segment sequence" as defined in 4.5.3 with the media format as specified in the @mimeType attribute. More detailed rules may be defined for specific media formats |
| @startWithSAP | O | when present and greater than 0, specifies that in the associated Representations, each Media Segment starts with a SAP of type less than or equal to the value of this attribute value in each media stream. A Media Segment starts with a SAP in a media stream if the stream contains a SAP in that Media Segment, $I_{SAU}$ is the index of the first access unit that follows $I_{SAP}$ and ISAP is contained in the Media Segment. |
| AdaptationSet | 0 . . . N | specifies an Adaptation Set. At least one Adaptation Set shall be present in each Period. However, the actual element may be present only in a remote element if xlink is in use, For more details see 5.5.3. |
| @minBandwidth | O | specifies the minimum @bandwidth value in all Representations in this Adaptation Set. This value has the same units as the @bandwidth attribute. |
| @maxBandwidth | O | specifies the maximum @bandwidth value in all Representations in this Adaptation Set. This value has the same units as the @bandwidth attribute. |

TABLE 2-continued

MPD tags
Main tags:

| | | |
|---|---|---|
| @width | O | specifies the horizontal visual presentation size of the video media type on a grid determined by the @sar attribute.<br>In the absence of @sar width and height are specified as if the value of @sar were "1:1"<br>NOTE The visual presentation size of the video is equal to the number of horizontal and vertical samples used for presentation after encoded samples are cropped in response to encoded cropping parameters, "overscan" signaling, or "pan/scan" display parameters, e.g. SEI messages. |
| @height | O | specifies the vertical visual presentation size of the video media type, on a grid determined by the @sar attribute. |
| @sar | O | specifies the sample aspect ratio of the video media component type, in the form of a string consisting of two integers separated by ':', e.g., "10:11". The first number specifies the horizontal size of the encoded video pixels (samples) in arbitrary units. The second number specifies the vertical size of the encoded video pixels (samples) in same units as the horizontal size. |
| @frameRate | O | specifies the output frame rate (or in the case of interlaced, half the output field rate) of the video media type in the Representation. If the frame or field rate is varying, the value is the average frame or half the average field rate field rate over the entire duration of the Representation.<br>The value is coded as a string, either containing two integers separated by a "/", ("F/D"), or a single integer "F". The frame rate is the division F/D, or F, respectively, per second (i.e. the default value of D is "1"). |
| @mimeType | M | specifies the MIME type of the concatenation of the Initialization Segment, if present, and all consecutive Media Segments in the Representation. |
| @codecs | M | specifies the codecs present within the Representation. The codec parameters shall also include the profile and level information where applicable.<br>The contents of this attribute shall conform to either the simp-list or fancy-list productions of RFC6381, Section 3.2, without the enclosing DQUOTE characters. The codec identifier for the Representation's media format, mapped into the name space for codecs as specified in RFC6381, Section 3.3, shall be used. |
| @indexRange | O | specifies the byte range that contains the Segment Index in all Media Segments of the Representation.<br>The byte range shall be expressed and formatted as a byte-range-spec as defined in RFC 2616, Clause 14.35.1. It is restricted to a single expression identifying a contiguous range of bytes. |

TABLE 2-continued

MPD tags
Main tags:

| | | |
|---|---|---|
| @indexRangeExact | O | when set to 'true' specifies that for all Segments in the Representation, the data outside the prefix defined by @indexRange contains the data needed to access all access units of all media streams syntactically and semantically. This attribute shall not be present if @indexRange is absent. |
| RepresentationIndex | 0 . . . 1 | specifies the URL including a possible byte range for the Representation Index Segment. For the type definition refer to Table 14. |

Data location from SegmentInfo element
Additional tag (optional)-NOT YET EXISTING ONES-PROPOSED NEW ATTRIBUTES:

| | | |
|---|---|---|
| @automaticSwitching | O | when set to 'true', indicates that the representation with the highest decodable quality is the advantageous representation not to be changed over time. '' |
| @robustLayerDecoding | O | This parameter indicates that the a certain representation may not include all dependent representations at any time. This is, for example, to signal that SVC media content arrives at the client potentially at lesser quality than requested/expected by the client |
| @contentCharacteristic | O | specifies the characteristics of the content so that different mapping between video rate and quality such as a rate distortion relation. Such a metric may indicate the general characteristics or bitrate encoding demands for a certain type of content such as Soccer, News, Action Movie, Music, e.g. as 'high', 'medium', 'low' bitrate demands. In effect, this parameter could enable a simple video quality estimation further depending on bitrate, resolution and framerate. @qualityranking may be included is this parameter |

That is, the MPD 46 of FIG. 3 could have the parameters @bandwidth, @minBufferTime and, optionally, @qualityRanking for each available version (representation).

As seen above, it would even be possible that the MPD 46 merely comprises the first two of these parameters per version, namely @bandwidth and @minBufferTim.

An example of a MPD is shown in Listing 1 below. The example may correspond to a specific profile of the DASH standard [3] as identified, for example, by the profile attribute. The media presentation time is specified in 3256 seconds, the minimum buffer time in 1.2 seconds. The URLs (Uniform Resource Locator) of the segments of two representations are given where one representation necessitates 64 KB or 32 KB bandwidth and where the URL of the segments are created by concatenating one of the two alternative BaseURLs and the SegmentURLs included in the respective SegmentList elements of each representation. The duration of the segments is given by the duration attribute in the SegmentList element.

```
<?xml version="1.0" encoding="UTF-8"?>
<MPD
...
    mediaPresentationDuration="PT3256S"
    minBufferTime="PT1.2S"
    profiles="urn:mpeg:mpegB:profile:dash:isoff-live">
    <BaseURL>http://cdn1.example.com/</BaseURL>
    <BaseURL>http://cdn2.example.com/</BaseURL>
        <Representation bandwidth="64000">
            <SegmentList duration=10>
                <SegmentURL media="seg1-1.mp4"/ >
                < SegmentURL media="seg1-2.mp4"/ >
                < SegmentURL media="seg1-3.mp4"/>
                ...
            </SegmentList>
        </Representation>
        <Representation bandwidth="32000">
            <SegmentList>
                < SegmentURL media="seg2-1.mp4"/>
                < SegmentURL media="seg2-2.mp4"/>
                < SegmentURL media="seg2-3.mp4"/ >
                ...
```

-continued

```
    </SegmentList>
  </Representation>
  ...
</MPD>
```

Listing 1 Example for a Media Packet Description (MPD) for Video Segments with Two Different Representations Further, the implementation of the embodiment of FIG. 3 outlined in more detail below could be embedded within an LTE system. That is, the base station 32 or base stations 32 and 38 and the radio resource manager 30 could be part of an LTE system.

For LTE, different improvements have been introduced. Moving to Orthogonal Frequency-Division Multiple Access (OFDMA) in combination with Multiple-Input Multiple-Output (MIMO) enhancements and migration from circuit-switch to packet-switch networks has resulted in a mobile network that achieves peak throughputs up to 150/300 Mbps for LTE Rel. 8 with 2×2/4×4 MIMO. One of LTE's key achievements is the fulfillment of the ITU-R [15] latency requirements with a delay below 50 ms on the control plane and below 5 ms on the user plane, essential for a low end-to-end delay.

LTE implements fast retransmission mechanisms: automatic repeat requests (ARQ) and hybrid ARQ (HARQ) mechanisms at physical layer (PHY) and medium access control (MAC) layers, which necessitates fast re-ordering at the receiver. Thus, additional jitter and delay may be introduced by reorder buffering resulting in performance degradation for real-time TCP services, especially if HTTP/TCP video services are not identified and run over-the-top as best-effort service. TCP performance during handover in LTE is evaluated in [12] and it is shown that special packet forwarding techniques and packet reordering are necessitated to achieve high TCP performance.

In addition, LTE introduces decentralized scheduling and multi-user radio resource management (RRM) at the base station, the evolved NodeB (eNB). The decentralized approach necessitates the design of new robust cross-layer scheduling algorithms with QoS support in order to realize end-to-end QoS for different traffic services, such as HTTP/TCP live streaming.

The RRM entity, i.e., 30, is responsible for radio resource management which includes assigning resources to UEs, i.e., 34, on a short-term time frame, also referred to as scheduling, as well as long-term resource assignment, which works on a longer time frame and depends on varies parameters, e.g. UE feedback, user service demands etc. The resources to be assigned are taken from the time, frequency, space—grid used in LTE which is based on MIMO OFDMA. The amount of resources depends on the LTE parameters bandwidth, FDD or TDD mode, and MIMO mode to be used.

Figure 1:
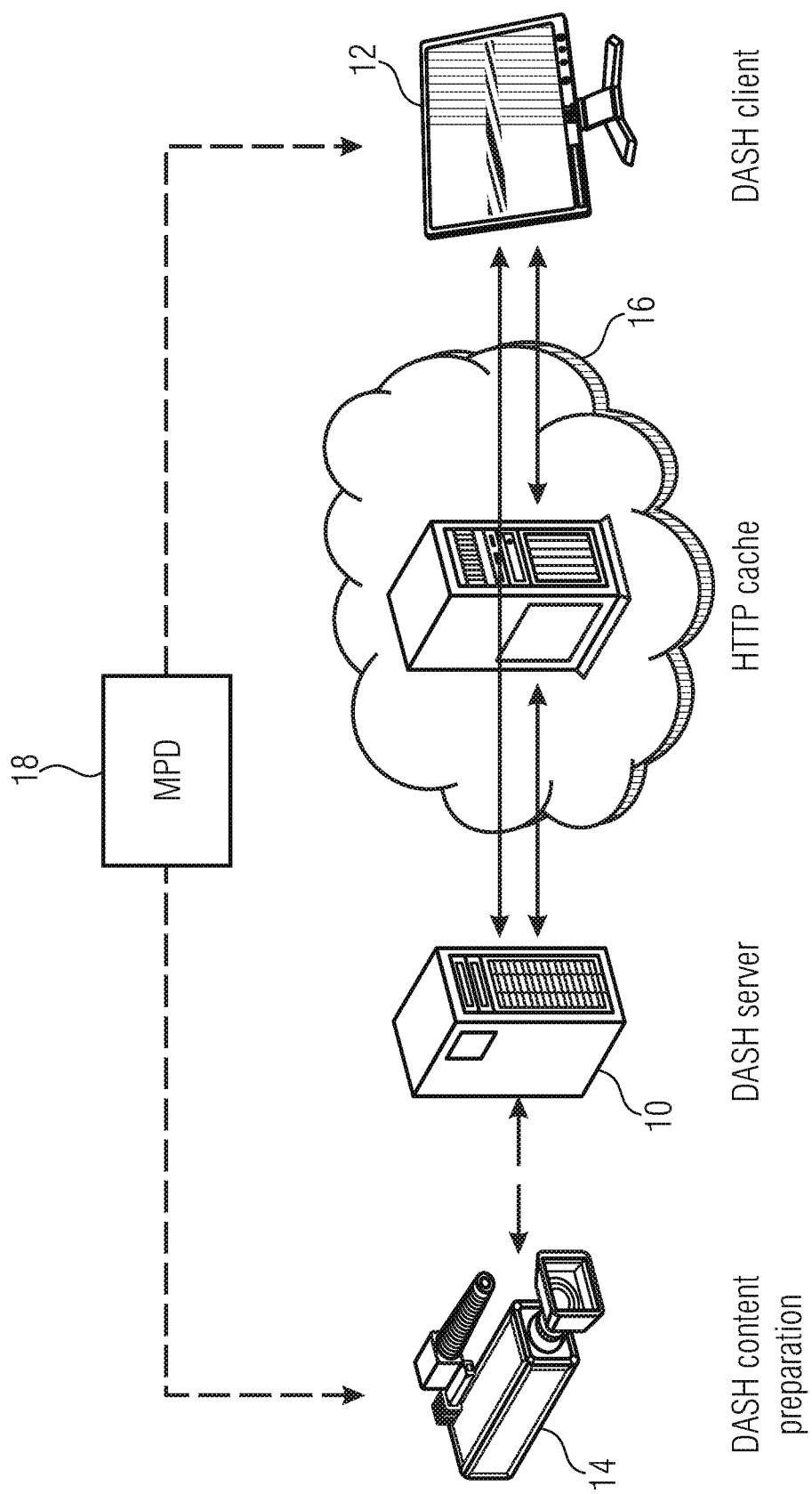
FIG. 1 shows a block diagram of an example of DASH architecture.
Figure 2:
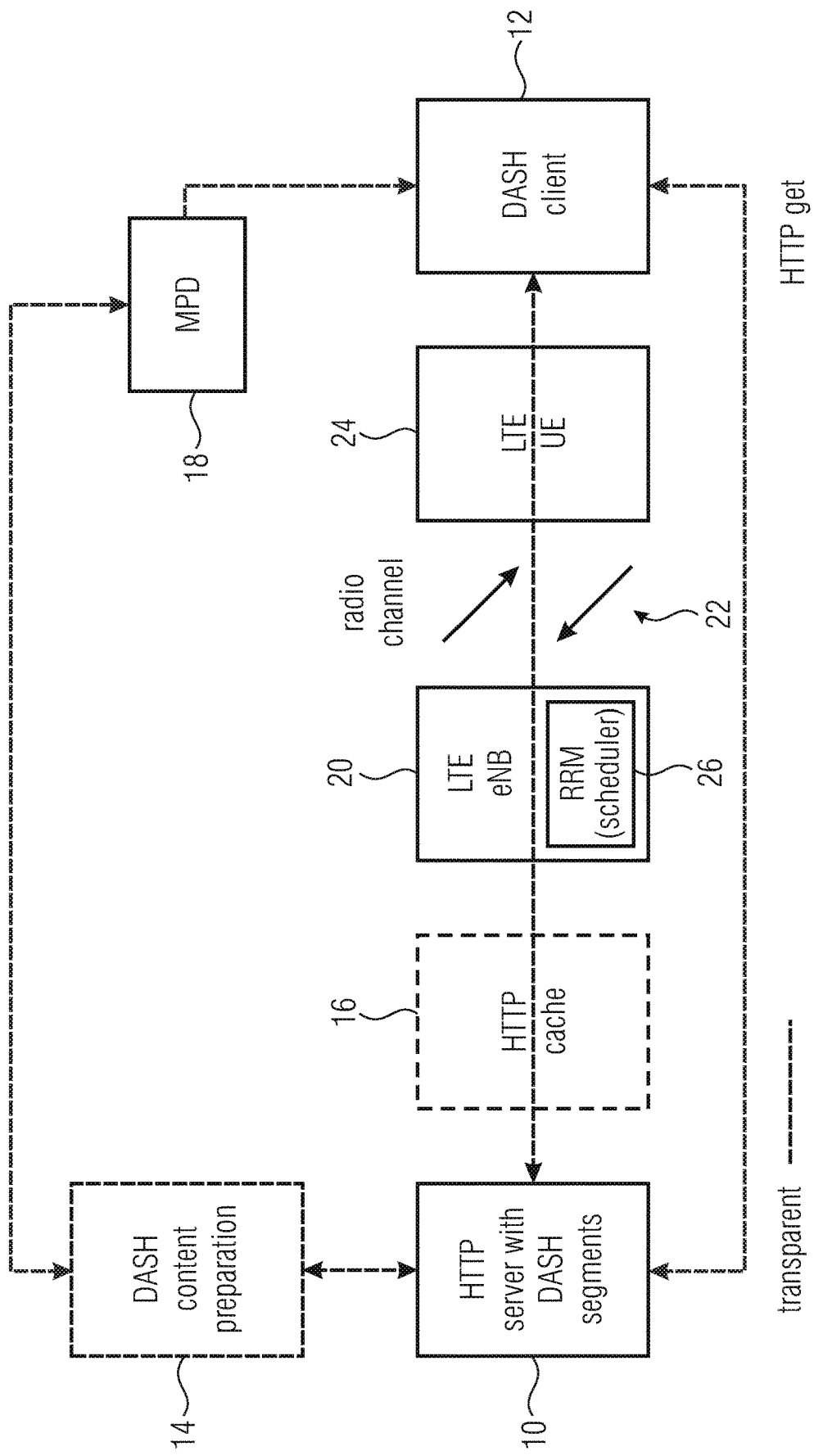
FIG. 2 shows a block diagram illustrating the current deployment architecture for DASH in LTE networks, wherein the solid white boxes indicate devices specified in the DASH standard, while the dashed white boxes are conceptual or transparent.
Figure 5:
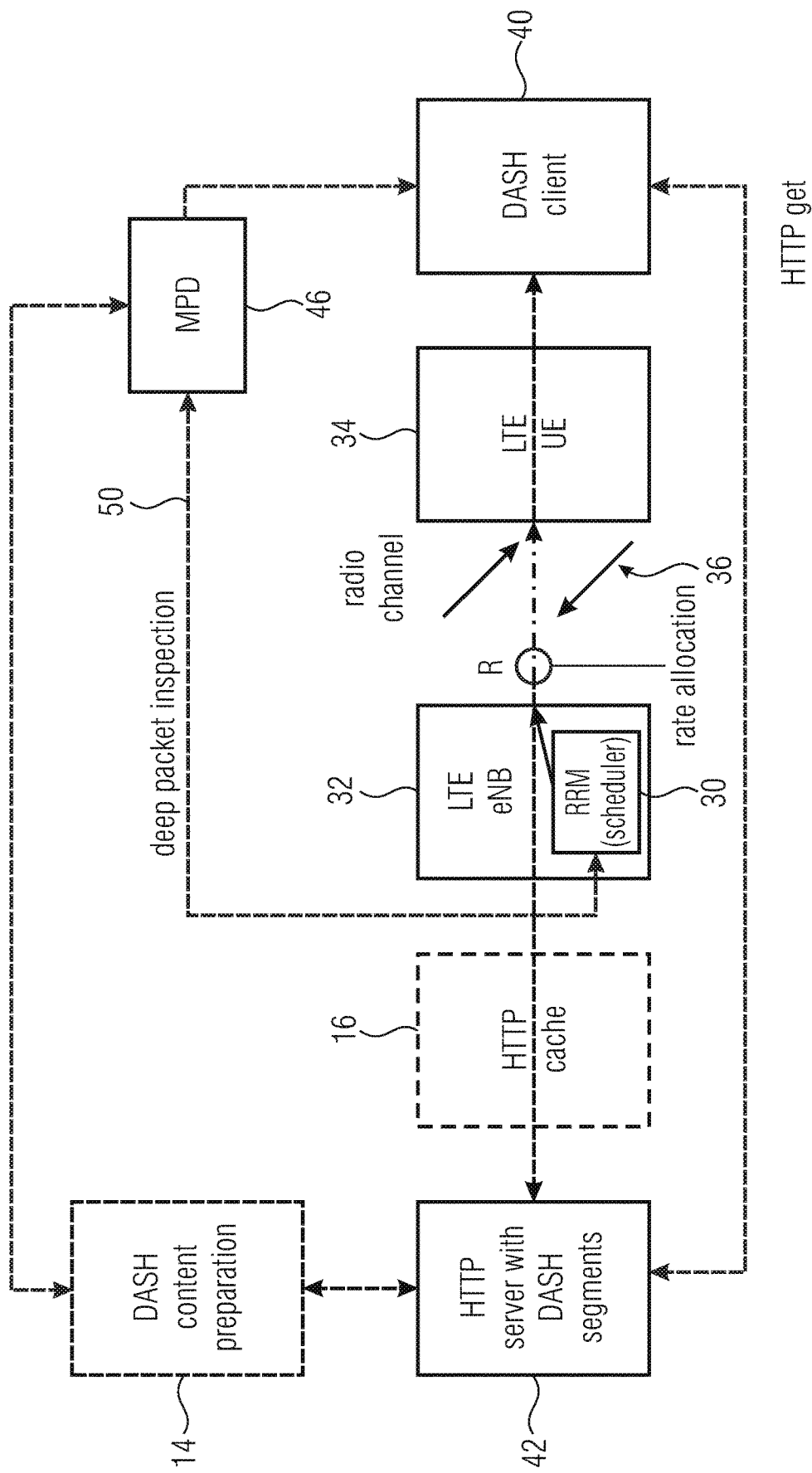
FIG. 5 shows a diagram of a possible implementation of a first embodiment of the radio resource manager of FIG. 3.

When implementing the embodiment of FIG. 3 with using DASH for streaming the media content and embedding the radio resource manager 30 into an LTE system, the result thereof may be depicted as shown in FIG. 5. In order to ease the understanding as to how the embodiment of FIG. 5 implements the functionalities of the elements shown in FIG. 3, the reference signs of FIG. 3 have been reused in FIG. 5 and the explanations and description of these elements presented above with respect to FIG. 3 shall equally apply for FIG. 5. This, in turn, also means that the RRM 30 needs not to be physically contained within the base station 32. On the other hand, some reference signs of FIG. 2 have been re-used in FIG. 5 whenever corresponding reference signs were missing in FIG. 3.

Accordingly, client 40 is shown to be communicatively connected to server 42 such that the data traffic runs through the HDTP Cache 16 such as the internet, as far as the data traffic portion beyond the base station 32 is concerned. Moreover, the DASH content preparation stage 14 is shown from which the content of the media presentation description 46 may originally stem.

In describing the mode of operation of the implementation example of FIG. 5, they may be called radio resource management using DASH over LTE. As a possible representation of the versions of the media content, a VC may be used. As the implementation of FIG. 5 follows the embodiment of FIG. 3, the functionality of the RRM 30 of FIG. 5 realizes a passive signaling in order to more efficiently assign the radio resource to the clients.

In particular, the DASH client 40 issues a HTTP request for a video segment, server 42. The RRM unit 30 inspects the MPD 46 requested by the particular user or client 40 using deep packet inspection 50. Depending on the @bandwidth and @minBufferTime tag defined within the MPD 46, the scheduler and long-term RRM 30 realizes the requested bandwidth for the given @minBufferTime. If the LTE's PHY data pipe, however, does not support the requested bandwidth, the RRM 30 automatically tries to assure the next lower bandwidth specified for the AVC video segment of the media content within the MPD 46 or 'sidx'-Box and MPD. The DASH client 40 adjusts its HTTP get requests 52 according to the data rate restriction of the LTE's RRM 30, e.g. by sending a HTTP get 52 to a service with lower rate requirements as listed in the MPD 46.

This assures:
1. Guaranteed service delivery of the HTTP video stream
2. Prevents from over provisioning resources to a given user which would try to get as many resources as possible
3. Hence 2, allows to save resources for other users within the LTE cell for a given time-frequency-space grid. This reduces the variance in IP throughput and thus allows a smooth service delivery of various traffic mixes to multiple users.
4. TCP will optimally adapt to the data rate assigned by the LTE system Since radio resources in cellular systems are shared among all users attached to the same eNB, the amount of resources assigned to one user can have an impact of how many resources are available for other users. Thus, the RRM 30 can choose to reduce the amount of resources for one user, even if this user has very good channel conditions, in favor of supporting other users. Taking into account bitrate and content characteristics (type of content e.g. movie, news, sports) or @qualityRanking, an overall video quality optimization over all users in the cell can be carried out.

Usage of trick modes (e.g. fast forward, fast rewind, jump) can be identified by RRM 30 by sequence of chunks requested by the client 40. After trick mode usage, the client has to perform new rebuffering for @minBufferTime/new buffering detection by DPI. DPI stands for Deep Packet Inspection. This implies that the base station scheduler looks into the content of the IP packets and forms its decisions based on its inspections. Traditionally, the RRM operates on the MAC layer and does not look into the IP layer, as proposed by the ISO-OSI model.

With respect to the just-described implementation of the embodiment of FIG. 3 by the details described with respect to FIG. 5, it is noted that the various aspects in which FIG. 5 concretizes the embodiment of FIG. 3 may be transferred on to FIG. 3 individually. This is true, for example, for the use of the TCP protocol for the data traffic, the use of the LTE system for defining the respective functionality of manager 30, base station 32 and user entity 34 and the DASH streaming framework defining, at least partially the content of the MPD 46 and the functionality of server 42 and client 40.

In accordance with the embodiments of FIGS. 3 to 5, the video resource manager 30 directly dictated the rate allocation to the individual user entities and their clients 40, respectively, as illustrated in FIG. 5 at the "R" based on an evaluation of the media presentation description within the data traffic from the server 42 to the client 40 and assigning the communication resources of the base station 32 to the user entities accordingly. In accordance with the embodiments described below, this functionality of the resource manager 30 is optional.

Figure 6:
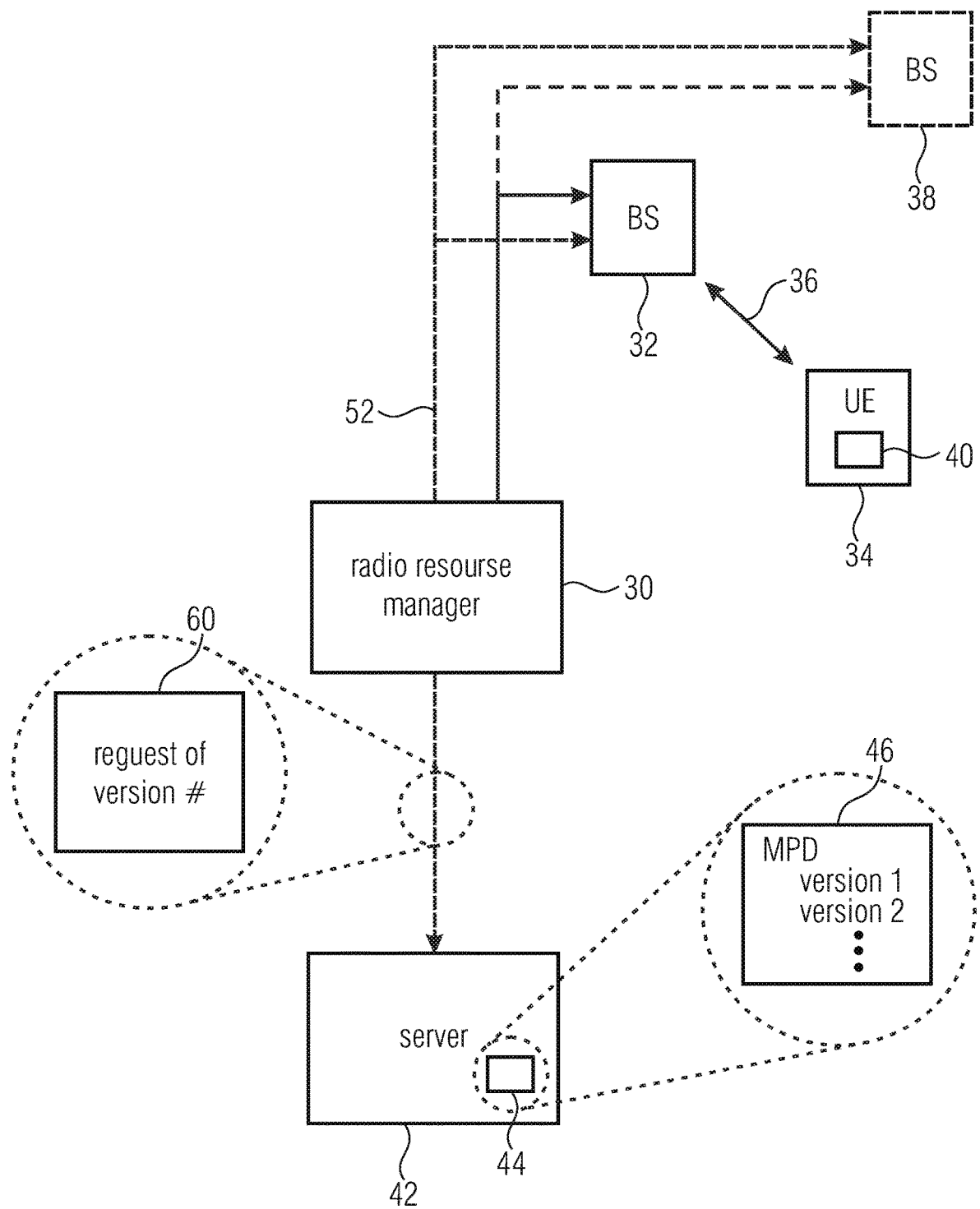
FIG. 6 shows a block diagram of a further exemplary radio resource environment including a radio resource manager, based on which different embodiments of the radio resource manager according to the present invention are described.

FIG. 6 shows a radio resource manager in accordance with a further embodiment of the present invention. As just said, with respect to the functionality and interconnection of the elements commonly shown in FIGS. 3 and 6, the description presented above with respect to FIG. 3 remains the same. That is, the radio resource manager 30 assigns the communication resources of base station 32 to the user entities 34 in the way as described above, except for the dependency of this assignment on the media presentation description 46 being optional. Further, in accordance with the embodiment of FIG. 6, the radio resource manager 30 is arranged such that the data traffic between client 40 and server 42 runs via the radio resource manager 30 so that the latter is able to influence this data traffic as described below.

In particular, in accordance with the embodiment of FIG. 6, the radio resource manager 30 is additionally, i.e., in addition to the functionality described above with respect to FIG. 3, configured to inspect the media presentation description 46 describing the versions of the media content 44 of differing bandwidths, within the data traffic from the server 42 to client 40 operating at the user entity 34, as well as a media request 60 from the client 40 to the server 42, the media request 60 requesting a wanted version of the media content 44. Based on both inspections, resource manager 30 decides, depending on information describing the current resource situation at least with respect to the user entity 34 which sent the request 60, and the media presentation description addressed to the user entity 34: 1) to forward the media request 60 to the server 42 (unmodified), or, alternatively, 2) to cause that the media request 60 does not lead to the wanted version of the media content 44 being sent to the client 40. For example, the resource manager 30 could perform the causing via 2a) modifying the media request 60 to the extent that the modified media request requests a version of the media content 44 of less bandwidth or 2b) intercepting the media request 44 and emulating or instructing the server 42 to send back a non-availability response from the server 42 to the user entity 34 or client 40. Alternatively, a response on low bandwidth may be performed by RRM 30, or any other feedback may be caused to be performed by the server so as to instruct the client to change its request accordingly.

This means the following. As described above with respect to FIG. 3, the radio resource manager 30 has access to the current resource situation information. In particular, the radio resource manager 30 has access to this current resource situation information not only with respect to user entity 34, but for all user entities. Based on this information, the radio resource manager 30 knows about the current strain put onto the communication resources of base station 32 and knows about the communication resources available for the user entity 34. Further, the radio resource manager 30 has access to the media presentation description 46 and inspecting the same, the radio resource manager 30 knows about alternative versions of the media content 44 which client 40 on user entity 34 seeks to download.

Based on the overall information, i.e., the current resource situation information and the media presentation description 46, the radio resource manager 30 is able to decide as to whether the current load which the base station 32 faces, is low enough in order to justify to just forward the media request 60 to server 42 in an unmodified version. However, if the radio resource manager 30 determines, from the current resource situation information and the media presentation description, that part of the bandwidth necessitated for the currently requested version of media content 44 should not be transferred from the other user entities, because for example, the remaining bandwidth is not even sufficient to provide all these other user entities' clients with the lowest bandwidth version of their requested media content, the radio resource manager 30 decides to modify the media request 60 to the extent that the modified media request requests a lower bandwidth version. Accordingly, the server 42 will answer to this modified request by sending the lower bandwidth version to client 40 which is able to handle the case that the answer to its request is actually the answer to a request for a lower bandwidth version.

For example, the lower bandwidth version differs from the originally wanted version of the media content 44 merely by the omission of certain media stream parts, the omission of which does not disturb the media decoder at the user entity 34 responsible for reproducing the media content. That is, the lower bandwidth version could be a lower information level of a scalable media content, or the lower bandwidth version be another media file, which is, however, coded using the same coding scheme.

Instead of modifying the media request 60, it could be possible that the server 42 intercepts the media request 60 and emulates or instructs the server to send back a non-availability response from the server 42 to the client 40. In both cases, client 40 will receive an answer from the server 42 according to which the wanted version is not available at the server although indicated in the media presentation description 46. Although client 40 is free to react to this answer in any manner, one reasonable way of reaction would involve the client 40 newly sending another request to server 42 with a new request, however, requesting a lower bandwidth version of the media content 44 from server 42, thereby effectively resulting in the same situation as resulting from the above-mentioned modification of the media request, namely the server 42 sending back to client 40 the lower bandwidth version.

Thus, a first step which could be involved in the radio resource manager's decision among the above-identified three decision options 1) to 2b) could be to check as to whether there is any lower bandwidth version of the media content 44 available or not. This check is performed based on the media presentation description 46. A second step could involve checking the current resource situation information, as to whether any of options 2a) or 2b) is advisable or not.

A further extension or abstraction of the embodiment of FIG. 6 is described in the following with respect to FIG. 7.

FIG. 7 shows an embodiment of the user entity 34 in more detail. In accordance with the embodiment described below with respect to FIG. 7, the additional radio resource managers functionality with respect to the handling, i.e., forwarding, modification and/or interception, of media request 60, is displaced from the radio resource manager 30 along the data traffic between server 42 and client 40 to the user entities domain 34 and, in particular, somewhere between a user entities transmission stage 70 and client 40. It is to be understood, however, that this is also merely an example and that this functionality could also be assumed by another entity, positioned elsewhere.

In particular, FIG. 7 shows the user entity 34 as comprising one or several antennas 72, a transceiver stage 70, a resource manager 74, the client 40, a media reproducer 76 and hardware for actually presenting the media to the user including, for example, a display 78 and one or several speakers 80. All these elements are serially connected to each other in the order of their mentioning. The transmission stage 70 is responsible for performing the communication with the base station 32 so that the respective data path is transparent for the subsequent or higher layer applications such as those represented by client 40. The transceiver stage 70 performs, for example, the (de)multiplexing such as OFDM (de)multiplexing, time division (de)multiplexing, reception quality feedback to the base station 32, channel estimation and so forth. Moreover, transceiver stage 70 is able to send requests to base station 32 requesting an increase of bandwidth to be assigned to the respective user entity 34 with sending such requests being, for example, triggered by any of the subsequent modules such as client 40. The transceiver stage 70 may be implemented in hardware or a combination of hardware, programmable hardware and/or software or any combination thereof.

The resource manager 74 is connected between the transceiver stage 70 and client 40 and is, accordingly, able to perform the above-explained radio resource manager's functionality with respect to the modification, forwarding and/or interception of media requests from the client 40 to server 42 via the wireless interface represented by transceiver stage 70 and antenna 72, respectively. That is, resource manager 74 has access to current resource situation information via transceiver stage 70. In particular, transceiver stage 70 is able to inform the resource manager 74 about a currently available transmission rate resulting from the current assignment of communication resources to the user entities by radio resource manager 30 (see FIG. 6). Further, resource manager 74 is able to inspect the media presentation description 46 within the data traffic from the server 42 to client 40. By inspecting the media request 60 from client 40 to server 42, the resource manager 74 is, thus, able to perform the same decision as described above with respect to FIG. 6, namely the decision among the above-discussed decision options of forwarding the media request, or alternatively, modifying the media request or intercepting the media request with emulating or instructing the server 42 to send back a non-availability response. Naturally, resource manager 74 has merely access to a proper subset of the current resource situation information compared to radio resource manager 30. However, nevertheless, resource manager 74 may avoid the client 40 requesting versions of media content 44 which, when considering the resource situation at the base station 32 at full, is not fair with regard to the other user's server base station 32 or may not be frequently stream-able by the client 40.

With regard to the embodiments of FIGS. 6 and 7, it should be noted that the resource manager 30 and 74, respectively, may be configured to merely switch between options 1) and 2) or 1) and 3). Moreover, with regard to the resource manager 74, it is noted that same may be configured to exploit, as a part of the current resource situation information, long term communication resource guarantees sent by radio resource manager 30 to user entity 34.

Thus, FIGS. 6 and 7 reveal a resource manager configured to inspect a media presentation description 46 describing versions of a media content 44 of differing bandwidths, within a data traffic from a server 42 to a client 40 operating at a user entity 34; inspect a media request 60 from the client 40 to the server 42, requesting a wanted version of the media content 44; and decide, depending on a current resource situation information and the media presentation description 46, to (1) forward the media request 60 to the server, or, alternatively, to (2) modify the media request 60 to the extent that the modified media request requests a version of the media content 44 of less bandwidth, or to intercept the media request 60 and emulate, or instruct the server 42 to send back, a non-availability response from the server 42 to the client 40.

Similar to the embodiment described above with respect to FIGS. 3 to 5, in the following possible implementations of the embodiments of FIGS. 6 and 7 are described in the following. That is, these possible implementations assume the wireless communication system to be an LTE system and the streaming of the media content uses DASH. In the same manner as FIG. 5 in relation to FIG. 3, FIG. 8 reuses the previously used reference signs and accordingly the description of the functionality of the elements of FIGS. 6 and 7 shall equally apply to the elements shown in FIG. 8 with the same reference signs.

In combination with DASH, the LTE RRM 30 can inspect the MPD 46 requested by all attached UEs 34. If a given UE has a good radio channel and issues a high bandwidth request 60, the LTE RRM 30 can send a status code trigger, a so-called status code injections, such that the HTTP DASH server 42 transmits a W3C HTTP status code 80 to indicate that this bandwidth is not available. Possible W3C HTTP status codes are listed below. Thus, the LTE RRM 30 can force a UE 34 to request a lower data rate without direct signaling to the UE 34. This saves resources used for signaling which can be used for data instead, e.g. these resources can be scheduled to other Ues 34. The UE's TCP/IP service automatically adapts to the assigned rate by the eNB RRM algorithms, which may be taken from the MPD @bandwidth tag.

The eNB RRM unit 30 inspects the MPD 46 requested by a UE 34. In addition, it may take information from the mobility management entity (MME) not shown in FIG. 8. Depending on the user profile, e.g. moving speed, handover statistics, and requested MPD, the RRM entity 30 can enforce a higher or lower video quality by indirect signaling through W3C HTTP status codes (see, for example, http://www.w3.org/Protocols/rfc2616/rfc2616-sec10.html).

Figure 8:
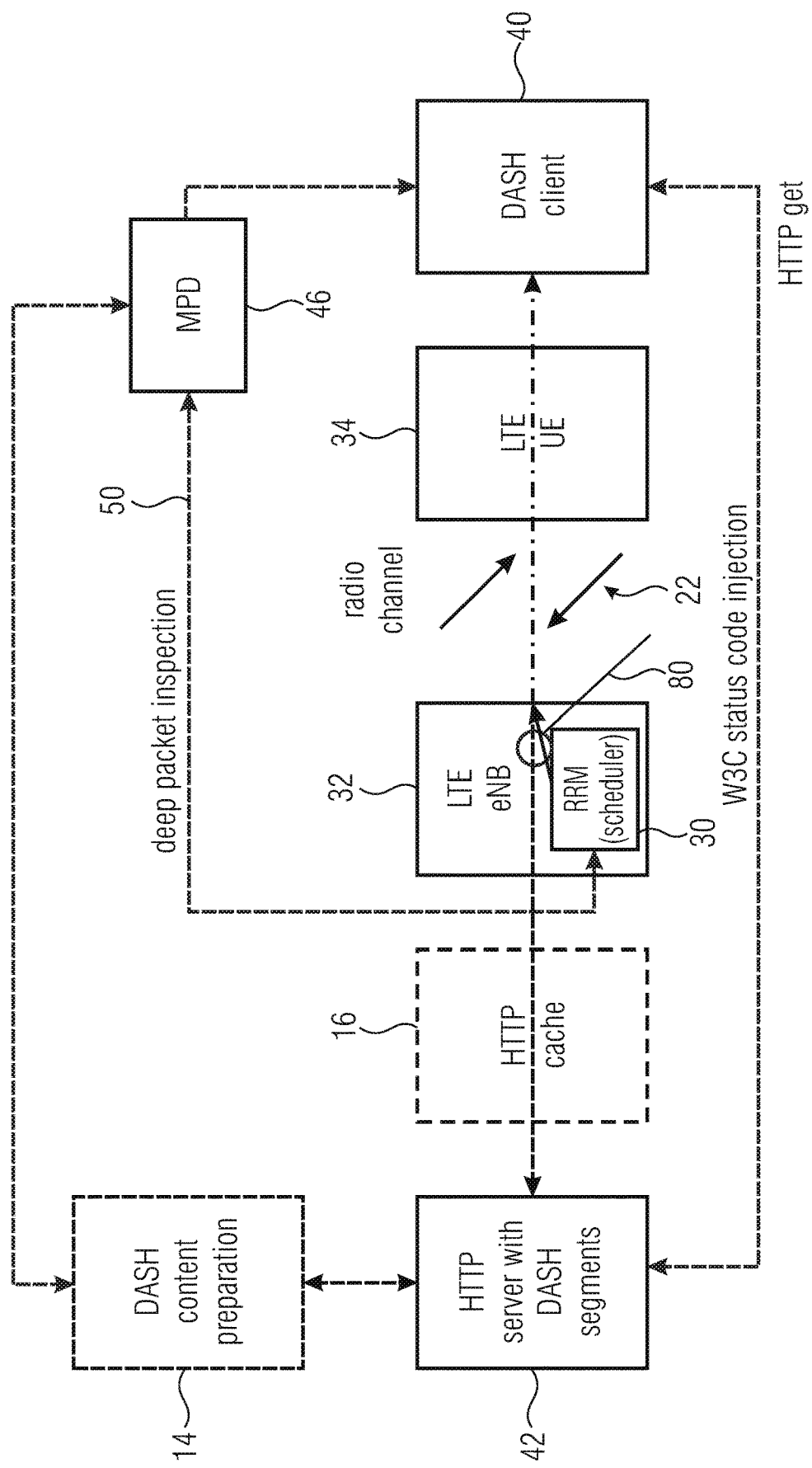
FIG. 8 shows a diagram of a possible implementation of an embodiment of the radio resource manager of FIG. 6.

In the above description of FIG. 8, it was assumed that the versions of the media content 44 available on server 42 are available separately, i.e., in non-scalable versions at, however, different information content However, the above description of FIG. 8 is easily transferable to the case where the available different bandwidth versions of the media content 44 are available in the form of one media stream which, however, is coded in a scalable manner such as an SVC or MVC stream. In this case, the mode of operation of the radio resource manager 30 of FIG. 8 may be described as follows.

The LTE RRM entity 30 inspects the MPD 46 requested by the particular user using deep packet inspection 50. Depending on the available radio resources, the LTE scheduler 30 evaluates the bandwidth amount requested by a given user. If the requested bandwidth exceeds the available bandwidth for a given SVC or MVC layer, the LTE RRM entity 30 can trigger the HTTP DASH server 42 to send a W3C HTTP status code to that user 40. The SVC/MVC decoder 70 within the DASH client 40 receives the error status code and automatically requests a lower SVC or MVC layer which necessitates less bandwidth and thus saves radio resources on the LTE system.

The radio resources can be limited due to bad channel quality of a given user or due to the amount of other users requesting resources. The LTE RRM 30 can force users with good channel quality to sacrifices resources which can then be assigned to users suffering under a worse channel quality.

Depending on priority policy within the LTE RRM 30, the RRM 30 can use the MPD 46 to assure service delivery of the lowest SVC/MVC layer, the base layer before allowing HTTP requests of higher SVC/MVC layers through triggering W3C HTTP status codes 80.

The HTTP DASH server 42 may transmit one of the following W3C HTTP status codes:
- 404 Not Found
- 466 Streaming Rate Exceeded (tbs. in RFC)
- 503 Service Unavailable
- 509 Bandwidth Limit Exceeded Before stepping forward to describe the next embodiment of the present application, it should be noted that the general structure of a user entity 34 as shown in FIG. 7 is, generally, also applicable to all the other embodiments when removing the resource manager 74. The media reproducer 76 may be a media decoder able to decode the media content 44 received from server 42. Client 40 and media reproducer 76 may be coupled to each other and communicate to each other. The media reproducer may even be partially integrated within the client 40.

According to the embodiment of FIGS. 3 to 5, the communication resources assigned to the individual user entities and, in particular, the assignment itself was adapted depending on a result of the inspection of the media presentation description. In accordance with the subsequent embodiments of FIGS. 6 to 8, the part of the data traffic between client and server, which pertains the media requests sent from the client to the server, has been influenced in order to achieve a more efficient exploitation of the base stations, communication resources or to obtain a more fair distribution of the base stations communication resources to the user entities. In accordance with both embodiments, radio resource manager 30 is able to also take LTE closed-loop feedback on the physical layer into account in accordance with the subsequently explained implementation example. That is, the following implementation possibility is meant to denote a more detailed explanation of the implementation examples of FIGS. 5 and 8. That is, in accordance with the present implementation possibility, the radio resource management (RRM) scheduler 30 takes the LTE closed-loop feedback from the physical layer of LTE into account for the decision at the LTE EMB 32 to decide which video representation or version of the media content 44 is best suited for the DASH client. Again, in accordance with the embodiment of FIG. 3 and the implementation of FIG. 5, the resource manager 30 seeks to obtain the download of the most suitable representation or version indirectly by accordingly assigning the communication resources to the respective clients 40 for which the respective representation is dedicated. While in accordance with the embodiment of FIG. 6 and the implementation of FIG. 8, the radio resource manager 30 seeks to reach the download of the best suitable representation by the client by appropriately influencing the clients media requests as described above.

The RRM unit 30 takes, for example, the LTE closed-loop feedback into account when selecting between different representations of AVC segments of media content 44, (H.264/)SVC layers or when deciding between 2D or 3D video delivery in case of (H.264/)MVC. The LTE eNB RRM 30 may inspect the MPD 46 to adjust RRM parameters to the parameters specified for the particular video segments in case of FIGS. 3 and 5 and to influence the HTTP set requests in case of FIGS. 6 and 8.

The UE 40 may signal quality metrics of the radio channel, so-called channel quality feedback (CQI), as well as buffer levels of video buffer, see Table 3, to the eNBs RRM entity 30. The feedback information may be reduced by sending a peak to average ratio (PAR), e.g. a peak to average rate ratio (PARR) indicator on a periodic or aperiodic time basis. With this information, the eNBs RRM entity 30 can perform multi-user scheduling with buffer awareness for HTTP streaming services.

The channel quality metric of the physical layer (PHY) data to be used for calculation of the PAR and/or PARR may involve one or any combination of the following parameters as defined within the LTE standard:
- CQI: Channel Quality Indication
- RI: Rank Indicator
- PHY layer data rate
- PHY layer delay and jitter
- RSRP: Reference Signal Received Power
- RSSI: Received Signal Strength Indicator
- RSRQ: Reference Signal Receive Quality.

Here, RSRQ is defined by:

$$RSRQ = N \times \frac{RSRP}{RSSI}$$

where N is the number of resource blocks across which the RSSI value was measured.

As become clear from the above-outlined implementation detail, the radio resource managers 30 of FIGS. 3 and 6 could employ closed-loop feedback on the physical layer as sent out by the client's user entities to the base station, respectively. That means, the system on the sender side, can rely on the cross-layer information in order to improve the video transport, while the receiver side does not need any cross-layer interfaces. Furthermore, the RRM can estimate based on the channel, how much more bandwidth could be assigned to one or more clients in order to improve its video quality.

For example, the RRM 30 of FIGS. 3 and 6, could be configured to determine an average bandwidth assigned to the user entities and predict from the determined average bandwidth as to which version of a media content 44 out of the media presentation description 46, is currently downloaded by the respective clients such as 44. This forms a simple way to find out the client's state. For each client, RRM 30 merely has to identify the average bandwidth the respective client 40 is receiving, and to predict from that which media rate it may have selected.

Moreover, as outlined above, it could be possible that the radio resource manager 30 tries to derive media buffering state information, i.e., information indicating a kind of buffering state of the client operating at the respective user entity. In other words, the radio resource manager 30 could exploit the information concerning the user entities 34 reception condition in order to ascertain as to whether the respective user entity is actually able to effectively correctly receive the assigned bandwidth. Using this information, the radio resource manager 30 is able to emulate the buffering state of the clients operating at the user entities by taking the minimum bandwidth information into account which is accessible for the radio resource manager 30 from the media presentation description 46 as described above. By this measure, the radio resource manager 30 is able to emulate or simulate the buffering states of the clients 40 running on the user entities 34 and to deduce client's behavior and client's priorities therefrom. For example, clients 40 for which the simulation reveals that the buffer runs out of media data, may be assigned a higher priority than clients 40 for which the simulation reveals that the buffer is full.

Naturally, the above-described possibility of simulating the buffering state or deriving media buffering state information from data traffic between the client 40 and the respective server is quite computationally complex and the accuracy obtained may be low.

Thus, the embodiment of FIG. 3 may be extended in a way according to which the radio resource manager 30 could also be configured to assign the communication resources of base station 32 to the user entities not only depending on the media presentation description 46 (in addition to the current resource situation information), but also depending on media buffering state information derived from channel quality feedback from the respective user entities at which the respective client or clients 40 operate. In particular, the derived media buffering state information may have been derived by the above-described simulation simulating a buffer of the respective user entities client 40 which is filled using the estimated effective bit rate of the respective user entity 34 and is entered at the presentation bandwidth indicated in the media presentation description 46.

Of course, the same may be said with regard to the radio resource manager 30 of FIG. 6. That is, the simulation result may be used by radio resource manager 30 in order to decide on the influence of the media requests of the user entities clients 40.

Further, also the embodiment of FIG. 7 may be extended in that sense. That is, the resource manager 74 of FIG. 7 may use the current resource situation information in order to simulate the client's media buffer state and to act accordingly in order to protect, as part of the wireless communication community, the base stations communication resources against two greedy clients 40.

However, as just-described, the "simulation" of the client's buffering state may be subject of a high degree of uncertainty and, accordingly, embodiments of FIGS. 3 and 6 may be amended in a way so that the radio resource manager 30 does not have to derive or simulate the buffering state of the user entities client but, instead, the radio resource manager 30 exploits explicit media buffering state information within a data traffic from the client 40. Based on the media presentation description 46 and the media buffering state information within the data traffic from the client 40 to server 42, the radio resource manager 30 could perform the communication resource assignment more accurately because of a more accurate buffering state estimation. In the media buffering state information within the data traffic from the client 40, the latter would explicitly indicate the current media buffering state, i.e. the current media buffer's fill level. A concrete implementation possibility is described in more detail below.

In accordance with an alternative embodiment, however, the radio resource manager 30 of FIG. 3 could alternatively perform the assignment of the communication resources of the base station 32 to the user entities depending on the media buffering state information within the data traffic from the client 40, but without dependency on the media presentation description 46. Merely surveying the media buffering states of several user entities clients 40 would enable the radio resource manager 30 to obtain a more fair distribution of the available base stations communication resources to the user entities.

Thus, FIG. 3 also relates to a radio resource manager 30 configured to assign communication resources of a base station 32 to user entities 34 depending on media buffering state information of a client operating at one of the user entities. The assignment of the communication resources to the user entities could be further performed based on one or more of the above mentioned possibilities such as the number of user entities 34 to which the communication resources of the base station (32) have to be assigned at an appropriate ratio, the a sort of communication data to be exchanged between the user entities and the base station, and so forth. Further, in assigning the communication resources to the user entities, the above mentioned setting could be adjusted depending on the media buffering state information, namely one or more of subcarriers, time slots, and a spatial coverage of the base stations cell. As just-described, the media buffering state information could be extracted from an explicit signalization within a data traffic from the client 40 to the server 42, or the media buffering state information could be derived by simulating a user entity's buffering state based on channel quality feedback from the user entity 34 to the base station 32.

The latter possibility also pertains the embodiments of FIGS. 6 and 7. Instead of using the current resource situation information and the media presentation description 46, the radio resource manager 30 and the resource manager 74 of FIGS. 6 and 8, respectively, could be configured to perform the decision with respect to the way of handling the media request 60 depending on the media buffering state information within the data traffic from the client 40.

Thus, the above embodiments also reveal a resource manager configured to inspect a media presentation description 46 describing versions of a media content 44 of differing bandwidths, within a data traffic from a server 42 to a client 40 operating at a user entity 34; inspect a media request 60 from the client 40 to the server 42, requesting a wanted version of the media content 44; receive media buffering state information from the client 40; and decide, depending on the media buffering state information and the media presentation description 46, to (1) forward the media request 60 to the server, or, alternatively, to (2) modify the media request 60 to the extent that the modified media request requests a version of the media content 44 of less bandwidth, or to intercept the media request 60 and emulate, or instruct the server 42 to send back, a non-availability response from the server 42 to the client 40.

A possible implementation for the embodiment as just-described as an alternative description of FIGS. 3, 6 and 7 is described in the following. This more detailed implementation could be entitled "DASH over LTE with closed-loop feedback over the top (OTT)". According to this implementation possibility, the client's BufferLevel is more precisely tracked at DPI-Scheduler 30 of the LTE system using direct client feedback over the top, e.g. quality metric such as BufferLevel as defined in Table 3.

TABLE 3

Quality Metrics for Buffer Levels

| Key | | | Type | Description |
|---|---|---|---|---|
| BufferLevel | | | List | List of buffer occupancy level measurements during playout at normal speed. |
| | Entry | | Object | One buffer level measurement. |
| | | T | Real Time | Time of the measurement of the buffer level. |
| | | Level | Integer | Level of the buffer in milliseconds. Indicates the playout duration for which media data of all active media components is available starting from the current playout time. |

Figure 9:
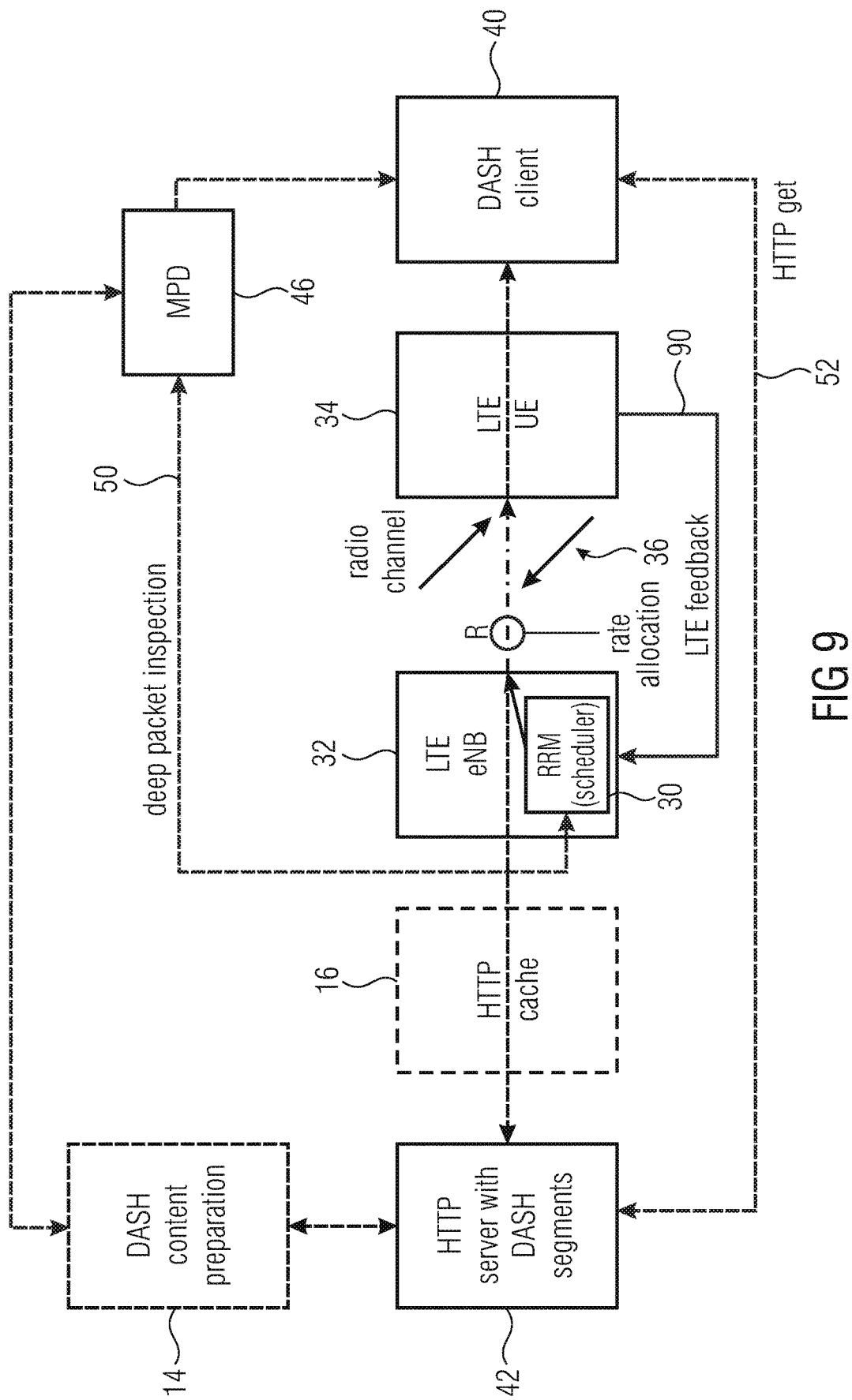
FIG. 9 shows a diagram of a possible implementation of an embodiment of the radio resource manager of FIGS. 3 and 6.

A possible resulting implementation is shown in FIG. 9. By comparing the implementation of FIG. 9 with the implementation possibility of FIG. 5, it is clear that the implementation of FIG. 5 has been extended by the LTE feedback 90 from the user entity 34 to the RRM 30 wherein the latter, i.e., the RRM 30, uses the LTE feedback, i.e., the channel quality feedback from the user entity 34, in order to perform a better communication resource rate allocation R.

In the following, with regard to the above embodiments, some possible implementation details with respect to the embodiment client 40 is described. As indicated above, the client's behavior is free to be set by the respective client issuer and, accordingly, the above embodiments did not put very much stain onto the description of the client's behavior. On the other hand, in order to increase a thorough understanding of the embodiments outlined above, a possible client behavior is described hereinafter by assuming that the client is a DASH client.

DASH, as defined in [ISO/IEC 23009-1], is a client-driven adaptation technology, but it does not specify client behavior and lets complete freedom for different implementations. However, the MPD and QM reported by the clients contain some important information from which the client behavior can be predicted. This important information refers to the signaling in:
@minBufferTime
@bandwidth
implicit allocated LTE client rate, measurable by client as TCP throughput, if enough data is available
client adapts to TCP throughput depending on intended play-out delay/potential outages
QM, reported by the client
Bitstream switching flag The goal of DASH client is to play continuously the streamed content at the highest quality it can support based on its equipment characteristics. In order to play continuously the buffer at the clients shall not empty at any time. The @minBufferTime in the MPD promises to clients that if such an amount of data is stored at their buffers at the beginning of the session, they can play a video version signaled to have @bandwidth if they download at a rate at least such high as the value indicated in @bandwidth. Therefore, it is expected that clients pre-buffer at least so much data before starting play-out of the video and switch to a different version of the video with a different @bandwidth when variations in their buffer fullness happen based on its magnitude relative to @minBufferTime. Since clients' buffer fullness is unknown to the Base Station and estimating it may be difficult or inaccurate e.g. when trick modes are used QM reports from the users (especially the QM mentioned above) may be a useful tool for predicting user behavior.

Figure 10:
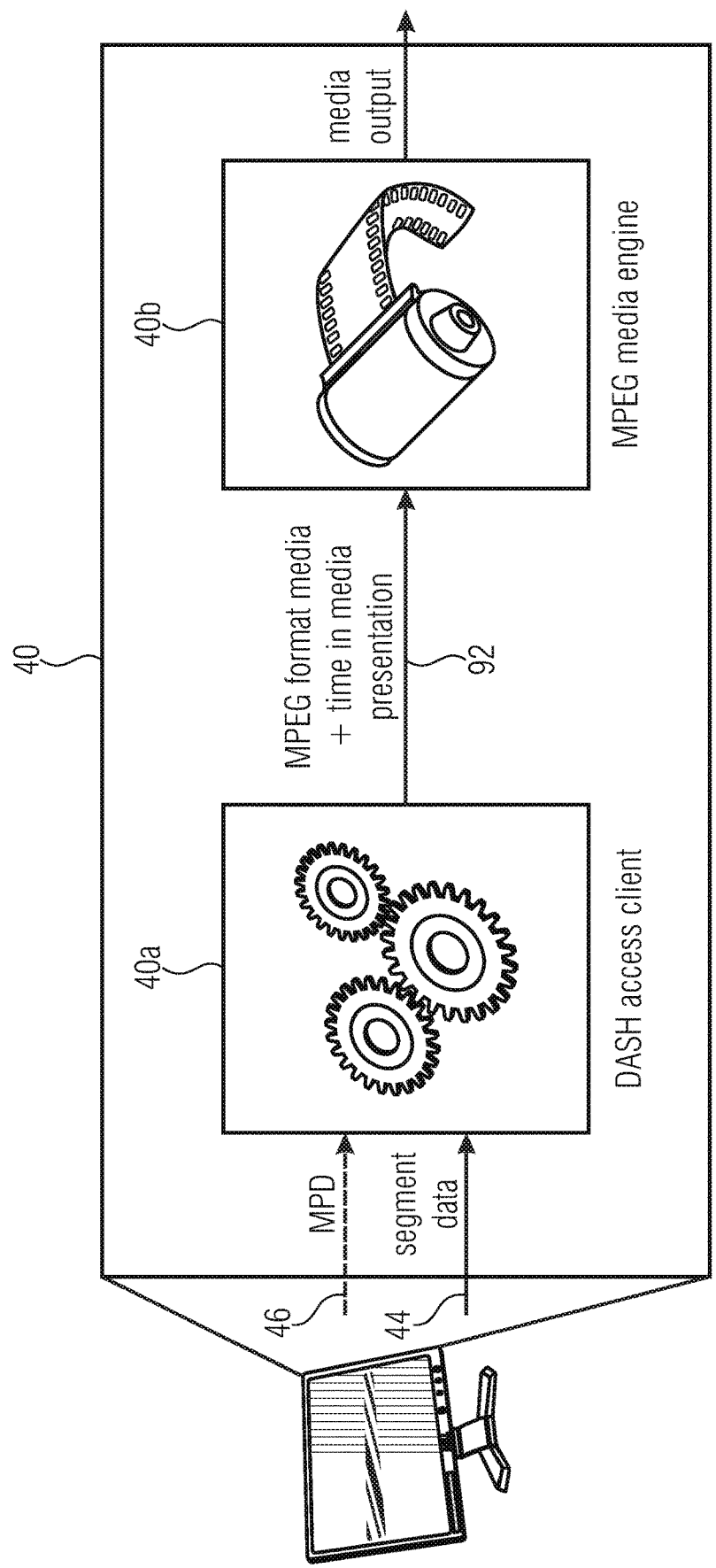
FIG. 10 shows a diagram of a possible implementation of a client suitable for being used in the embedment of FIG. 7.

Furthermore, a DASH client is logically divided into two components as shown in FIG. 10: the DASH Access Client 40a and MPEG Media Engine 40b, as shown in FIG. 7.

DASH Access Client 40a: This entity is responsible for parsing the MPD 46, performing the scheduling algorithm and passing the media 64 to the MPEG Media Engine 40b in format 92

MPEG Media Engine 40b: This entity is responsible for processing the media data 92, i.e., decoding, reconstructing etc.

Referring to the above description of FIG. 7, there are two possible options for implementing an enhanced DASH client which takes advantage of any of the above described favorable functionalities of the user entity and/or client. These possibilities are:

To have a cross-layer DASH Access client: The cross-layer access client takes measurements from the physical layer and possibly receives additional signaling from the LTE network. Using this additional intelligence better estimation of the channel and an enhanced adaptation scheduling can be performed.

However typically already implemented DASH clients are foreseen, where adaptation happens in higher layers by monitoring e.g. client buffer levels or needed time for download in a given amount of data, as for instance for implementation of DASH clients in browser etc. In this case, one possibility is to have and external "media manager" component (see FIGS. 8 and 9) that takes care of the adaptation. Similar to the one described before, but the DASH client would not be aware of this. In order to avoid this "duplicated" DASH Access Client (that the DASH Access client also performs adaptation) additional signaling is necessitated at the MPD level: a new attribute may be added, e.g. @automaticSwitching, which would indicate the DASH Access client that adaptation is performed out of the DASH client, i.e. in the receiver device, by the "resource manager" 74. The @automaticSwitching contained in an MPD indicates to the client that the server or any device in the middle may adjust the video rate conforming to the video's profile and level according to the selected and requested representation, thus the client shall not do any media rate adaptation.

Figure 11:
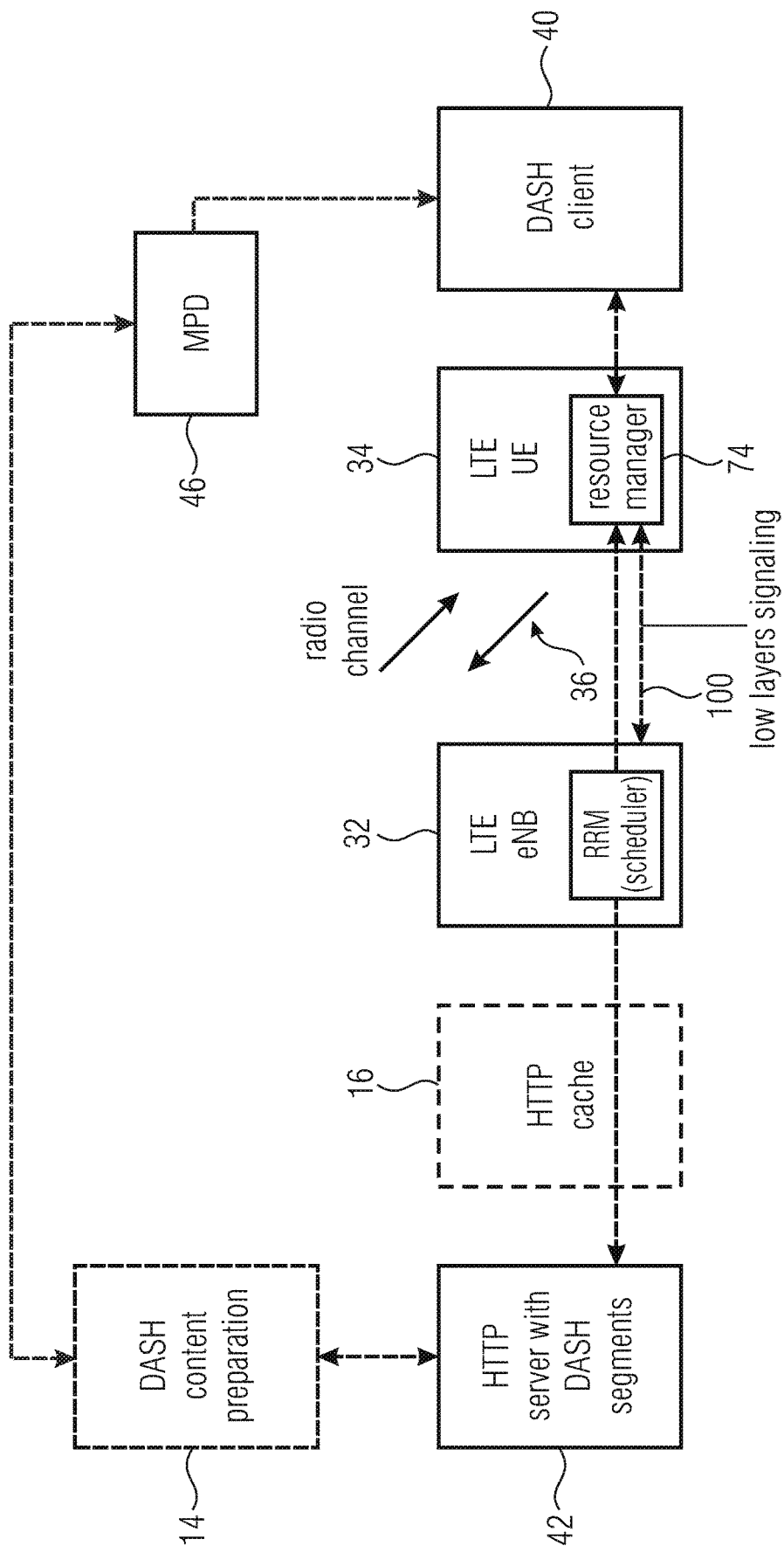
FIG. 11 shows a block diagram of an exemplary radio resource environment including a resource manager of FIG. 10.

The second case, i.e. with the "resource manager" is depicted in FIG. 11. As can be seen from FIG. 11, the resource manager 74 uses data 100 at a lower OSI layer compared to the client/server data traffic in order to act as the resource manager as described above.

In particular, the resource manager 74 could perform either the adaptation and requests of media, or could also perform DPI or modify the requests of the users, etc. Furthermore, the "media manager" could exchange some additional signaling messages with the RRM about physical layer information and resource allocation in order to perform a more intelligent adaptation than the one it could be done at a normal DASH Client, where only information of higher layers is used.

Regarding the embodiment of FIGS. 6 and 7 and the corresponding implementations such as FIG. 8, it should be noted that the embodiments depicted in these figures may be implemented in an alternative way to result in an alternative embodiment according to which the media request influence is replaced by a media description presentation influence in order to yield a better resource management. However, even a combination of the above-described functionality with respect to these figures and the below-outlined functionality may be used.

In particular, in accordance with the alternative embodiment of FIG. 6 as described, the radio resource manager 30 is configured to inspect a media presentation description request from the client operating at the user entity 34 to server 42, the media presentation description request requesting the media presentation description 46 from the server 42. The resource manager 30 then inspects the media presentation description 46 within the data traffic from the server 42 to client 40 and decides, based on the current resource situation information and the media presentation description 46, which option of the latter should be used: 1) forwarding the media presentation description 46 to the client 40 as an answer to the media presentation description request, i.e., leaving the media presentation description 46 unmodified, or 2) intercepting the media presentation description 46, reducing the media presentation description 46 so as to describe merely a proper subset of the versions of the media content 44 of differing bandwidths and send the reduced media presentation description 46 to the client 40 as the answer to the media presentation description request. Again, although the radio resource manager 30 does not directly instruct the client 40 to change the requested version of the media content to a lower bandwidth version thereof, it is very likely that client 40 will change further media requests for media content 44 so as to refer to such a lower bandwidth version due to the reduction of the media presentation description 46.

Again, the above-described functionality is valid not only for the radio resource manager 30 resulting beyond the base station from the user entities view but also for the resource manager 74 of FIG. 7 resulting within the user entity itself. All the above possible implementation details mentioned above with respect to FIG. 7 are also applicable to the above-outlined alternative embodiment of FIGS. 6 and 7, respectively.

Thus, FIGS. 6 and 7 also reveal a resource manager configured to inspect a media presentation description request from a client 40 operating at a user entity 34 to a server 42, the media presentation description request requesting a media presentation description 46 from the server 42, the media presentation description 46 describing versions of a media content 44 of differing bandwidths; inspect the media presentation description 46 within a data traffic from the server 42 to the client 40; decide, based on a current resource situation information and the media presentation description 46, to (1) forward the media presentation description 46 to the client 40 as an answer to the media presentation description request, or to (2) intercept the media presentation description 46 and modify same.

For example, the interception and modification could involve the resource manager reducing the media presentation description 46 so as to describe merely a proper subset of the versions of the media content 44 of differing bandwidths, and sending the reduced media presentation description to the client 40 as the answer to the media presentation description request. It could be also possible to add information to the MPD 46 to be used as feedback to the client 40: In order to instruct the client 40 to, e.g., sent the quality metrics such as explicit buffer state information mentioned below, to the RRM 30 instead of to the server 32, or to indicate a protocol change, namely from unicast to multicast as also described in more detail below; or to let the client 40 know that a device, namely the resource manager itself, in the middle may do adjustments of the media 44 requested by the client 40 so that the client 40 should not adjust the rate. Naturally, the protocol change indication may be conducted by the RRM 30 by performing, or causing someone else such as the server 32, to perform a protocol translation corresponding to the indicated protocol change.

As in the case of influencing the media requests, the resource manager may be configured to inspect the media presentation description 46 so as to identify within the media presentation description 46 a version of a media content 44, which has a lower minimum bandwidth associated therewith as the wanted version of the media content 44, wherein the radio resource manager is configured to, if such a version having a lower minimum bandwidth associated therewith is present, perform the decision dependent on the current resource situation information. The resource manager may be a radio resource manager and is further configured to perform an assignment of communication resources of a base station to user entities to which the user entity at which the client operates, belongs. However, the resource manager may alternatively be arranged within the user entity between a transceiver stage 70 thereof, and the client 40, wherein the resource manager is configured to obtain the current resource situation information from the transceiver stage 70. Further, the resource manager may be configured to simulate a user entity's buffering state based on channel quality feedback from the user entity to the base station, which is comprised by the current resource situation information, and to perform the decision depending on the user entity's buffering state.

Next, possible implementation details regarding the above-outlined embodiments are described with these details concerning the possibility to realize the streaming of the media data in the form of a DASH push service.

Figure 12:
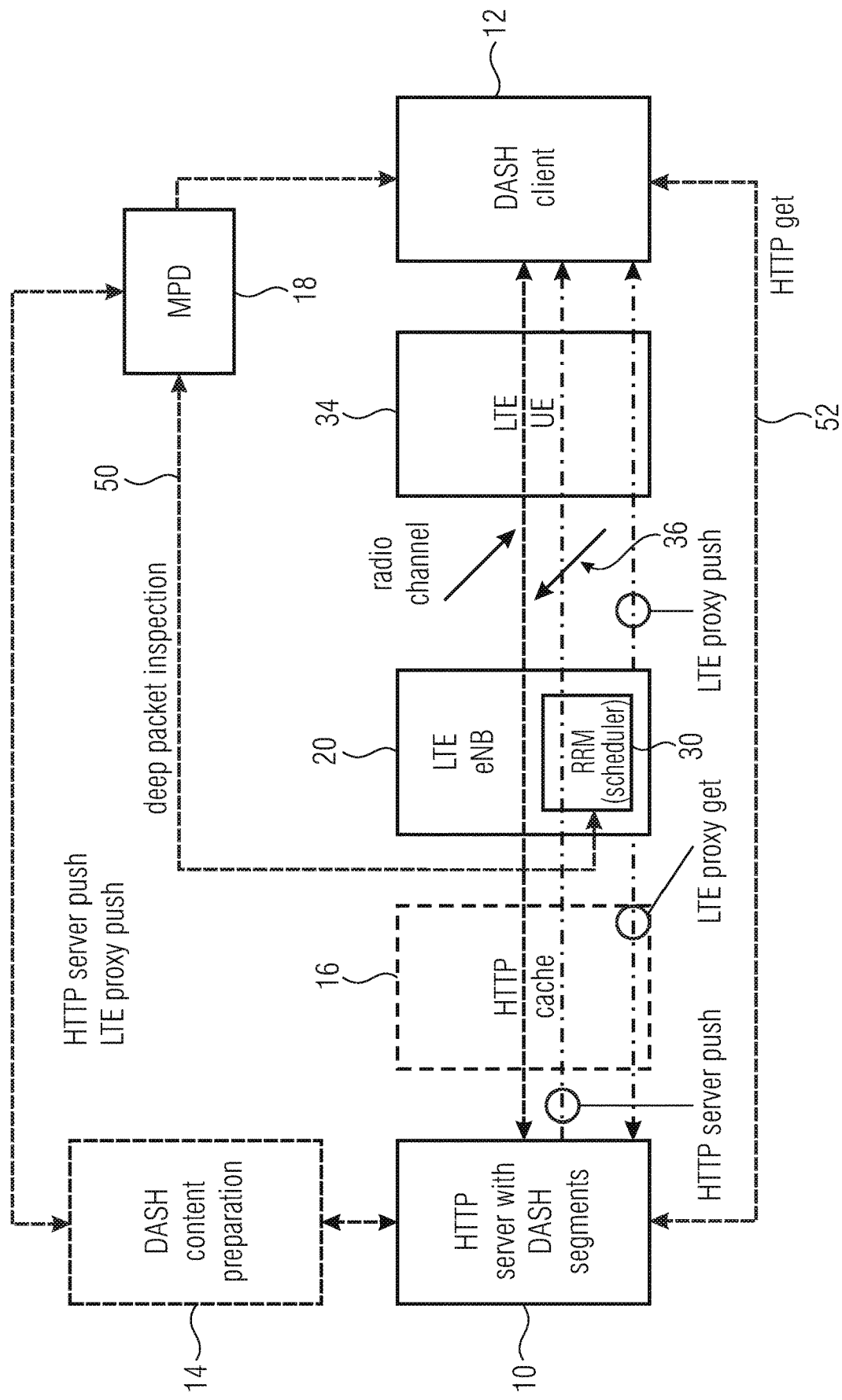
FIG. 12 shows a block diagram of another exemplary radio resource environment including a radio resource manager according to FIG. 3 or 6.

DASH services over LTE can be enhanced by so-called push services. See FIG. 12, for example. There are two possible approaches:
1. HTTP Server Push
    The DASH client 46 connects to HTTP server 42 which, in turn, performs TCP/service handshake and tunnel setup
    The server 42 then pushes video data to the DASH client 40
2. LTE Proxy Push
    The DASH client 40 connects to LTE Proxy server within LTE eNB which performs TCP/service handshake and tunnel setup
    The LTE RRM entity 30 uses HTTP get to retrieve the video data representation from the HTTP server 42
    The LTE RRM 30 pushes video data to the DASH client 12

Push information may be specified within the MPD, which refers to the push representation. In case of SVC or MVC this information can include the layers to be pushed to the DASH client. Here, the MPD 46 informs the eNB RRM 30 about a potential rate switch, so that usage of radio resources can be optimized also for other users. E.g., in case of the LTE Proxy Push, the LTE RRM 30 can decide to push a service with a lower quality and lower rate requirement to save resources for other users.

In other words, the base station may serve as a site for perform proxy push processing in all of the above embodiments. To be more precise, the radio resource manager may serve as such a site.

A further alternative description of the embodiment of FIG. 6 is presented, wherein the following alternative description shall be understood such that the functionality of the radio resource manager described below may replace the above-described spatial functionality of the radio resource manager 30 according to which same influences the data traffic between client and server or may represent an additional functionality of the radio resource manager 30.

In any case, in accordance with the embodiment described next, the radio resource manager 30 of FIG. 6 is, besides assigning the communication resources of base station 32 to the user entities 34, additionally configured to survey the data traffic between the clients 40 operating at the several user entities 34 and one or several servers 42 in order to check as to whether there are media presentation descriptions 46 within the data traffic which relate to a common media content. Depending on the check, the radio resource manager then decides to: (1) offer the clients 40 a multicast version of the common media content, besides unicast versions of the media content 44 or (2) cause a change of a protocol for clients 40 downloading the common media content 44 from a unicast protocol to a multicast protocol.

The above-described functionality may, however, also be performed within a radio resource manager which is external to, or separate from, the radio resource manager 30 shown in FIG. 6 which is responsible for performing the assignment of the base stations communication resources to the user entities. The surveying of the data traffic between clients and servers and the check as to whether there are media presentation descriptions commonly ordered by more than one of the clients by way of respective media presentation description requests, may be performed independent on the assignment processing. The resulting advantage is readily understandable when considering that the result of the respective clients 40 switching from a unicast version to be received to multicast versions of the same content. The switching yields more available bit rate for other clients due to the fact that the necessitated bit rate for these clients may be collapsed to merely one streaming.

It goes without saying that the alternative mentioning of options (1) and (2) shall not be understood such that the radio resource manager in accordance with the present embodiment is actually configured to, or able to, perform both options. Rather, the radio resource manager decides, based on the result of the check, as to whether any of options 1 or 2 shall be triggered or not. To be more precise, the radio resource manager leaves the data traffic between the clients 40 and the servers 42 unchanged in case there are no media presentation descriptions within the data traffic from the one or several servers to a different one of the clients which relate to a common media content 44. In this case, neither option 1 nor option 2 is performed by the radio resource manger. To be even more precise, the radio resource manager leaves the respective data traffic unchanged in case a manipulation of any of the data traffic does not promise very much bit rate savings. However, imagine the case where several users decide to switch to a live streaming such as a soccer game or any other live news, respectively. In this case, it would be favorable to be able to switch from a unicast streaming to all these clients, to a multicast streaming. In accordance with the first option, the radio resource manager, when realizing the overlapping media presentation description within the data traffic, is configured to manipulate media presentation descriptions to clients 40 which requested a media presentation description regarding the media live streaming by way of a respective media presentation description request. The modification changes the original media presentation description to the extent that besides, or instead of, the unicast version of the media content 44 being available, only the multicast version is available. Accordingly, at least these newly joining clients 40 would consider, or would have to consider, the multicast version. In accordance with the second alternative, the radio resource manager 30 would be configured to change, in case of realizing overlapping media presentation descriptions within the data traffic, for example, respective media requests from the clients requesting the common media content 44 so as to be changed from requesting a unicast version to a multicast version. Alternative modifications are also feasible.

Thus, FIG. 6 does also reveal a radio resource manager configured to survey data traffic between clients 40 operating at user entities 34, and one or several servers 32, and check as to whether there are media presentation descriptions within the data traffic from the one or several servers 32 to different ones of the clients 40, which relate to a common media content 44, wherein the radio resource manager is configured to, depending on the check, offer to the clients 40 a multicast version of the common media content 44, besides unicast versions of the media content 44; or the radio resource manager is configured to, depending on the check, cause a change of a protocol for clients 40 downloading the common media content from a unicast protocol to a multicast protocol. This radio resource manager could also be responsible for the assignment of communication resources of the base station 32 to the user entities 34. The just-outlined embodiment is combinable with any of the other embodiments.

A more concrete implementation of the above-outlined embodiment is described below. According to this concrete implementation, a DASH unicast and broadcast/multicast switchover is realized. As described above, such a switch over is advantageous for live services to reduce the cell usage. In this regard, it is noted that the just-mentioned embodiment is not only usable when considering users associated with, or locked to, one or several common base stations 32. Rather, the wireless network in general, including all of its cells and the backbone interconnecting the base station itself, would inadvertently be strained by an excessively high number of clients requesting a media content streaming using a unicast protocol which streaming could, alternatively, also be performed by a multicast protocol.

Accordingly, a base station/LTE network delivers live services to unicast user. If number of user request for service increases, the service should be switched over to a multicast/broadcast service in order to reduce data rate demands on the backbone and the radio link of the mobile network infrastructure.

E.g. from HTTP to FLUTE (broadcast file download protocol via UDP)

User requests data service for HTTP service. Http server return HTTP get request via FLUTE protocol.

<RedundantURL>http://cdn1.example.com/</RedundantURL>

<RedundantURL>flute://cdn2.example.com/session-description.sdp</RedundantURL>

A protocol change may be applied, based on an indication in the MPD, e.g. as an "Redundant URL" containing a link to a description of a FLUTE (FLUTE—File Delivery over Unidirectional Transport) [IETF RFC 3926] session, e.g., in the Session Description Protocol SDP [IETF RFC 4566]. A redundant URL indicates an alternative media location with alternative transmission characteristics, such as a protocol change form HTTP to FLUTE. Furthermore, the protocol change may also include a change of the source location, from a unicast to a multicast address.

It is again explicitly noted with regard to FIGS. 3 and 6 and the corresponding implementation examples, that it is possible that a user entity is served by more than one base station 32, currently. That is, it is possible that the user entity receives the MPD via another base station than the one for which the RRM scheduler performs RRM. The terminal needs basic IP connectivity in order to receive the MPD, which is in this case established over a wireless system, e.g. LTE, using LTE's RRM unit. So in order to receive the MPD, the UE needs to have some resources assigned by the RRM. In current LTE Rel. 8/9, a terminal is connected to a single base station (operating on a certain frequency, e.g. 2.6 GHz with 10 or 20 Mhz bandwidth) which has a unique cell identifier (Cell-ID). In this case, the UE can only get the MPD using the underlying LTE network. In a next step, multiband techniques can be used, already with existing LTE. Multiband means that, e.g. we have 1 base station operating at 800 MHz, and another one operating at 2.6 GHz. A terminal can be connected to both base stations at the same time, since each has its own cell ID. So a terminal can have more than 1 IP entry point, here in the example it has 2, and could use the one base station for retrieving the MPD and the other one for actually retrieving the data. In this case it would independently utilize both RRM units. This can also be extended to other technologies, e.g. using LTE for distributing the MPD, and Wifi for getting the data. A multiband approach like this would necessitate some kind of intelligence within the client, which decides which technology to use based on current network load, or channel quality etc.

Figure 13:
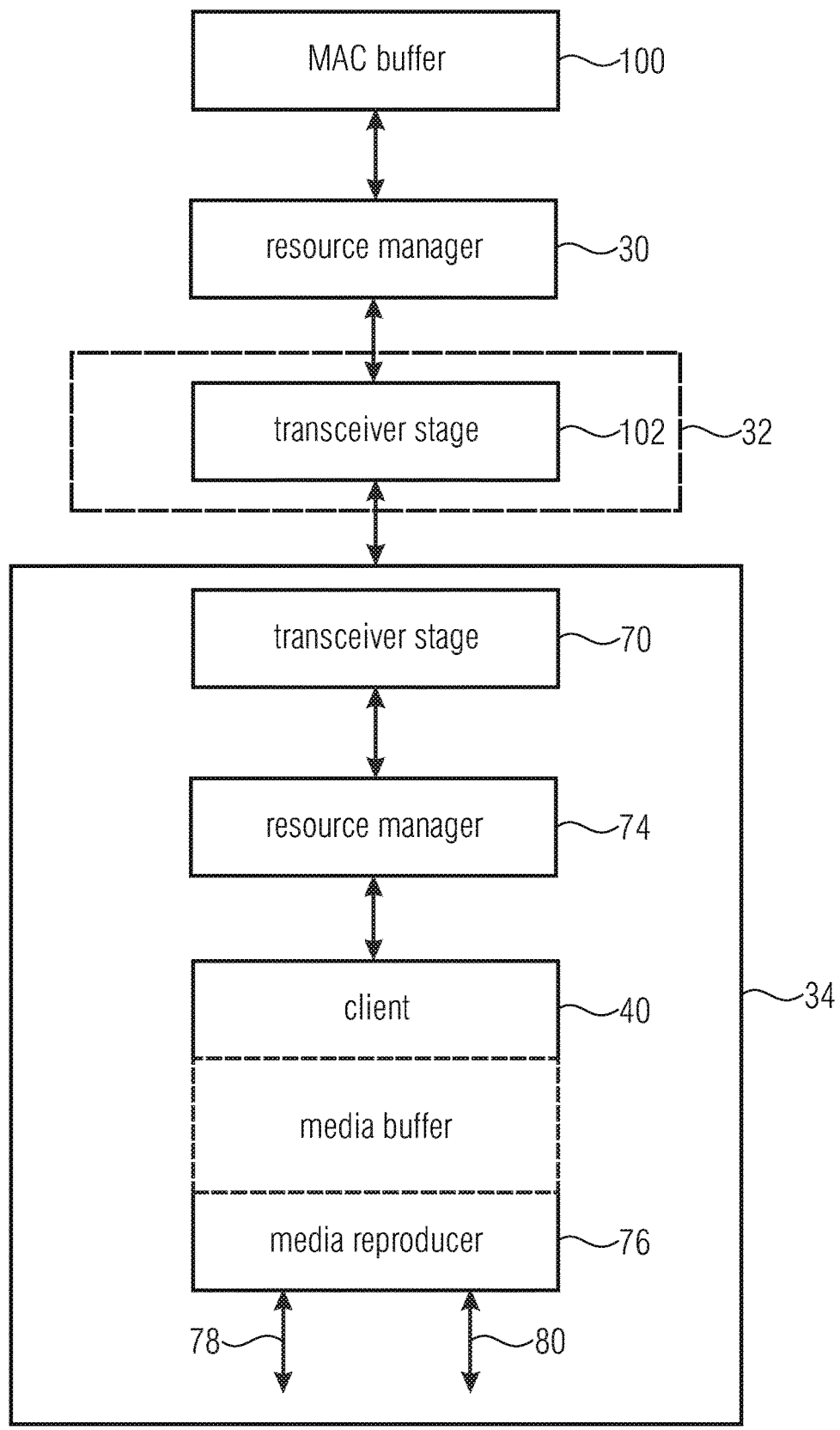
FIG. 13 shows a block diagram of a possible implementation of a portion of the data path between client and server, including a possible implementation of the client.

With respect to the above description relating to the simulation of the buffer state associated with the client 40, it is noted that the buffer state simulated may also be another buffer positioned elsewhere within the user entity 34. For example, the buffering state simulated could actually also relate to a MAC layer buffer within the transceiver stage of the user entity. See, for example, FIG. 13, which shows a pedant of the just-mentioned MAC layer buffer within the transceiver stage 70, namely buffer 100. Buffer 100 may also be positioned within base station 32. In other words, FIG. 13 shows a possible implementation of a portion of the data path between client 40 and server 32, including a possible implementation of the client 40. Differing from all of the above figures, FIG. 13 also shows MAC layer entities such as the MAC layer buffer 100, i.e. a network buffer positioned on the other side of, i.e. beyond RRM 30 relative to client 40. The base station's transceiver stage 102 corresponding to the user entity's transceiver stage 70 is also shown for sake of completeness. The transceiver stage 70 also accommodates MAC layer entities such as, inter alias, another MAC layer buffer which is, however, not shown in FIG. 13. By the way, the RRM 30 of FIG. 3 could also monitor the latter buffer with respect to its amount of media content for the client 40 cached, in order to simulate the buffer state if the user entity.

Further it is mentioned that, additionally or alternatively to the functionalities described above, the RM 74 in FIG. 7 or 13 could relieve the RRM 30 of FIG. 3 of surveying the data traffic between server and client so as to derive the MPD. Thus, the resource manager 74 could be used to fully parse and inspect the media presentation description and translate it to a subset media presentation description only including the potential bit rate operation points supported by the client for the requested media service, such a particular HTTP Streaming session. That is, the translated media presentation description may represent a rudimentary description of the versions of the media content 44 available at the respective server, i.e. a kind of media presentation description in sense of the description above with respect to FIG. 3. As described above, merely a ranking among the information density of the individual versions may be signalized within the translated media presentation description, i.e. a very coarse measure of the quality of the respective version. Alternatively, as just-mentioned, for each version, the necessitated minimum bandwidth for presenting the respective version to the user may be signalized within the translated media presentation description for each relevant media content version, i.e. for those media content versions which are presentable to the user at the user entity in accordance with the user entity's facilities. This translated MPD may then forwarded to the radio resource manager 30, e.g. on PHY/MAC layer, in order to let it use these bit rate operation points for further scheduling and radio resource allocation decisions for the particular client as well as other clients under its control. The type of a video service which allows for adaptivity, i.e. the service allows the support of different bit rates, respectively operation points, may be indicated using Quality of Service parameter signaling, such as defined in [19]. Therefore new traffic classes, such as "Adaptive Non-Conversational Video and Adaptive Video", may be added to Table 6 to indicate the service's characteristics. These new classes could further necessitate the indication of a set of rates to be chosen from for resource allocation at the radio resource manager, i.e. the indication of the translated MPD. The signaling of a guaranteed minimum bitrate (GBR), needs to be extended to allow the signaling of the minimum rate and/or other meaningful operation points for the service. As far as the minimum bitrate is concerned, it should be noted that a translated media presentation description may indicate this minimum bitrate in terms of a bitrate measured at the high OSI data traffic level, such as the TCP level, or at some lower OSI layer level, such as in terms of minimum bitrate to be assigned by the base station or radio resource manager 30. Reference is made to the above discussion of the discrepancy between the bitrate actually assigned and transmitted, and the bitrate actually effective in the media content transmission, the discrepancy resulting, for example, from packet loss and re-transmission upon NACKs or ACKs.

Figure 15:
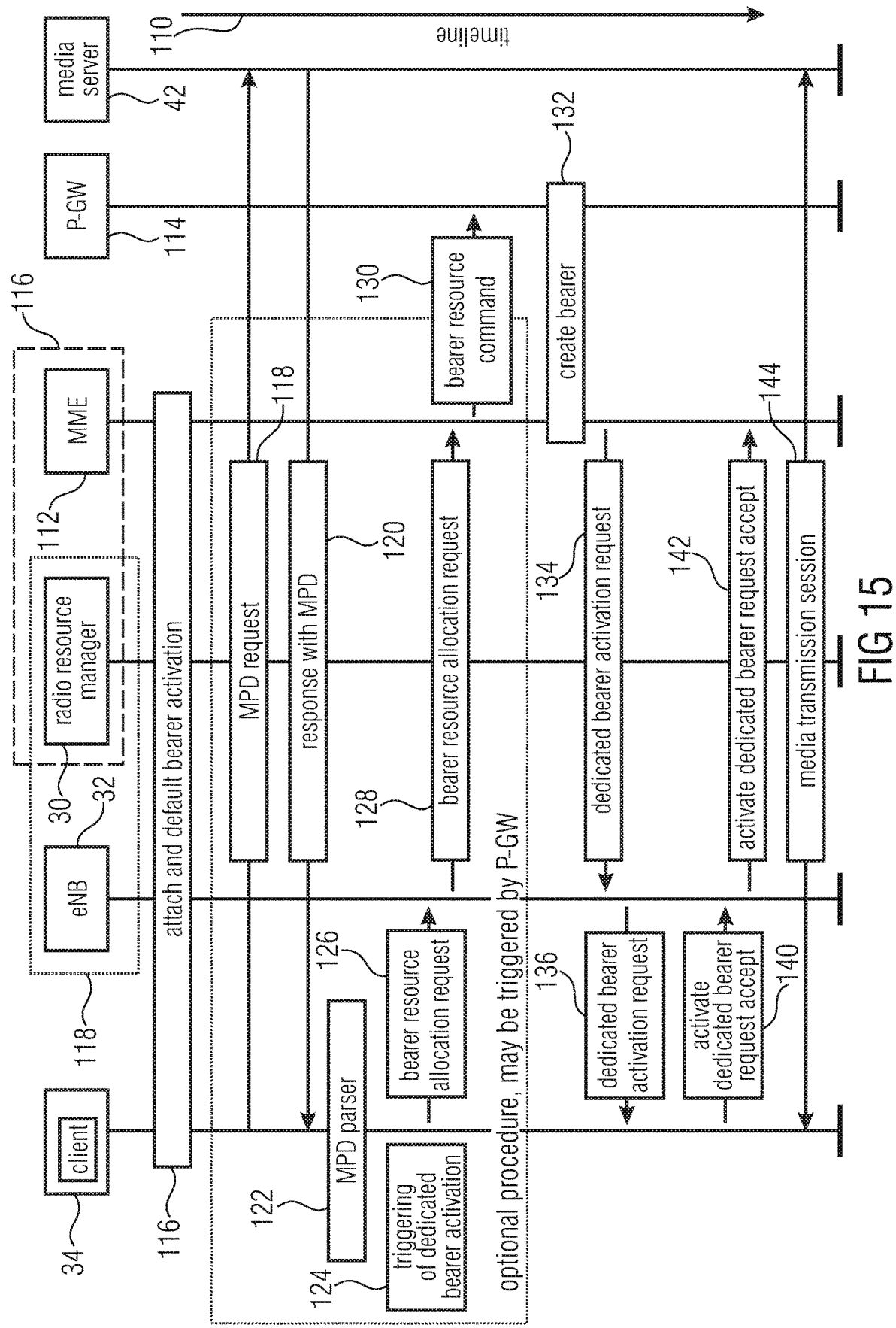
FIG. 15 shows a sequence of steps performed in a scenario where a resource manager of the user entity at which a client operates, relieves the radio resource manager of the MPD parsing.

As just-mentioned, the transmission of a translated media presentation description derived from the actual media presentation description 46 by the resource manager 74 residing within the user entity 34, could be integrated into any existing radio resource network such as LTE by introducing a new type or sort of communication data to be exchanged between the user entity, respectively, and the base station such as the above mentioned "Adaptive Non-Conversational communication", and transmitting the translated MPD within the protocol process of the activation of this new communication data type, i.e. this dedicated bearer. FIG. 15 shows this possible integration exemplarily in more detail. LTE was exemplarily used as a representative of a radio resource network here, but in principle the description of FIG. 15 is readily transferable onto other radio resource networks. In particular, FIG. 15 shows consecutive steps performed in creating such an exemplary bearer, i.e. "Adaptive Non-Conversational communication", and transmitting a translated media presentation description to the radio resource manager 30. In particular, FIG. 15 shows all these steps in their temporal order along time axis 110 by respective blocks and associated arrows outlined in more detail below, where these blocks and associated arrows are drawn in a horizontal direction, so as to extend over the respective entities involved in the respective step, namely the entities of the data traffic chain: user entity 40, base station 32, radio resource manager 30, mobility management entity 112, packet gateway 114, and media server 42. As already noted above, the mobility management entity 112 is also connected to all the base stations of the radio resource network and may even be implemented, at least partially, on the same hardware as radio resource manager 30. As also already mentioned above, the mobility management entity 112 is responsible for managing the user's access data such as debiting the user's payment account, managing the users' profiles, which profiles in turn indicate certain user rights such as maximum bandwidth assignable to the respective user, restriction to certain communication data types/sorts and the like. Moreover, the mobility management entity 112 may be responsible for handling the handovers of user entities transitioning from one base station's cell to another base station's cell. The packet gateway 114, in turn, assumes responsibility for interfacing the radio resource network, to which entities 40, 32, 30 and 112 belong, to the outside, namely the internet or the like. Possible integration of the radio resource manager 30 and the mobility management entity 112 into one unit is exemplarily illustrated by a dashed line 116, whereas the dotted line 118 indicates the possibility that radio resource manager 30 may be positioned within base station 32.

As is derivable from FIG. 15, it is assumed that the user entity 40 may have already been attached to the radio resource network and a default bearer may have already been activated so that the user entity 40 is able to perform minimum tasks via the radio resource network such as, for example, performing low complexity access to the internet. The step of attachment and default bearer activation is shown at 116. To be more precise, step 116 is performed by transceiver stage 70 as far as the user entity's domain is concerned. Then, it is assumed that the user, or the client 40 at user entity 34, sends the MPD request 118 to the media server 42 using, in the present example, the default bearer session. The media server 42 sends back the MPD in step 120 where the resource manager 74 within user entity 34 parses this MPD in step 122 in order to translate, as described above, the MPD of step 120 into a translated MPD. Then, a dedicated bearer activation is triggered at 124 such as, for example, the activation of "Adaptive Non-Conversational communication". For example, the trigger 124 may have been caused by the user of, or the client 40 at, user entity 34 requesting media content which the MPD parsed at step 122 refers to. In response to trigger 124, the resource manager 74 and the transceiver stage 70 cooperate in order to send a bearer resource allocation request in step 126 to base station 32, which in turn is instructed thereby to forward the respective allocation request to radio resource manager 30 and mobility management entity 112 in step 128, respectively. The allocation request comprises the above-mentioned translated media presentation description using, for example, the syntax described in more detail below. Thereupon, the mobility management entity 112 informs the packet gateway 114 that a respective bearer resource is to be created at step 130 using the Bearer Resource Command, wherein the creation itself is performed at step 132. Accordingly, from step 128 on, the radio resource manager 30 knows about the content of the translated media presentation description, but the activation of the dedicated bearer has not yet been confirmed. Accordingly, mobility management entity 112 starts another acknowledgment routine by sending a dedicated bearer activation request in step 134 to the base station 32, which in turn forwards same in step 136 to the user entity 34, and in particular to transceiver stage 70. Then, at step 140, the transceiver stage 70 signals the acceptance of the dedicated bearer activation to base station 32, which in turn informs in step 142 the radio resource manager 30 and the mobility management entity 112 accordingly. From that time on, the radio resource manager 30 is able to perform the above-described radio resource assignment, i.e. the scheduling, by using the translated media presentation description as signalized from resource manager 74 to resource manager 30 via steps 120 to 128. Accordingly, the media transmission session 144 between client 40 at user entity 34 and media server 42, may be controlled by radio resource manager 30 in an efficient way when considering the assignment of the radio resources to all the user entities served by base station 32 and radio resource network, respectively.

With respect to FIG. 15, it is noted that, generally, there are two possibilities to setup dedicated radio bearers. The first method is client driven. Here, the UE 34 is connected via default bearer to the internet as shown in FIG. 15. Based on a response 120 of a previously issued MPD request 118 by the client 40, the user entity's RM 74 receives the corresponding MPD file for inspection and triggers 124 the dedicated radio bearer accordingly. This is done by triggering a dedicated bearer activation by issuing 126 a ESM bearer resource allocation request to the mobility management entity 112 (MME) (cp. Sect. 8.3.8 in [20]). This message 126 contains an information element (IE) defining the necessitated evolved packet system (EPS) quality of service information, i.e. the translated MPD.

An alternative possibility is network driven. Here, the P-GW 114 triggers the setup of the radio bearer which is necessitated to keep the necessitated QoS bearer during handover procedure. In both cases, ESM Activate Dedicated Bearer Request messages, (see Sect. 8.3.3 in [20]) are sent which contain EPS quality of service information, (see Sect. 9.9.4.3 in [20]) shown in the table below. This table is (compared to [20]) extended or modified to contain signaling for GBR with minimum only and alternative higher-bitrates as well as for Non-GBR with alternative bit rates, i.e. the translated MPD. In case the UE triggers the dedicated bearer as illustrated in FIG. 15, it provides the information elements such as the alternative bit rates found in the MPD. In case the network triggers the dedicated bearer, the alternative bit rates and the translated MPD, respectively, shall be provided by the corresponding P-GW in case of handover, or from the resource manager (74) after inspecting the MPD. Therefore, the P-GW needs to inform the RRM about the MPDs location or its content. In [20] other messages, i.e. Bearer Resource Modification request (Sect. 8.3.10) and Activate default EPS Bearer request (Sect. 8.3.6) contain also the EPS quality of service information message shown in Table 3 and may be used for providing the alternate bitrates mentioned before.

TABLE 3 shows an EPS quality of service element as currently defined.

| 8 | 7 | 6 | 5 | 4 | 3 | 2 | 1 | |
|---|---|---|---|---|---|---|---|---|
| EPS quality of service IEI | | | | | | | | octet 1 |
| Length of EPS quality of service contents | | | | | | | | octet 2 |
| QCI | | | | | | | | octet 3 |
| Maximum bit rate for uplink | | | | | | | | octet 4* |
| Maximum bit rate for downlink | | | | | | | | octet 5* |
| Guaranteed bit rate for uplink | | | | | | | | octet 6* |
| Guaranteed bit rate for downlink | | | | | | | | octet 7* |
| Maximum bit rate for uplink (extended) | | | | | | | | octet 8* |

TABLE 3-continued shows an EPS quality of service element as currently defined.

| 8 | 7 | 6 | 5 | 4 | 3 | 2 | 1 | |
|---|---|---|---|---|---|---|---|---|
| | | Maximum bit rate for downlink (extended) | | | | | | octet 9* |
| | | Guaranteed bit rate for uplink (extended) | | | | | | octet 10* |
| | | Guaranteed bit rate for downlink (extended) | | | | | | octet 11* |

One possibility is to add more octets as shown in Table 4. The rate indicated in the Guaranteed bitrates would correspond to the minimum bandwidth that has to be guaranteed, such as for the lowest quality/lowest information density region, while the alternative bitrates for downlink and uplink describe the bitrates that are available to download found in the original MPD 46. The fields of alternative bit rates is present depending on the value of the QCI field. If the new QCI values defined in Table 5, for example, are used the alternative bit rates for downlink or uplink shall be present. This mechanism allows backward compatibility. If the QCI value is not understood another GBR or non-GBR QCI is selected depending on the whether the Guaranteed bit rate is present or not.

TABLE 4

Extended EPS quality of service information element by alternative bit rates

| 8 | 7 | 6 | 5 | 4 | 3 | 2 | 1 | |
|---|---|---|---|---|---|---|---|---|
| | | EPS quality of service IEI | | | | | | octet 1 |
| | | Length of EPS quality of service contents | | | | | | octet 2 |
| | | QCI | | | | | | octet 3 |
| | | Maximum bit rate for uplink | | | | | | octet 4* |
| | | Maximum bit rate for downlink | | | | | | octet 5* |
| | | Guaranteed bit rate for uplink | | | | | | octet 6* |
| | | Guaranteed bit rate for downlink | | | | | | octet 7* |
| | | Maximum bit rate for uplink (extended) | | | | | | octet 8* |
| | | Maximum bit rate for downlink (extended) | | | | | | octet 9* |
| | | Guaranteed bit rate for uplink (extended) | | | | | | octet 10* |
| | | Guaranteed bit rate for downlink (extended) | | | | | | octet 11* |
| | | Number of additional alternative downlink rates | | | | | | octet 12* |
| | | Alternative bit rate for downlink_1 | | | | | | octet 13* |
| | | ... | | | | | | ... |
| | | Alternative bit rate for downlink_N | | | | | | octet 12 + N* |
| | | Number of additional alternative uplink rates | | | | | | octet 13 + N* |
| | | Alternative bit rate for uplink_1 | | | | | | octet 14 + N* |
| | | ... | | | | | | |
| | | Alternative bit rate for uplink_M | | | | | | octet 13 + N + M* |

Another possibility would be to add an additional message to EPS quality of service information message, which will be added to the aforementioned messages where the EPS quality of service information message is used (ESM bearer resource allocation request, ESM Activate Dedicated Bearer Request, Bearer Resource Modification request and Activate default EPS Bearer request). This would allow to let the EPS quality of service message as it is. The content of the extension could be as follows in Table 5. In this case the Guaranteed bitrate values should be taken as in the EPS quality of service information message, but the QCI value would be overwritten by the extension message. The alternative bit rates would also be described in this extension message.

TABLE 5

Additional message carrying the bitrate alternatives for a EPS quality of service information element

| 8 | 7 | 6 | 5 | 4 | 3 | 2 | 1 | |
|---|---|---|---|---|---|---|---|---|
| | | EPS quality of service extension IEI | | | | | | octet 1 |
| | | Length of EPS quality of service extension contents | | | | | | octet 2 |
| | | QCI | | | | | | octet 3 |
| | | Number of additional alternative downlink rates | | | | | | octet 4* |
| | | Alternative bit rate for downlink_1 | | | | | | octet 5* |
| | | ... | | | | | | ... |
| | | Alternative bit rate for downlink_N | | | | | | octet 4 + N* |
| | | Number of additional alternative uplink rates | | | | | | octet 5 + N* |
| | | Alternative bit rate for uplink_1 | | | | | | octet 6 + N* |
| | | ... | | | | | | |
| | | Alternative bit rate for uplink_M | | | | | | octet 5 + N + M* |

As shown in FIG. 15, MME 112 has to exchange messages with the rest of the core network, i.e. with S-GW and P-GW 114 to setup a bearer with a given QoS for a service. S-GW is the gateway between base station (eNB) and other EPC (Evolved Packet Core) entities, e.g. P-GW. The P-GW (also sometimes specified as PDN-GW=Packet Data Network Gateway) is the interface between EPC and Internet/backbone. So all data in LTE networks is routed from: UE (terminal)<->eNB<->S-GW<->P-GW<->Internet/Backbone.

The exchange of further messages includes a GTP-C Bearer Resource Command (see. Sect. 7.2.5 in [21]) from MME to S-GW and from S-GW to P-GW, a GTP-C Create Bearer Request (see. Sect. 7.2.3 in [21]) from P-GW 114 to S-GW and S-GW to MME 112 and a E-RAB Setup Request/Response (see. Sect. 8.2.1.1 and Sect. 8.2.1.2 in [22]), which informs the radio resources manager 30 about the QoS characteristics that have to be provided. These messages mentioned before have to be extended accordingly to the extensions presented in Table 4 and Table 5. For instance, for the GTP-C Bearer Resource Command the Flow QoS IE in Sect. 8.16 in [21] should be extended with the Alternate bit rates defined here, as shown for example in Table 6. For the GTP-C Create Bearer Request the Bearer QoS IE in Sect. 8.15 in [21] should be extended with the Alternate bit rates defined here, as shown for example in Table 7. For the E-RAB Setup Request, the MME 112 should insert the negotiated Alternative bit rates in the E-RAB Level QoS Parameters in Sect. 9.2.1.15 in [22]. For this purpose, the E-RAB Level QoS should be extended adding the additional Alternative bit rates defined before, as shown for example in Table 8 and Table 9.

TABLE 6

Flow Quality of Service (Flow QoS)

| Octets | Bits | | | | | | | |
|---|---|---|---|---|---|---|---|---|
| | 8 | 7 | 6 | 5 | 4 | 3 | 2 | 1 |
| 1 | Type = 81 (decimal) | | | | | | | |
| 2 to 3 | Length = n | | | | | | | |
| 4 | Spare | | | | | | Instance | |
| 5 | Label (QCI) | | | | | | | |
| 6 to 10 | Maximum bit rate for uplink | | | | | | | |
| 11 to 15 | Maximum bit rate for downlink | | | | | | | |
| 16 to 20 | Guaranteed bit rate for uplink | | | | | | | |

TABLE 6-continued

Flow Quality of Service (Flow QoS)

| Octets | Bits 8 | 7 | 6 | 5 | 4 | 3 | 2 | 1 |
|---|---|---|---|---|---|---|---|---|
| 21 to 25 | Guaranteed bit rate for downlink ||||||||
| 26 | Number of additional alternative downlink rates (N) ||||||||
| | . . . ||||||||
| 26 + N | Alternative bit rate for downlink_1 ||||||||
| | . . . ||||||||
| | Alternative bit rate for downlink_N ||||||||
| | Number of additional alternative uplink rates (M) ||||||||
| | Alternative bit rate for uplink_1 ||||||||
| | . . . ||||||||
| 27 + N + M | Alternative bit rate for uplink_M ||||||||
| 28 + N + M to (n + 4) | These octet(s) is/are present only if explicitly specified ||||||||

TABLE 7

Bearer Level Quality of Service (Bearer QoS)

| Octets | Bits 8 | 7 | 6 | 5 | 4 | 3 | 2 | 1 |
|---|---|---|---|---|---|---|---|---|
| 1 | Type = 80 (decimal) ||||||||
| 2-3 | Length = n ||||||||
| 4 | Spare | | | | Instance | | | |
| 5 | Spare | | PCI | PL | | Spare | | PVI |
| 6 | Label (QCI) ||||||||
| 7 to 11 | Maximum bit rate for uplink ||||||||
| 12 to 16 | Maximum bit rate for downlink ||||||||
| 17 to 21 | Guaranteed bit rate for uplink ||||||||
| 22 to 26 | Guaranteed bit rate for downlink ||||||||
| 27 | Number of additional alternative downlink rates (N) ||||||||
| | Alternative bit rate for downlink_1 ||||||||
| 27 + N | . . . ||||||||
| | Alternative bit rate for downlink_N ||||||||
| | Number of additional alternative uplink rates (M) ||||||||
| | Alternative bit rate for uplink_1 ||||||||
| | . . . ||||||||
| 28 + N + M | Alternative bit rate for uplink_M ||||||||
| 29 to (n + 4) | These octet(s) is/are present only if explicitly specified ||||||||

TABLE 8

E-RAB Setup Request or E-RAB Level Qos Parameters

| IE/Group Name E-RAB Level QoS Parameters | Presence | Range | IE type and reference | Semantics description |
|---|---|---|---|---|
| >QCI | M | | INTEGER (0 . . . 255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |
| >ABR-QoS | O | | | This IE applies to GBR and non-GBR bearers for providing alternative bitrates |

TABLE 8

ABR-QoS Alternative Bitrates for Adaptive bitrate (ABR) QoS-

| IE/Group Name | Presence | Range | IE type and reference | Semantics description |
|---|---|---|---|---|
| N | | | INTEGER | Number of Alternative Downlink Bitrates |
| M | | | INTEGER | Number of Alternative Uplink Bitrates |
| E-RAB Alternative Downlink Bit Rate 1 | M | | Bit Rate 9.2.1.19 | Desc.: This IE indicates the first alternative downlink E-RAB Bit Rate. |
| . . . | | | | |
| E-RAB Alternative Downlink Bit Rate N | M | | Bit Rate 9.2.1.19 | Desc.: This IE indicates the N-th alternative downlink E-RAB Bit Rate. |
| E-RAB Alternative Uplink Bit Rate 1 | M | | Bit Rate 9.2.1.19 | Desc.: This IE indicates the first alternative uplink E-RAB Bit Rate. |
| . . . | | | | |
| E-RAB Alternative Uplink Bit Rate M | M | | Bit Rate 9.2.1.19 | Desc.: This IE indicates the M-th alternative uplink E-RAB Bit Rate. |

Similar to the process described before, a hand-over could be initiated by a eNodeB as described in [23]. In such a case, the bearer setup or bearer maintenance (with same QoS characteristics) is not initiated neither by the MME nor P-GW, issuing a ESM bearer resource allocation request, but is done within the X2 interface defined in 3GPP [24]. In such a case the extended syntax, proposed previously, with alternative bitrates has to be included in the appropriate messages. Concretely, for interface X2, the HANDOVER REQUEST message is defined (cf. section 9.1.1.1 [23]), which contains a E-RAB Level QoS Parameter IE/Group Name. This IE is defined in section 9.2.9 in [23] and should be extended as shown in Table 8. The syntax of this message would be the same as the E-RAB Setup Request described before.

Furthermore, additionally or alternatively to the functionalities described above, the resource manager 74 can forward the actual received throughput, such as seen by a higher level TCP session, as information to the radio resource manager 30, in order to let it identify the actual resulting application throughput for further scheduling and radio resource allocation decisions for the particular client as well as other clients under its control. More generally, the user entity 34 may be for communicating with the radio resource base station 32, on which the client 40 is operative, wherein the user entity 34 may be configured to determine the actually received media content throughput or buffer state of a media content retrieved by the client 40 from the server 42 and inform the radio resource manager 30 on the determined media content throughput or buffer state. The determination may involve the client 40 sending the respective information to the resource manager 74 which assumes responsibility for the respective task within the user entity.

With regard to the embodiment of FIGS. 3 to 5, it should be mentioned that the above description primarily concerned the downlink case, i.e. the case where the radio resource manager assigned the downlink communication resources to the user entities 34, although the above embodiments a re also transferable to the uplink case. In a more general point of view, for example, FIGS. 3 to 5 and all the other embodiments concerning the functionality of the radio resource manager 30 according to which the assignment of communication resources is performed, the radio resource manager may more generally be configured to assign communication resources, i.e. downlink and/or uplink communication resources of the at least one base station 32 to the user entities 34 depending on a media presentation description within a data traffic from a server to a client, where one of the server and the client operates at one of the user entities 34 with this one, however, being not necessarily the client. This will be explicitly outlined in more detail below. See, for example, FIG. 16. As a minor note, it is stated that server and client may even be both operating on one common user entity, and accordingly, "one of the server and the client" is to be understood as "at least one of".

Figure 16:
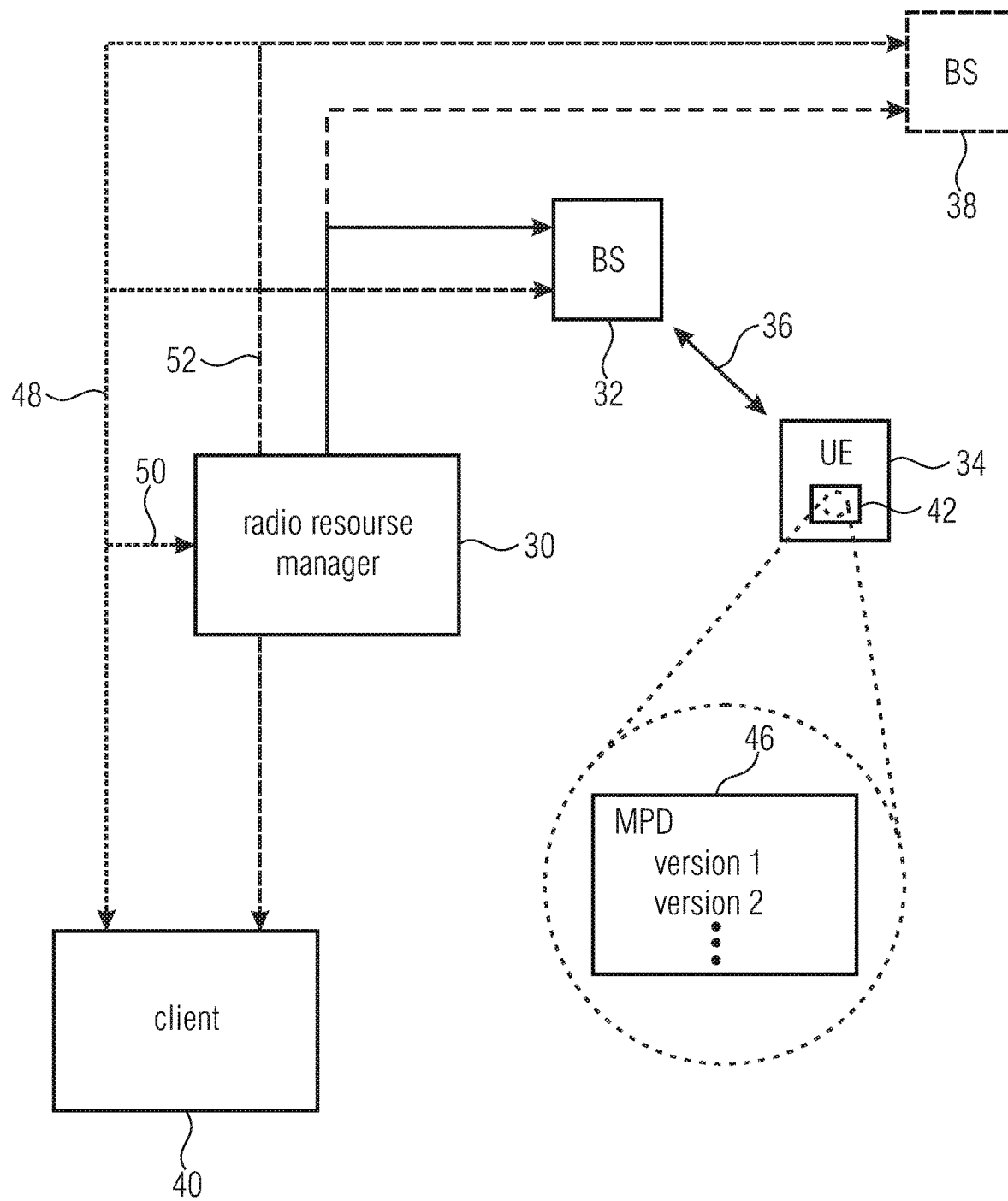
FIG. 16 shows a block diagram of an exemplary radio resource environment including a radio resource manager assigning uplink communication resources in accordance with an embodiment.

FIG. 16 corresponds to FIG. 3 except for the client 40 and the server 42 being switched: the server 42 operates at the user entity 34, while the client 40 is positioned on the other side of the base station 32 relative to user entity 34. When considering the more detailed explanation of a possible internal structure of the user entity as shown in FIG. 7, server 32 may be thought of as replacing client 40 in FIG. 7. This means the following. The radio resource manager 30 may survey the data traffic between server 42 and 40. In particular, the radio resource manager 30 may inspect the media presentation description 46 therefrom. Based thereon, the radio resource manager 30 may assign the uplink communication resources of the base station 32 to the user entities among which the user entity 34 is at which server 42 operates. In principle, all of the above discussion with respect to potential behaviors of the resource manager 30 stay the same. That is, the resource manager 30 may also inspect and log the media requests from the client 40 to server 42 and perform the assignment of the uplink communication resources depending on an evaluation thereof and so forth.

The concordance between the embodiment of FIGS. 3 to 5 on the one hand and FIG. 16 on the other hand remains valid even when considering the above-outlined extension of the embodiment of FIGS. 3 to 5 according to which part of the functionality of the radio resource manager 30 is transferred from RRM 30 onto the resource manager 74 positioned between server 42 on the one hand and transceiver stage 70 on the other hand (see FIG. 7, for example). That is, also true for the case of FIG. 16: the resource manager 74 may be configured to relieve the RRM 30 of surveying the data traffic between server 42 at user entity 34 and client 40. That is, even in that case, i.e. where the server 42 is running on user entity 34, the resources of the uplink bandwidth may be also managed analogously, namely by resource manager 74 indicating to the radio resource manger 30 the bit rate alternatives, i.e. the translated MPD, and RRM 30 using the translated MPD to perform the uplink resource assignment depending thereupon. The resource manager 74 may indicate the alternative bitrates for the uplink in the above-mentioned ESM messages, that contain the extended EPS quality of service message, as shown in Table 4.

Figure 14:
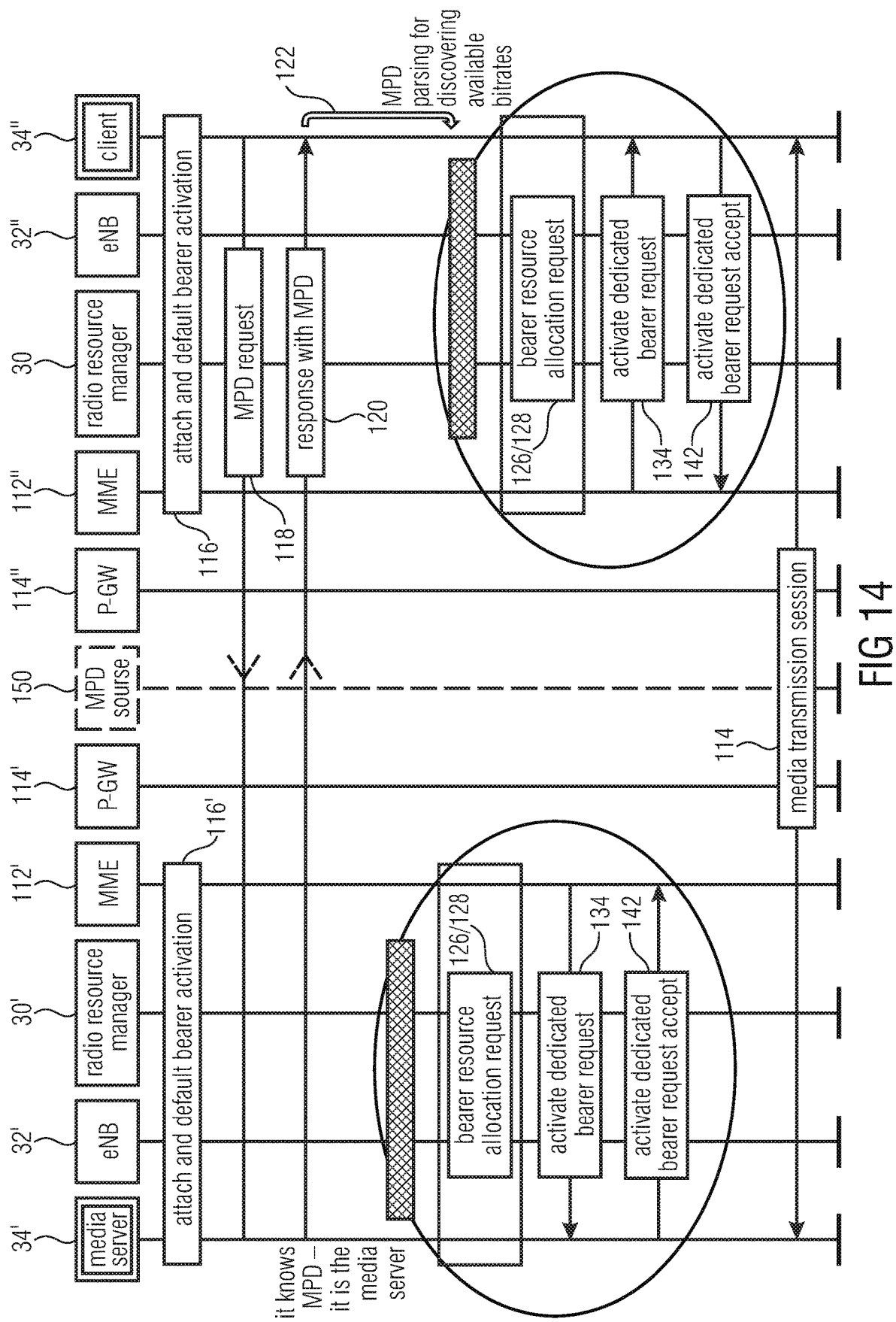
FIG. 14 shows a sequence of steps performed in a scenario with a server operating at one user entity and the corresponding client operating at another user entity in accordance with an embodiment.

See, for example, FIG. 14. On the left hand side, FIG. 14 shows a flow diagram similar to FIG. 15, i.e. using a time axis 110 and differentiating the entities involved with the respective steps shown in the blocks by spreading the entities along the horizontal direction and showing by the arrows associated with the respective blocks, between which entities the respective step takes place. On the right hand side of FIG. 14, the case of FIG. 15 is illustrated again, i.e. the case where the client resides at the user entity. On the left hand side, the case is shown where a server 42 operates at a user entity 34. In fact, the client operating at the one user entity and the server operating at the other user entity may form a pair between which media content is transferred. Such a situation may take place within, for example, a video conference where the server operating at user entity 34' transmits to the client operating at user entity 34" a video concerning the participant of the video conference at user entity 34' captured, for example, by means of a respective camera of the user entity. Other use cases are, however, possible as well. For example, the client may download a file from the media server at someone else's user entity 34'. In that case, the participating entities in the data traffic between the server at user entity 34' on the one hand and the client at user entity 34" on the other hand, are—shown in the order of their mentioning from left to right in FIG. 14: user entity 34', base station 32' to which user entity 34' is currently attached, the radio resource management 30' responsible for assigning the communication resources of base station 32', the mobility management entity 112' responsible for controlling the radio resource network to which base station 32' and radio resource manager 30' belong, the packet gateway 114' which belongs to the same radio resource network, the packet gateway 114" and the mobility management entity 112" both belonging to the radio resource network to which the base station 32" belongs, to which client 34" is attached, the radio resource manager 30" responsible for assigning the communication resources of base station 32", the base station 32" itself, and the user entity 34". As shown in FIG. 14, the user entity 34" would perform attachment and default bearer activation at step 116' in a same way as the user entity 34" does in step 116. As described above with respect to FIG. 15, the client residing on user entity 34" may send in step 118 an MPD request to the server residing at user entity 34', whereupon the latter sends back the MPD in step 120 to user entity 34". Thereupon, in step 122, the resource manager 74 residing at user entity 34" parses the MPD and then causes activation of the dedicated bearer along the line of the above description of steps 126 to 142, whereupon the resource manager 30 assigns the downlink communication resources of base station 32" in accordance with a translated MPD forwarded by resource manager 74 of user entity 34" within the media transmission session 144 which then takes place between client and server. On the uplink domain side, similar steps are taken. The server 42 residing at user entity 34' causes the activation of the dedicated bearer, i.e. here an adaptive conversational or non-conversational communication type session, analogously to steps 126 to 142 described above with respect to FIG. 15, whereupon, within the media transmission session 144, the radio resource manager 30' assigns the uplink resources of base station 32' in accordance with the translated media presentation description as forwarded by server at user entity 34' within the bearer resource allocation request 126.

It should be mentioned that FIG. 14 merely exemplarily showed the case where server and client both reside on user entities tied to respective radio resource networks. The example of FIG. 14 is readily transferable onto a case where the client is not operating at a user entity, but, for example, at a stationary computer, for example. Moreover, it should be mentioned that the sown scenario may also take place within one common radio resource network and that the RRM' and RRM" and/or MME' and MME" and/or are the same.

By the way, it is noted that for all of the above embodiments, it may happen that the server where the media content 44 resides, may be separated from the entity acting as the server to provide the media presentation description. More generally, the MPD 46 may stem from another entity or server than the server providing the media content 44 itself. This possibility is, for example, illustrated in FIG. 14 with dotted lines regarding the origin and target of the arrows corresponding to steps 120 and 118, respectively. In particular, this potential MPD source is shown at 150 with dotted lines. In case of this extra MPD source 150, the radio resource manager 30' may, nevertheless, be informed by the resource manager 74 on the translated media presentation description. In that case, however, resource manager 74 would, instead of inspecting the data traffic between the client at user entity 34" and the server at user entity 34', instruct the server at user entity 34' to provide the resource manager 74 at user entity 34" with the translated media presentation description.

Thus, in other words, the user entity 34 on the left in FIG. 14 is set as the media server and the user entity 34 on the right is set as the client 40. The MPD is requested by the client from the MPD source 150, which may be any server in the network (one special case is when the server with the MPD is the media server at user entity 34'). Since the media server knows the characteristics of the media, which are advertised at the MPD, it uses this information for indicating the alternative bitrates in the mentioned ESM messages and sets up the bearer, for which the uplink bitrate is especially important (the server needs to upload the data). The client, however, needs to parse the receive MPD and uses the described information for the bearer allocation, where the downlink bitrate has especial importance (the client 40 needs to download the data). However, since TCP may be used, the downlink bitrate is also important for the server, as well as the uplink bitrate for the client.

There is an especial case, e.g. in conversational scenarios, where each of the user entities 34 has a media server and a client simultaneously operating thereat. In this case both user entities 34 would request the media presentation description (e.g. MPD or SDP) and would use this information for describing the alternative bitrates for both uplink and downlink, based on the media characteristics offered at their respective servers and on the media characteristics that are supposed to receive as clients 40.

In such a scenario, where the user entities 34 have a media server and a client simultaneously, it may happen that two different eNodeBs take care of the different user entities 34 taking part in the conversation. The radio resource manager 30 operating for each of the eNodeBs and taking care of the user entities 34 operates independently optimizing each of the air interfaces for the different users. The problem of such a scenario is that the air interface of the one user entity 34 is not taken into account for optimization of the radio resources of the other user entity 34. Thus, a suboptimal decision may be taken. For example, if more data is uploaded from one user entity 34, than the amount of data that can be downloaded at the other user entity 34, which the first user entity 34 is communicating with, some data will be dropped at the radio resource manager 30 working with the user entity 34 with "download problems". A solution would be to extend the messages defined in the X2 interface [23] and add a message that provides concrete information about the resources that will be ensured for each of the users, based on the information defined in the MPD or SDP. In such a way, both eNBs perform a collaborative resource allocation taking into account the information in the SDP or MPD, as defined through this document. The new message could be e.g., UE RESOURCE STATUS REPORT and contain a resource allocation IE, as shown in Table 9, Table 10 and Table11.

The latter embodiment reveals a collaborative resource allocation without media knowledge in the sense described now. That is, see, for example, FIG. 3. FIG. 3 shows merely one radio resource manager 30 but as already noted above, a system of several radio resource managers may form a radio system with all the radio resource managers 30 operating independent from each other in the sense that each radio resource manger 30 assigns, by optimization, its communication resources of its at least one base station 32 to the user entities 34 being within the reach of its base stations 32 merely based on information travelling over its own base station(s) 32, such as quality feedback from the user entities 34 as outlined above, the number of user entities 34 to be served and so forth. Reference is made to the above discussion. That is, each RRM performs its own scheduling independently from each other. The independency of the scheduling is, however, broken through in accordance with the present embodiment in the sense that the RRMs also distribute information on their current radio resource distribution to its UEs, to outside for the use in the other RRMs. In the example just described, it is not necessary that the radio resource managers exploit information residing within media presentation descriptions if there are any. But according to the embodiment described now, it may, nevertheless, be avoided that the independently operating radio resource managers 30 disadvantageously assign unmatched communication resources to user entities which, by accident, have a communicating pair of client and server operating thereon. This is achieved as follows.

In particular, the radio resource manager surveys the data traffic towards a server or a client operating at one of the user entities 34 or some control messages exchanged between radio resource managers so as to obtain information on i) guaranteed communication resources currently assigned to the other of the server and the client, or a buffer state of the other of the server and the client. In case of the server operating on the user entity 34 served by the current radio resource manager 30, the buffer state of this server could form, for example, an output buffer state, i.e. the fill level of an output buffer. This could be interesting, for example, in case of live streaming or video conferences. In case of the client 40 operating on the user entity 34, the buffer state will be the fill level of an input buffer of the client. It is to be emphasized that in accordance with the present embodiment, the radio resource manager 30 (cf. FIG. 3) obtains this information regarding a server or client served by another radio resource manager 30. Merely, the counterpart of the client/server pair is operating on the user entity 34 served by the radio resource manager 30 itself. In accordance with the present embodiment, the radio resource manager 30 uses this information concerning a client/server counterpart operating on a user entity served elsewhere, in order to perform the assignment of communication resources of the at least one base station 32 by which the user entity 34 is served. By this measure, it is possible to avoid that the radio resource manager 30 assigns to some user entity 34 unnecessarily increased communication resources although, for example, the buffer state of the client/server counterpart is high, or the guaranteed communication resources currently assigned to an external user entity which the server/client counterpart operates on, is low.

Figure 17:
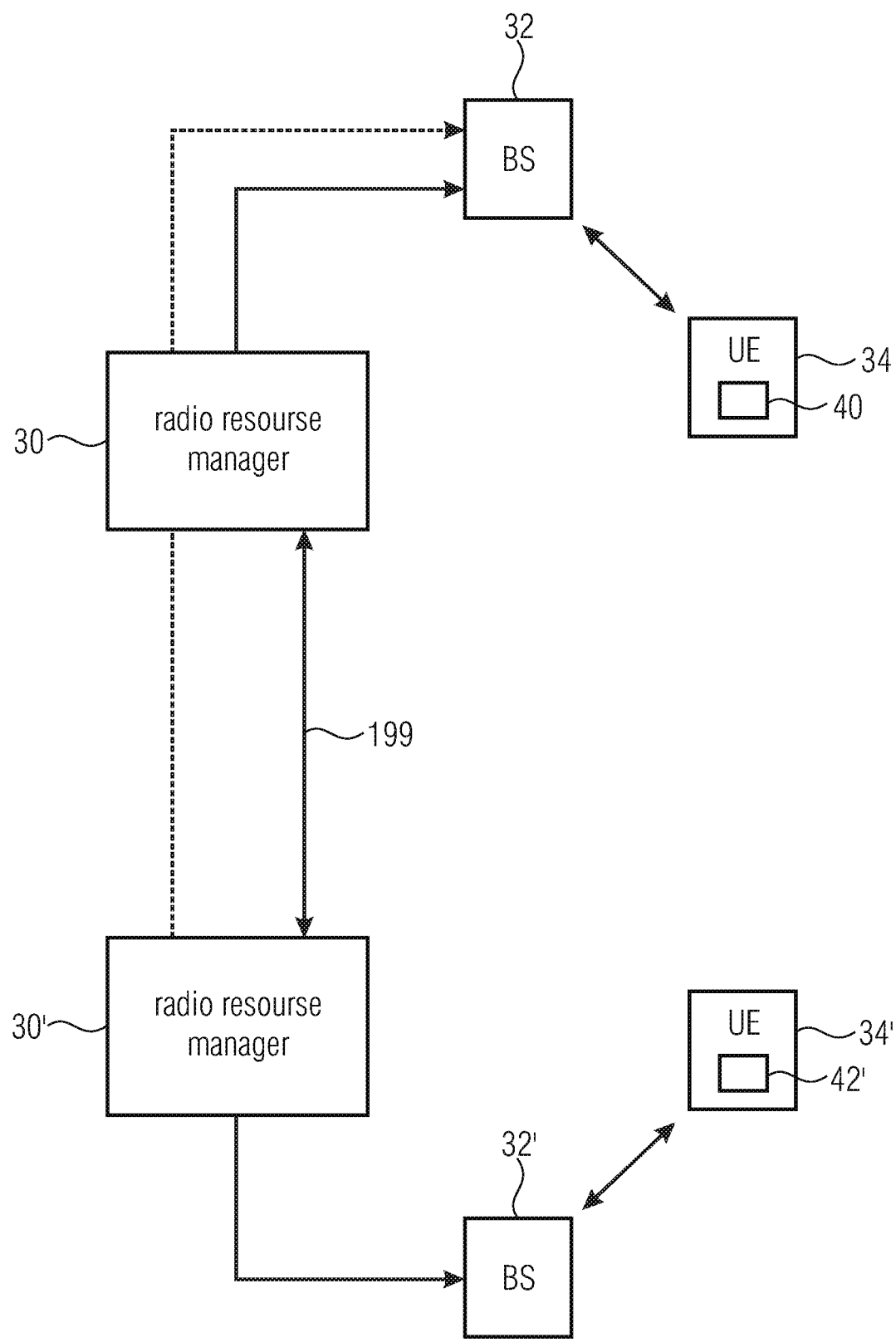
FIG. 17 shows a system of radio resource managers in accordance with another embodiment.

In order to make this clear, reference is made to FIG. 17, which shows such a system comprising several radio resource managers. In the LTE framework, the RRMs would from the afore-mentioned eNodeBs. One of the radio resource managers is exemplarily denoted with 30, the other with 30'. The fact that merely two managers are shown is exemplary. Both managers 30 and 30' assign their communication resources of their at least one respective base station 32 and 32', respectively. The assignment or scheduling is performed independently from each other except for the interactions involving the control signals or data traffic insertions described now.

In FIG. 17, one user entity 34 is exemplarily shown to be served by a base station 32 belonging to radio resource manager 30 and another user entity 34' is shown to be served by the base station 32' belonging to radio resource manager 30'. On user entity 34, a client 40 operates, and a server 42 is exemplarily shown to operate on user entity 34'. Both communicate with each other by a data traffic which is illustrated by a dashed line in FIG. 17. The data traffic may of the telecommunicating type, download type or the like. As already noted with regard to FIG. 3, it is not necessary that the radio resource managers 30 and 30' are crossed by the data traffic. It would be sufficient if both radio resource managers 30 and 30' merely had access to the data traffic in order to survey and inspect same.

In order to avoid miss-optimization between RRM 30 and 30', both inform each other about current UE buffer states and currently guaranteed bitrates to the respective other RRM.

In accordance with a first alternative, both RRM might be kept agnostic to each other. The respective information is inserted into the client/server data stream so that miss-optimization may even be avoided in case of server or client being served outside the radio system in the internet, for example.

Radio resource manager 30' is, for example, able to survey the data traffic from server 32 towards client 40 in order to obtain information on guaranteed communication resources currently assigned to user entity 34 which client 40 operates on, or the buffer state of this client 40. By this measure, radio resource manager 30' is able to avoid spending too much communication resources for server 42 although, for example, the buffer state of client 40 is already high, or the guaranteed communication resources currently assigned to user entity 34 are low. On the other hand, radio resource manager 30 is able to survey the data traffic from client 40 towards server 42 in order to obtain information of the guaranteed information resources currently assigned to user entity 34' or the buffer state of server 42. In the same manner, radio resource manager 30 is, by use of this information, able to avoid assigning too much communication resources to user entity 34 although, for example, the buffer state of server 42 approaches an empty state of fill level, or although the guaranteed communication resources currently assigned to user entity 34' are low.

As already denoted above, the guaranteed communication resource could be something which the radio resource managers 30 and 30' determine within the assignment of communication resources of its base station(s) 32 to its served user entities 34. That is, radio resource manager 30 and 30', respectively, assign guaranteed communication resources to user entities 34 and 34' in units of some time intervals, such as, for example, time intervals of 3 to 10 seconds. They also obey the guaranteed communication resources in assigning the communication resources within those time intervals. Either, the radio resource managers 30 and 30' use the guaranteed communication resources fixedly via the time intervals, or they vary the communication resources assigned to the user entities, but merely within the limits imposed by the guaranteed communication resources.

There are different possibilities as to how the information of the buffer state or the guaranteed communication resources from an external radio resource manager's domain enters the radio resource manager's domain of a radio resource manager serving a client/server counterpart via the data traffic. For example, radio resource managers 30 and 30' could be configured to insert information on the guaranteed communication resources assigned to its served user entity into the data traffic from the client 40 or server 42 running on its served user entity. Radio resource manager 30', for example, could insert into the data stream from server 42 to client 40 the information concerning the guaranteed communication resources assigned to user entity 34', and the radio resource manager 30, in turn, could insert into the data traffic from client 40 to server 42 the information concerning the guaranteed communication resources assigned to user entity 34. Further, the insertion does not necessarily have to be performed by radio resource managers 30 and 30', by themselves. As already outlined above with respect to the foregoing embodiment, such an insertion could also be performed by resource managers 74 running on the user entities 34 and 34', respectively. In that case, the radio resource managers 30 and 30' would inform the user entities 34 and 34', respectively, on their guaranteed communication resources, i.e. the guaranteed communication resources assigned to the user entities 34 and 34', they are operating on, and this information would be surveyed and inspected by the resource managers 74, which, in turn, perform the just mentioned insertion instead of the radio resource manager.

In accordance with a second alternative, both RRMs 30 and 30' inform each other about current UE buffer states and currently guaranteed bitrates concerning UE's served by themselves to the respective other RRM via control signals 199. In the LTE architecture, for example, such control signals could be exchanged between the RRMs via, for example, the X2 interface, S-GW or the like using, for example, the HSS as an operator which guides the path of control signal exchange accordingly. In accordance with this example, radio resource managers 30 and 30' would, for example, perform the following steps: 1) realizing that the client or server operating on the user entity served by themselves, seeks to setup an immediate transmission session, i.e. a media transmission session involving this client or server commences; 2) Checking whether the counterpart, i.e. server or client, with which a media transmission session is set-up, is served by any of the other RRMs of the radio system; 3) If yes, accompanying the media transmission session with control signals 199. The path for the control signals is guided via the HSS, for example. For example, radio resource manager 30 informs radio resource manager 30' via control signals 199 of the client's buffer state wherein the radio resource manager 30 may have obtained this information as explained above, i.e. by simulation or feedback from a resource management 74 within user entity 34. Or radio resource manager 30 may inform radio resource manager 30' via control signals 199 on the guaranteed radio resources assigned to user entity 34. Radio resource manager 30' does the same in the reverse direction during the media transmission session. That is, radio resource manager 30' informs the radio resource manager 30 via control signals 199 of the server's buffer state and/or the guaranteed radio resources for user entity 34'.

Naturally, the just described embodiment would also be combinable with any of the afore-mentioned embodiments. This is true, for example, as far as the embodiments are concerned according to which the buffer state of the client or server, which operates on the user entity served by the radio resource manager itself, is used by the radio resource manager in order to perform the communication resource assignment.

Table 9 extends the Message Type Table in section 9.2.13 in [23] as follows:

TABLE 9

New Message Type-UE Resource Status Report

| IE/Group Name | Presence | Range | IE type and reference | Semantics description |
|---|---|---|---|---|
| Procedure Code | M | | INTEGER (0 ... 255) | "0" = Handover Preparation<br>"1" = Handover Cancel<br>"2" = Load Indication<br>"3" = Error Indication<br>"4" = SN Status Transfer<br>"5" = UE Context Release<br>"6" = X2 Setup<br>"7" = Reset<br>"8" = eNB Configuration Update<br>"9" = Resource Status Reporting Initiation<br>"10" = Resource Status Reporting<br>"11" = Private Message<br>"12" = Mobility Settings Change<br>"13" = Radio Link Failure Indication<br>"14" = Handover Report<br>"15" = Cell Activation<br>"16" = UE Resource Status Report |
| Type of Message | M | | CHOICE (Initiating Message, Successful Outcome, Unsuccessful Outcome, ... ) | |

Table 10 shows the syntax of the UE RESOURCE STATUS REPORT.

TABLE 10

UE Resource Status Report Syntax

| IE/Group Name | Presencce | Range | IE type and reference | Semantics description | Criticality | Assigned Criticality |
|---|---|---|---|---|---|---|
| Message Type | M | | 9.2.13 | | YES | reject |
| User Equipment (UE) Identifier | M | | | Identification of the UE, e.g. TMSI | YES | reject |
| UE Allocated Resource Information | | 0 ... 1 | | Information about Resources allocated for UE | YES | ignore |

Table 11 shows the syntax of the UE Allocated Resource Information IE.

TABLE 11

UE Allocated Resource Information (version 1)

| IE/Group Name | Presence | Range | IE type and reference | Semantics description |
|---|---|---|---|---|
| Current Provided Downlink Bitrate | | | Bit Rate 9.2.11 | Desc.: This IE indicates the first downlink Bit Rate assignated to the UE to which data is transmitted by the target eNodeB. |
| Current Provided Uplink Bitrate | | | Bit Rate 9.2.11 | Desc.: This IE indicates the first uplink Bit Rate assignated to the UE to which data is transmitted by the target eNodeB |

Alternatively a variety of bitrates based on the SDP or MPD (based on media characteristics) could be provided with a maximum supported bitrate as shown in the following table:

TABLE 11

UE Allocated Resource Information (version 2)

| IE/Group Name | Presence | Range | IE type and reference | Semantics description |
|---|---|---|---|---|
| Current Provided Downlink Bitrate | | | Bit Rate 9.2.11 | Desc.: This IE indicates the first downlink Bit Rate assignated to the UE to which data is transmitted by the target eNodeB. |
| Current Provided Uplink Bitrate | | | Bit Rate 9.2.11 | Desc.: This IE indicates the first uplink Bit Rate assignated to the UE to which data is transmitted by the target eNodeB |
| N | | | INTEGER | Number of Alternative Downlink Bitrates |
| M | | | INTEGER | Number of Alternative Uplink Bitrates |
| E-RAB Alternative Downlink Bit Rate 1 | M | | Bit Rate 9.2.11 | Desc.: This IE indicates the first alternative downlink Bit Rate. |
| ... | | | | |
| E-RAB Alternative Downlink Bit Rate N | M | | Bit Rate 9.2.11 | Desc.: This IE indicates the N-th alternative downlink Bit Rate. |
| E-RAB Alternative Uplink Bit Rate 1 | M | | Bit Rate 9.2.11 | Desc.: This IE indicates the first alternative uplink Bit Rate. |
| ... | | | | |
| E-RAB Alternative Uplink Bit Rate M | M | | Bit Rate 9.2.11 | Desc.: This IE indicates the M-th alternative uplink Bit Rate. |

TABLE 6

Standardized QCI characteristics [cp. 19]

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 2-2 (see additional NOTE) | GBR with minimum only and alternative higher-bitrates | 4 | 150 ms | $10^{-3}$ | Conversational Video (Live Streaming), Note: Here the UE indicates it bit rate alternatives not only for the downlink, but also for the uplink |
| 3 (NOTE 3) | GBR | 3 | 50 ms | $10^{-3}$ | Real Time Gaming |
| 4 (NOTE 3) | | 5 | 300 ms | $10^{-6}$ | Non-Conversational Video (Buffered Streaming) |
| 4-2 (see additional NOTE) | GBR with minimum only and alternative higher-bitrates | 5 | 300 ms | $10^{-6}$ | Adaptive Non-Conversational Video (Buffered Streaming, e.g. HTTP Streaming) Note: A UE may indicate the presence of the alternative bitrates via indicating a new QCI value, but it may also be possible to fully backward compatible add a list of alternative bitrates behind the existing values of GBR, and MBR. |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 6-2 (see additional NOTE) | Non-GBR with alternative bit rates | 6 | 300 ms | $10^{-6}$ | Adaptive Video (Buffered Streaming) TCP-based (e.g., www, e-mail, chat, ftp, p2p file sharing, progressive video, HTTP Streaming, etc.) Note: A UE may indicate the presence of the alternative bitrates via indicating a new QCI value, but it may also be possible to fully backward compatible add a list of alternative bitrates behind the existing values of GBR, and MBR. In case of not expecting GBR and MBR values as usual for non-GBR services, these fields may be presented but should be set to Null. |
| 7 (NOTE 3) | Non-GBR | 7 | 100 ms | $10^{-3}$ | Voice, Video (Live Streaming) Interactive Gaming |

TABLE 6-continued

Standardized QCI characteristics [cp. 19]

| QCI | Resource Type | Priority | Packet Delay Budget (NOTE 1) | Packet Error Loss Rate (NOTE 2) | Example Services |
|---|---|---|---|---|---|
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

NOTE 1:
A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays-in particular for GBR traffic-should typically be lower than the PDB specified for a QCI as long as the UE has sufficient radio channel quality.
NOTE 2:
The rate of non congestion related packet losses that may occur between a radio base station and a PCEF should be regarded to be negligible. A PELR value specified for a standardized QCI therefore applies completely to the radio interface between a UE and a radio base station.
NOTE 3:
This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified.
NOTE 4:
If the network supports Multimedia Priority Services (MPS) then this QCI could be used for the prioritization of non real-time data (i.e. most typically TCP-based services/applications) of MPS subscribers.
NOTE 5:
This QCI could be used for a dedicated "premium bearer" (e.g. associated with premium content) for any subscriber/subscriber group. Also in this case, the SDF aggregate's uplink/downlink packet filters are known at the point in time when the SDF aggregate is authorized. Alternatively, this QCI could be used for the default bearer of a UE/PDN for "premium subscribers".
NOTE 6:
This QCI is typically used for the default bearer of a UE/PDN for non privileged subscribers. Note that AMBR can be used as a "tool" to provide subscriber differentiation between subscriber groups connected to the same PDN with the same QCI on the default bearer.

As has also been described above, the above embodiments also, inter alias, revealed a client—such as software, hardware, or programmable hardware—for being operative on a user entity 34 for communication with a radio resource base station 32, the client 40 being configured to retrieve from a server 42 a media presentation description and a media content 44, the media presentation description 46 describing versions of differing bandwidths of the media content 44, the client being configured to be switchable from a normal mode to a slave mode by means of a signalization from a radio resource manager 30 responsible for assigning the communication resources of the base station 32 to the user entity, wherein the client is configured to, in the normal mode, request the media content 44 from the server 42 in a version determined by the client based on the communication resources assigned to the user entity, and, in the slave mode, request the media content 44 from the server 42 in a version determined by the client irrespective of the communication resources assigned to the user entity. The Client may further be configured to, in the normal mode, request the media content 44 from the server 42 in a version determined by the client based on the communication resources assigned to the user entity and a buffer state of the media content. The client may also further be configured to, in the slave mode, request the media content 44 from the server 42 continuously in a version which corresponds to a highest bandwidth version among the versions of differing bandwidth in the media presentation description 46. That is, a client behavior could be controlled by, for example, @automaticSwitching indicator in MPD: the client may be informed that a device in-the-middle may adjust the bitrate of the selected segments in the middle to optimize the cell resources, so that the client shall not react on bitrate changes itself.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

| | |
|---|---|
| eNB | Evolved Node B (3G base station), sometimes eNodeB |
| DASH | Dynamic Adaptive Streaming over HTTP |
| LTE | Long-Term Evolution |
| UE | User Equipment (User Terminal) |
| MPD | Media Presentation Description |
| RRM | Radio Resource Management |
| TDD | Time Division Duplex |
| FDD | Frequency Division Duplex |
| MIMO | Multiple Input Multiple Output |
| OFDM | Orthogonal Frequency Division Duplexing |
| OFDMA | Orthogonal Frequency-Division Multiple Access |
| AVC | Advanced Video Coding |
| SVC | Scalable Video Coding |
| MVC | Multiview Video Coding |
| W3C | World Wide Web Consortium |
| MME | Mobility Management Entity |
| CQI | Channel Quality Information |
| S-GW | Serving Gateway |
| IE | Information Element |
| GTP | GPRS Tunneling Protocol |
| GPRS | General Packet Radio Service |
| HSS | Home Subscriber Service |

LIST OF REFERENCES

[1] Cisco White Paper, "Cisco Visual Networking Index: Forecast and Methodology, 2009-2014," June 2010.
[2] Cisco White Paper, "Cisco Visual Networking Index: Global Mobile Data-Traffic Forecast Update," 2010-2015.
[3] Information technology—Dynamic adaptive streaming over HTTP (DASH)—Part 1, "Media presentation description and segment formats, ISO/IEC DIS 23009-1," August 2011.
[4] 3GPP, "Transparent end-to-end Packet-switched Streaming Service (PSS); Protocols and codecs (Release 9); 3GPP TS 26.234 V9.3.0 (2010-06): Adaptive HTTP Streaming".
[5] A. Zambelli, ""IIS smooth streaming technical overview". Microsoft Corporation, 2009".
[6] HTTP Live Streaming Architecture, "Technical report, Apple Inc.," 2010.
[7] T. Wiegand, G. J. Sullivan, G. Bjontegaard and A. Luthra, "Overview of the H.264/AVC Video Coding Standard," in *IEEE Transactions on Circuits and Systems for Video Technology*, 2003.
[8] A. Tacz, A. Temesvary and N. Reider, "Handover Performance in 3GPP Long Term Evolution (LTE) Systems," in *Mobile and wireless Communications Summit*, 2007.
[9] T. Stockhammer, M. Walter and G. Liebl, "Optimized H.264-Based Bitstream Switching for Wireless," in *ICME*, 2005.
[10] S. Sharma, D. Gillies and W. Feng, "On the Goodput of TCP NewReno in Mobile Networks," in *ICCCN*, 2010.
[11] H. Schwarz, D. Marpe and T. Wiegand, "Overview of the scalable video coding extension of the H.264/AVC standard," in *IEEE Transactions on Circuits and Systems for Video Technology*, 2007.
[12] T. Schierl, Y. Sanchez, R. Globisch, C. Helige and T. Wiegand, "Priority-based Media Delivery using SVC with RTP and HTTP streaming," in *Springer Multimedia Tools and Application*, September 2010.
[13] W. Mulder and T. Wirth, "Are we ready for the femtolution?," in *IEEE COMSOC MMTC E-letter*, September 2010.
[14] ITU-R, Report M.2134, "Requirements related to technical performance for IMT-Advanced radio interface(s), Approved in November 2008".
[15] 3GPP, "Physical layer; General description (Release 8); 3GPP TS 25.201 V8.1.0 (2008-05): Adaptive HTTP Streaming".
[16] 3GPP, "Evolved Universal Terrestrial Radio Access (E-UTRA) and evolved Universal Terrestrial Radio Access Network (E-UTRAN); Overall description (Release 8); 3GPP TS 36.300 V8.12.0 (2010-03): Adaptive HTTP Streaming".
[17] Leekwijck, Y. Sanchez, T. Schierl, C. Helige, T. Wiegand, D. Hong, D. De Vleeschauwer and W. Van, "DASH: improved Dynamic Adaptive Streaming over HTTP using Scalable Video Coding," in *ACM Mmsys*, 2011.
[18] J. Mandavi and S. Floyd. TCP-friendly unicast rate-based flow control. January, 1997
[19] 3GPP TS 23202, Policy and charging control architecture, Release 113GPP TS
[20] 24301, Non-Access-Stratum (NAS) protocol for Evolved Packet System (EPS)
[21] 3GPP TS 29274, Evolved Packet System (EPS); Evolved General Packet Radio Service (GPRS) Tunnelling Protocol for Control plane (GTPv2-C); Stage 3
[22] 3GPP TS 36413, Evolved Universal Terrestrial Radio Access Network (E-UTRAN); 51 Application Protocol (S1AP)
[23] 3GPP TS 36423, 3rd Generation Partnership Project; Technical Specification Group Radio Access Network; Evolved Universal Terrestrial Radio Access Network (E-UTRAN); X2 application protocol (X2AP) (Release 11)
[24] 3GPP TS 36420, 3rd Generation Partnership Project; Technical Specification Group Radio Access Network; Evolved Universal Terrestrial Radio Access Network (E-UTRAN); X2 general aspects and principles (Release 11)

The invention claimed is:
1. User entity for communicating via communication resources, on which a client is operative, wherein the user entity comprises an electronic circuit, or a microprocessor, configured to
determine a fill level of a buffer of the client for buffering a media content retrieved by the client from a server,
derive a set of parameters from a media presentation description received from the server, the set of parameters indicating a bandwidth for each of the versions of different bandwidths of the media content, and
inform a resource manager responsible for assigning the communication resources to a plurality of user entities to which the user entity belongs, on
the fill level, and
wherein the user entity is configured to inform the resource manager on the fill level via messages which indicate, as a first addressee, the resource manager, wherein the first addressee is different from a second addressee as which the server is indicated by media requests sent from the client to the server in order to retrieve the media content from the server.

2. User entity according to claim 1, wherein the user entity is configured to send the messages in a lower OSI layer than an OSI layer via which the media requests are sent.

3. Method for being performed on a user entity on which a client is operative, the user entity communicating via communication resources, the method comprising
determining a fill level of a buffer of the client for buffering a media content retrieved by the client from a server,
deriving a set of parameters from a media presentation description received from the server, the set of parameters indicating a bandwidth for each of the versions of different bandwidths of the media content, and
informing a resource manager responsible for assigning the communication resources to a plurality of user entities to which the user entity belongs, on
the determined fill level, and
wherein the user entity informs the resource manager on the fill level via messages which indicate, as a first addressee, the resource manager, wherein the first addressee is different from a second addressee as which the server is indicated by media requests sent from the client to the server in order to retrieve the media content from the server.

* * * * *